US008250039B2

(12) United States Patent
Chappuis

(10) Patent No.: US 8,250,039 B2
(45) Date of Patent: Aug. 21, 2012

(54) INFORMATION PROCESSING METHOD

(76) Inventor: Richard Chappuis, Porrentruy (CH)

( * ) Notice: Subject to any disclaimer, the term of this patent is extended or adjusted under 35 U.S.C. 154(b) by 381 days.

(21) Appl. No.: 12/420,382

(22) Filed: Apr. 8, 2009

(65) Prior Publication Data
US 2009/0198665 A1    Aug. 6, 2009

Related U.S. Application Data

(63) Continuation of application No. PCT/EP2006/067238, filed on Oct. 10, 2006.

(51) Int. Cl.
*G06F 17/30* (2006.01)
(52) U.S. Cl. .......................................... 707/661; 707/827
(58) Field of Classification Search ........... 707/999.102, 707/999.005, 661, 827; 704/2, 9
See application file for complete search history.

(56) References Cited

U.S. PATENT DOCUMENTS

| 6,185,556 | B1 | 2/2001 | Snodgrass et al. |
| 6,208,992 | B1 | 3/2001 | Bruckner |
| 6,609,132 | B1 * | 8/2003 | White et al. .............. 1/1 |
| 6,618,732 | B1 * | 9/2003 | White et al. .............. 707/769 |
| 6,618,733 | B1 * | 9/2003 | White et al. .............. 707/739 |
| 6,735,593 | B1 * | 5/2004 | Williams .............. 1/1 |
| 7,133,402 | B2 * | 11/2006 | Nomura et al. .............. 370/389 |
| 7,490,289 | B2 * | 2/2009 | Hintermeister et al. ...... 715/234 |
| 7,876,747 | B2 * | 1/2011 | Elangovan et al. .......... 370/382 |
| 7,912,862 | B2 * | 3/2011 | Vaschillo et al. .......... 707/791 |
| 2001/0051946 | A1 | 12/2001 | Nishikawa |
| 2003/0187826 | A1 | 10/2003 | Kennedy et al. |
| 2005/0015396 | A1 * | 1/2005 | Vu .............. 707/100 |
| 2005/0055385 | A1 | 3/2005 | Sinha et al. |
| 2006/0004866 | A1 * | 1/2006 | Lawrence et al. .......... 707/104.1 |
| 2008/0244381 | A1 * | 10/2008 | Nicolaou et al. .............. 715/234 |
| 2009/0198665 | A1 * | 8/2009 | Chappuis .............. 707/4 |
| 2009/0254572 | A1 * | 10/2009 | Redlich et al. .............. 707/10 |
| 2010/0010968 | A1 * | 1/2010 | Redlich et al. .............. 707/3 |
| 2010/0250497 | A1 * | 9/2010 | Redlich et al. .............. 707/661 |

FOREIGN PATENT DOCUMENTS

| EP | 0583108 A2 | 2/1994 |
| GB | 2293667 A | 4/1996 |
| GB | 2420196 A | 5/2006 |
| WO | 2004099941 A2 | 11/2004 |

OTHER PUBLICATIONS

International Search Report dated May 23, 2007.
Herman, I; Swick R; Brickley, D.; Resource Description Framework (RDF), W3C Technology and Society Domain; Semantic Web Activity, www.w3.org/RDF/; Mar. 10, 2009, 7 pgs.

* cited by examiner

*Primary Examiner* — Jean M Corrielus
(74) *Attorney, Agent, or Firm* — Pearne & Gordon LLP

(57) ABSTRACT

Method for generating information processing Systems wherein informative Containers and Contents are created, identified, stored, modeled, communicated, modified and deleted by creating, modifying or deleting Links. The whole information entered by the users and the information for describing the System takes the form of Links having identical sizes and stored by a Links Base. The Links can be provided with attributes, notably time attributes.

30 Claims, 50 Drawing Sheets

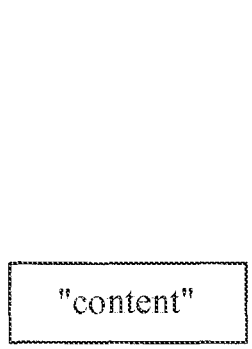
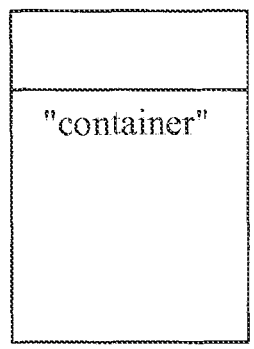
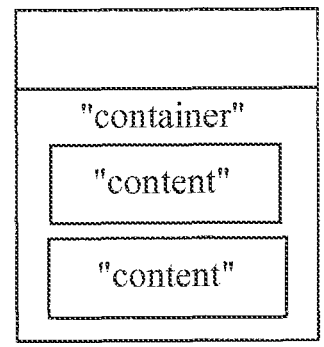
Fig. 1　　　　　　Fig. 2　　　　　　Fig. 3
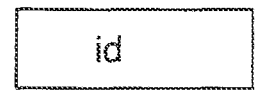
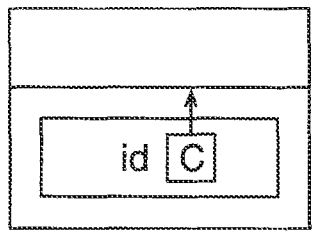
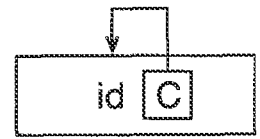
Fig. 4　　　　　　Fig. 5　　　　　　Fig. 6
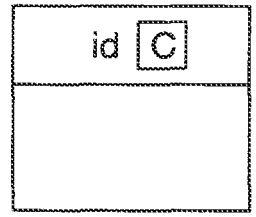
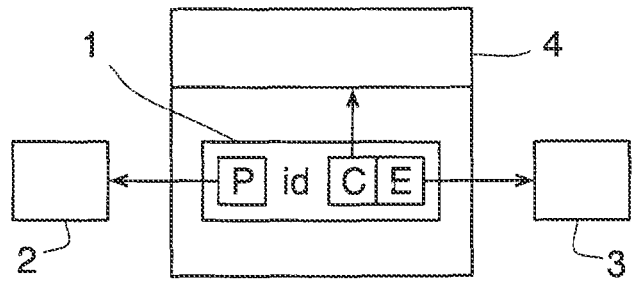
Fig. 7　　　　　　　　　　　　　Fig. 8

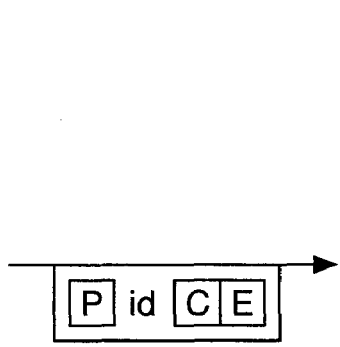
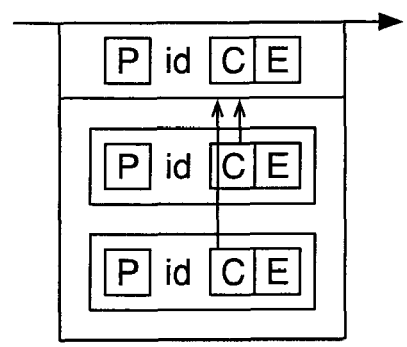
Fig. 9    Fig. 10
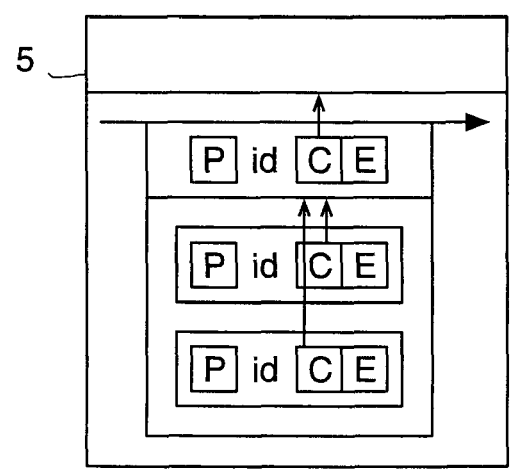
Fig. 11
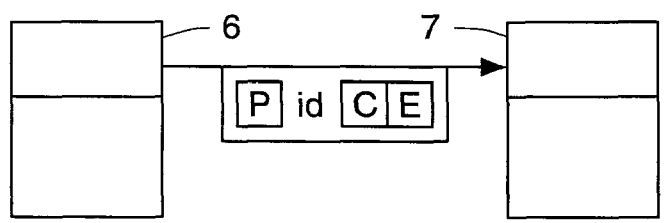
Fig. 12

A

B

C

D

108

INFORMATION PROCESSING METHOD

This application is a continuation of International Application PCT/EP2006/067238 filed on Oct. 10, 2006, the content of which is herewith enclosed by reference.

TECHNICAL FIELD

The present invention concerns an information processing method, notably for identifying, storing, laying out, communicating, analyzing, editing and searching information, by means of digital information processing systems.

STATE OF THE ART

Nowadays, information is segmented by many formats. The description information of these formats, the meta-information, is also segmented by many syntaxes and structures that are often not explicit and not accessible. The multiplicity of the software applications required for processing these many formats segments the way in which the information can be used. These applications also segment the information because of the difficulty they have in sharing the information and meta-information they generate; sharing causes a duplication of the information and most often a duplication of one structure into another (copy-paste, import-export). This results in information systems with a high level of redundancy, where the searching, the modifying and the integrity of information are increasing more complicated to achieve. These formats and applications change in time and are thus also segmented from one version to the next.

The relational database management system (RDBMS) in particular represents a typical case of information segmentation. An RDBMS comprises a suit of applications built over a relational database and allowing the information stored by the latter to be processed.

Two types of segmentation can be distinguished: vertical segmentation, or semantic segmentation, which expresses the difficulty of measuring the interconnectedness of the information to one another, and horizontal segmentation, which expresses the difficulty of measuring the evolution of the information in time.

In the case of an RDBMS, the information is segmented vertically in layers. The architecture of an RDBMS is divided into three main layers, subdivided into several sub-layers. They are presented hereafter from the lowest to the highest:
 1. Resources:
  the information is stored in a relational database,
  it is organized in relational models,
  it passes through an interface between the resources and the business logic (also known as "object-relational mapping")
 2. Business logic:
  the information is re-arranged in object models,
  it is treated according to the code implementation, the rules of the art,
  it transits through an interface between the business logic and the presentation,
 3. Presentation:
  the information relative to a task is regrouped in applications, Web applications etc.
  and finally, it is presented to the users by graphical, HTML, applet etc. interfaces . . . .

These sub-layers make use of several design and analysis tools. The meta-information generated by these design tools are segmented from the RDBMS. These design tools are poorly integrated, they do not or not readily interact with one another, they are sophisticated, their utilization is not homogenous and learning them is difficult.

Furthermore, the meta-information necessary for modeling the domain processed by the RDBMS is segmented, it is located: in the relational model, in the object model, in the code implementation, and sometimes even in the presentation sub-layers. Although the information stored in the RDBMS can be easily manipulated, the meta-information, though closely connected to this information, resides in the structure of the RDBMS and is much harder to modify or complete.

Vertical segmentation occurs also in the layout of the meta-information. It is limited to one or two levels of meta-modeling: the meta-information in turn cannot be easily arranged in a more global model, as being itself information.

In the case of a RDBMS, the horizontal segmentation occurs in the version management and the layer synchronization. When a RDBMS is to be put to production or installed, it is necessary to synchronize: the data's initial state, the configuration files, the source code, the used libraries and frameworks, the versions and configurations of the design tools, the meta-information generated by the design tools, . . . . Old data can most often be processed only with old versions of RDBMS. It is difficult, or even impossible, for the system to revert to a prior state.

Horizontal segmentation occurs also at the level of the layout of information (and of meta-information) in time: temporal modeling is a functionality that is complex to execute and badly integrated to the RDBMS.

One consequence of the segmentation is to render the RDBMS more and more static and complicated. The whole rests on a relational model already poorly suited to reorganization, and where the information is segmented from the meta-information (from the relational model). Reorganizing the information results in substantial and badly controllable modifications on the other layers. There is no design "meta-tool" for analyzing all the dependencies and connections between the layers. It is then necessary to end a complete analysis of the processed domain before beginning the development of the upper layers. The meta-information is thus introduced by the RDBMS architect when designing the base; the user is bound by the choices made at that moment in time. In other words, it is necessary to freeze the relational model, which will condition all the upper layers and hence the applications for the final user.

It is difficult to reorganize cleanly part of the structure, or more simply to make a change, without breaking the fragile balance between the layers. The solution often chosen is adding (columns, tables, attributes, classes, methods, code, graphical objects, configuration files, . . . ). Consequently, a significant part of the meta-information becomes orphaned. The result is an information system that is rigid and static, ever heavier and more expensive to control, to maintain and to develop, and which freezes in increasing complexity instead of having a system that evolves by transforming.

In a relational database, if one wishes to search the information "Richard", the information specifying in which tables the search is to be performed is not explicit, the meta-information (the informative container) is segmented from the information (the informative content). The data "Richard" finds itself duplicated in several tables with completely different meanings (first name, family name, French word, person, company name, . . . ) that depend on a frozen meta-information difficult to verify and modify. One knows for example that "Rowling" is a writer's name only because it is stored in a field "author name" defined in a table of writers when the base was designed. Similarly, the graph of relations between the tables constitutes implicit meta-information. The fact that the name "Rowling" in the "writer" table is referenced by the work "Harry Potter" in the "book" table is known only because these two records share a common identifier, in this case a writer's number, for example an integer such as [1356]. The relational model indicates only the columns of the two tables that must be put in relation, and the properties of the relation; the links themselves, between each author and each book, are not explicitly stored. Furthermore, it is generally not known since when the relation between "author" and "book" is valid, nor since when the reference between "Harry Potter" and "Rowling" is valid, nor since when "Rowling" and "Harry Potter" are valid.

Using links or relations that are explicit, qualified and provided for example with temporal attributes, makes it possible to solve some of the problems relative to the segmentation of information. To this effect, WO00/29980 describes an associative model of data storage based on relations between entities. The information is stored simultaneously in the entities and in the relations. The relations can be provided with attributes, including a date from which a relation is valid. The non-valid relations are not deleted but rendered inactive. The design of a database according to this model is not very intuitive; the information is shared between the entities and the relations. The storage model remains difficult to modify and develop.

U.S. Pat. No. 6,609,132 describes a non-relational database system ("data container") enabling an explicit description of the links between the objects. The links are provided with qualifiers.

A somewhat similar solution is described in U.S. Pat. No. 6,208,992, which also uses an explicit description of the relations.

A data model using explicit and qualified links between entities is also described in US2003/0187826, which applies to monetary accounts. The information is essentially stored in the entities.

EP583108 is another example of database based on relations between entities. GB2293667 and WO2004/099941 describe non-relational database systems comprising explicit and qualified links between entities. The data can however be stored only in hierarchical manner.

The RDF model, described on www.w3.org/rdf, was initially designed to allow information accessible on the Web to be structured and efficiently indexed by means of resources represented by triplets. One triplet can contain the references of three triplets, including its own.

U.S. Pat. No. 6,185,556 describes, notably in the introduction, temporal databases wherein the temporal attributes are associated to different records.

US2005/0055385 is another example of document describing temporal databases. The method allows the table's state to be consulted at any time in the past.

In these known systems, the information is stored, at least partly, in tables or similar entities. The definition of the tables is generally frozen and widely conditions the information storage and searching possibilities.

BRIEF SUMMARY OF THE INVENTION

The aim of the present invention is to propose an information processing method free from the limitations of the known methods, notably free from the problems associated with vertical and horizontal segmentation of the information.

Another aim is to propose an alternative to the relational model, free from the limitations of the relational model concerning notably the modeling of complex structures and the different processing of meta-information.

Another aim is to reduce the redundancy of information, to identify and accelerate the speed of processing, communicating and searching the information.

Another aim is to propose an information processing system allowing all the information to be stored and processed, including the meta-information of the stored models and the information necessary for completely describing said system.

These aims are achieved notably by means of an information processing method, wherein all the processed information is identified by a plurality of Links, each Link being represented by a data structure comprising at least one unique identifier specifying said Link and three references on the unique Link-identifiers, so as to connect directly or indirectly all the Links to one another.

This method thus uses only links, and no data, for defining all the information which is processed.

The information identified by the Links and processed by the method also includes the meta-information that is thus not stored and processed separately as in the prior art solutions.

The inventive method preferably allows information to be created, identified, stored, laid-out, communicated, searched, analyzed, modified and deleted by creating, identifying, laying out, searching, analyzing, modifying and deleting Links in a Links Base or in several intercommunicating Links Bases.

The conventional techniques process information by processing data and references onto these data, whereas the method processes Links connecting Links to one another. The "Link" of the method, spelled with a capital letter, is a particular data structure that must not be confused with a simple reference nor with a hyperlink. The "inventive Links" connect Links but contain information going beyond a simple reference to a content.

In a preferred embodiment, each Link represents at least one uniquely identified Content and references three other Links corresponding respectively to a Container of said Link, to a ParentContent and to a ChildContent the Link serves to connect.

According to the method, a set of information (including the meta-information, in other words the informative contents and containers) is defined by Links connecting Links and some of which represent data.

The method does not segment information but connects it, the information is no longer segmented from the meta-information. The information and the meta-information are hence no longer processed in a differentiated manner.

All the informative containers and contents are represented in the same way, with the aid of Links.

The method thus only manipulates data structures of fixed size, the Links, which makes it possible to optimize access to the information.

Certain Links can correspond implicitly to data. For example: it is possible to have identifiers of a set of Links correspond to ASCII or UNICODE characters or to the keys of a key-value dictionary whose values designate one or another data. One word can then be defined by a set of Links identifying a character or by a Link identifying a record in a word dictionary.

The Links can reference explicitly external data to synchronize an information processing system based on the method with prior techniques, for example existing data maintained by systems of files, external applications, databases, Web servers . . . .

The method allows information processing systems to be generated where the whole information entered by the users is represented in the form of Links and where the system itself is auto-described by Links. The system's structure is completely defined by itself. Such a system can modify and improve its own definition, it can also be identified by a Link. The Link connects the whole of the information to each other, there is no vertical segmentation anymore.

The Link represents a new store unit, the information processing is performed by processing the Links. In a preferred embodiment, by adding temporal attributes to the Links, the temporal management of the information, of the meta-information and of the system itself can be considerably simplified. The method does not segment information in time but processes the whole information in different temporal contexts. The Link's temporal attributes allow a simple temporal indexation of all the information processed by the method. There is no horizontal segmentation anymore; it is possible to revert to a prior state of the system simply by activating the Links valid at the chosen time.

The inventive method rests notably on the following observations and postulates:

In order to resolve the segmentation problems, the method is based on a reassessment of the notion of information: what is information? For example, is the data "Richard" bearer of information? In a given cultural context, the data "Richard" can be connected to different information: to a word; to a first name; to a French substantive denoting a rich person; to a famous person; etc.

But in a different cultural context, if "Richard" cannot be connected to any model or to other information, it can lose all its meaning and carry no information. Thus, information has no existence in and of itself, it exists only in relation to other information, only through the links it has to other information. And this "other information" itself also exists in relation to other information . . . . The method posits a first postulate:

The information resides in the links and not in the data.

How is information processed? Time management is essential. The signals perceived by our senses, the progression of our reflections and the train of our thoughts will create connections, will create links, will awaken old connections, will reactivate old links. If we were incapable of keeping trace of our reflections, of taking up our train of though, of calling upon our memory, we would then be incapable of processing information. If we were incapable of making hypotheses thanks to our imagination, of programming events, of simulating scenarios, of activating links in the future, we would then be incapable of processing information. The method posits a second postulate:

The information resides in the evolution of the links in time.

Information is expressed, transmitted, understood through gesture, through movement. In other words, information is expressed by sequences of links that are made and unmade in time.

BRIEF DESCRIPTION OF THE FIGURES

Examples of embodiments of the invention are indicated in the description illustrated by the attached figures wherein:

FIG. 1 illustrates a Content.
FIG. 2 illustrates a Container.
FIG. 3 illustrates a Container and two Contents.
FIG. 4 illustrates a Link.
FIG. 5 illustrates a Link and its reference on its Container.
FIG. 6 illustrates the Link's re-entrance faculty.
FIG. 7 illustrates a Link representing a Container.
FIG. 8 illustrates the reference C of a Link 1 on its Container 4, the reference P on a ParentContent 2 and the reference E on a ChildContent 3.
FIG. 9 illustrates a particular Link, called Relation.
FIG. 10 illustrates a Relation and its Contents.
FIG. 11 illustrates the RelationsContainer 5 and a Relation.
FIG. 12 illustrates a Relation associating a ParentContainer 6 to a ChildContainer 7.

EXAMPLES OF EMBODIMENTS OF THE INVENTION

Terminology

Content: A Content, illustrated by FIG. 1, designates an element from among a collection of elements. A Content can be represented by a Link.

Container: A Container designates a collection of elements, it contains Contents. FIG. 2 illustrates a Container. FIG. 3 illustrates a Container and its two Contents. A Container can be represented by a Link.

Link: A Link represents at least one Content, it is only identified by a unique identifier, id (FIG. 4). It contains a reference C on its Container (FIG. 5). A Link as a re-entrance faculty, it can be contained by itself, so that the reference C specifying its Container corresponds to its own identifier id (FIG. 6). Some Links represent also a Container (FIG. 7). A Link comprises two other references (FIG. 8) that connect two Contents: a reference P on a ParentContent 2 and a reference E on a ChildContent 3. The Link thus connects two identified Contents and is contained by a Container also identified. It thus contains more information than a vector or a branch in a graph, each Link has an additional property: a reference on its Container, i.e. on another Link.

ParentContent: see Link.

ChildContent: see Link.

Figure 13:
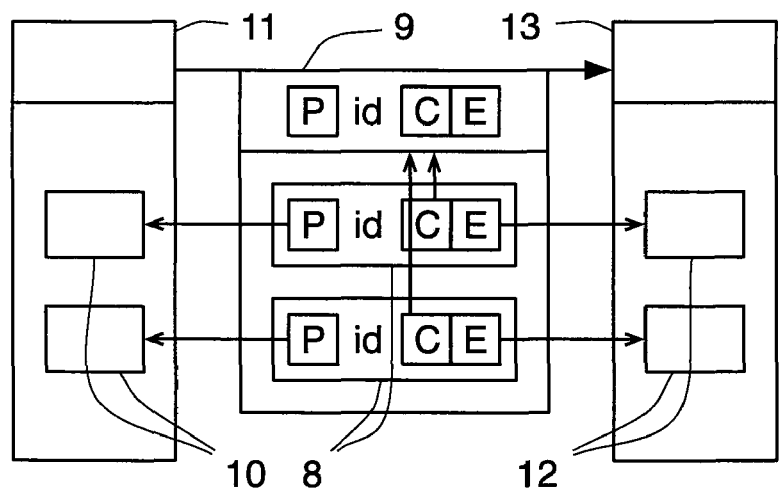
FIG. 13 illustrates the Links 8 of a Relation 9 connecting the ParentContents 10 to the ChildContents 12.

Relation: A Link can represent a Relation (FIG. 9). A Relation is a Container, its Contents are Links (FIG. 10). The Relations are contained in a Container (FIG. 11), called RelationsContainer 5. A Relation associates two Containers (FIG. 12), a ParentContainer 6 to a ChildContainer 7. The Links 8 (FIG. 13) of a Relation 9 connect a ParentContent 10 of the ParentContainer 11 to a ChildContent 12 of the ChildContainer 13

ParentContainer: see Relation.

ChildContainer: see Relation.

Figure 14:
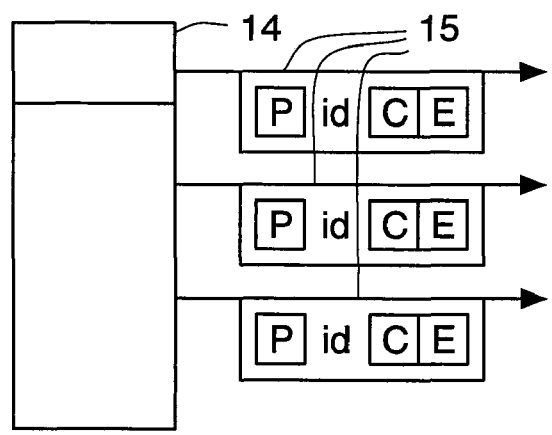
FIG. 14 illustrates the ParentRelations 15 of a Container 14.

ParentRelation: A Container 14 (FIG. 14) is defined by one or several Relations 15, called ParentRelations. The ParentRelations of a Container are the Relations that designate this Container as being their ParentContainer (via the Relation CP).

Figure 15:
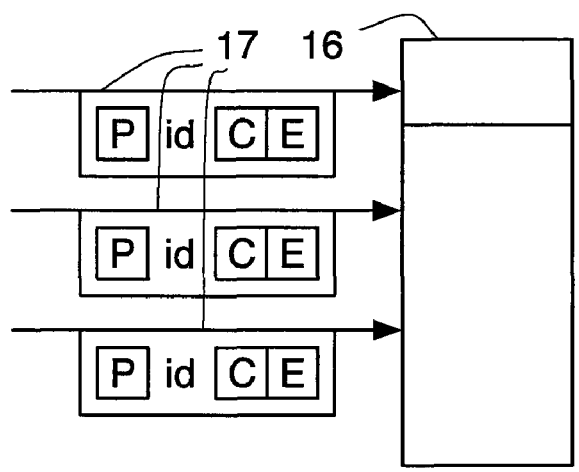
FIG. 15 illustrates the ChildRelations 17 of a Container 1.

ChildRelation: The ChildRelations of a Container 16 (FIG. 15) are the Relations 17 that designate this Container as being their ChildContainer (via the Relation CE).

Figure 16:
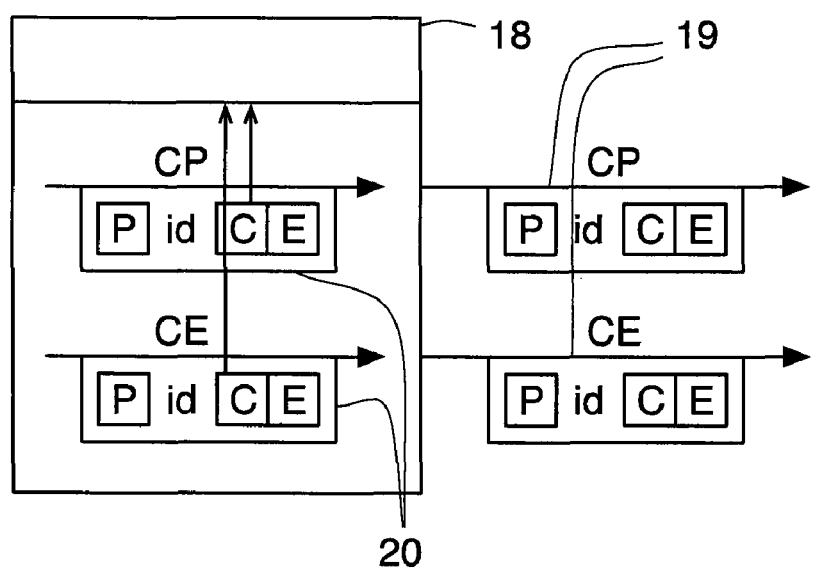
FIG. 16 illustrates the recursion of the RelationsContainer 18.

RelationsContainer: A RelationsContainer 18 (FIG. 16) contains and defines Relations 20. It is defined in recursive manner by ParentRelations 19 that this RelationsContainer precisely serve to define. A RelationsContainer is defined by at least two ParentRelations: the Relation CP and the Relation CE.

Relation CP: A Relation CP is a ParentRelation of a RelationsContainer that defines the ParentContainer of a Relation.

Relation CE: A Relation CE is a ParentRelation of a RelationsContainer that defines the ChildContainer of a Relation.

Figure 17:
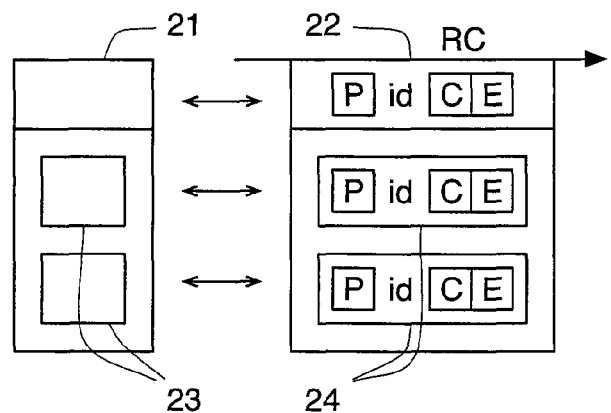
FIG. 17 illustrates a Relation RC 22.

Relation RC: Some Relations (FIG. 17), called Relation RC, serve to represent a Container 21. This Container 21 is identified by the identifier id of said Relation RC 22. The Contents 23 of this Container are identified by the identifier id of each of the Links 24 of said Relation RC, said Links being called Affiliation Links 24.

Affiliation Links: These are the Links 24 contained by a Relation RC 22.

Figure 18:
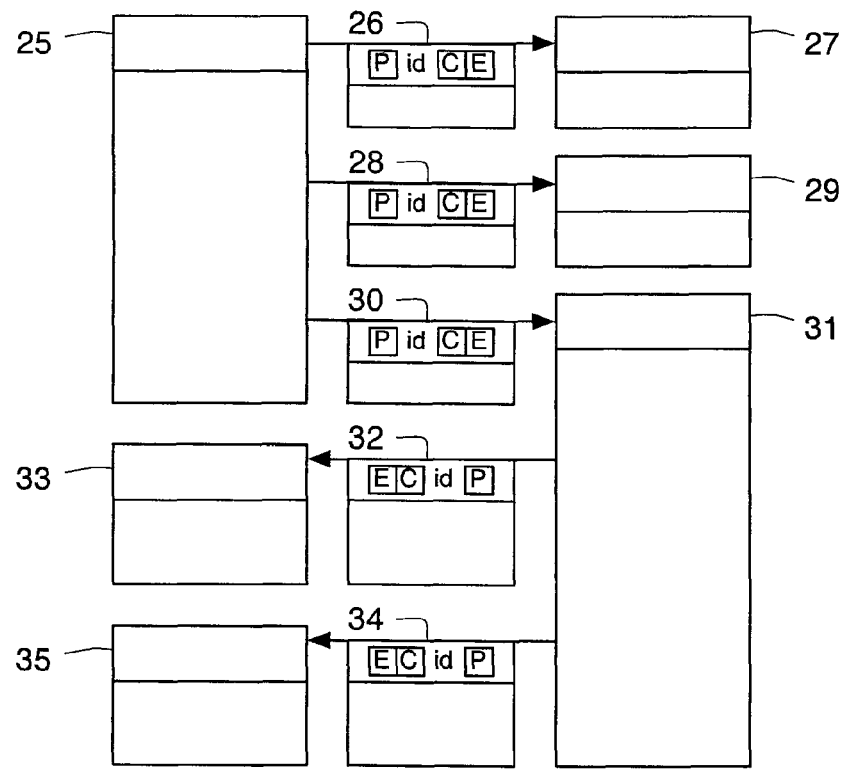
FIG. 18 illustrates an arbitrary Model.

Model: A Model is a set of Containers associated by Relations (FIG. 18).

Links Base: A Links Base is a machine capable of storing, notably creating, identifying, indexing, inserting, moving, modifying, deleting, searching, analyzing and sharing Links in one or several Link collections, and capable of distributing, exchanging and synchronizing Links with other Links Bases connected in networks.

Kernel: A Kernel is a particular lay-out of a set of Links that allows bootstrapping of a self-described, self-sustaining and re-entering System.

System: A System is an information processing system implemented by the method and based on the processing of Links. A System is entirely represented by the Links stored in one or several Links Bases. A System is implemented by a computer program executed for example by a computer, an embedded system, an information processing peripheral, etc.

Re-Entering Initial Link: The Re-Entering Initial Link (LIRE) is the Link identifying a System based on a Kernel.

IntraSystem: System contained by System.

MetaSystem: System containing other Systems.

A Link is uniquely identified in the frame of one or several Links Bases of the set of Link Basis implemented for: an appropriate equipment, or several equipments interconnected by a network, or several interconnected networks, or several domains of a network of networks.

The method organizes and models the information by creating Models. FIG. 18 illustrates a Model assembling six Containers by five Relations. The Container "Person" 25 is defined by three ParentRelations:

the Relation "name" 26, whose ChildContainer is the Container "Name" 27, the Relation "first name" 28, whose ChildContainer is the Container "First Name" 29, the Relation "address" 30, whose ChildContainer is the Container "Address" 31, and the Container "Address" 31 is defined by two ParentRelations:

the Relation "place" 32, whose ChildContainer is the Container "Place" 33, the Relation "street" 34, whose ChildContainer is the Container "Street" 35.

Figure 19:
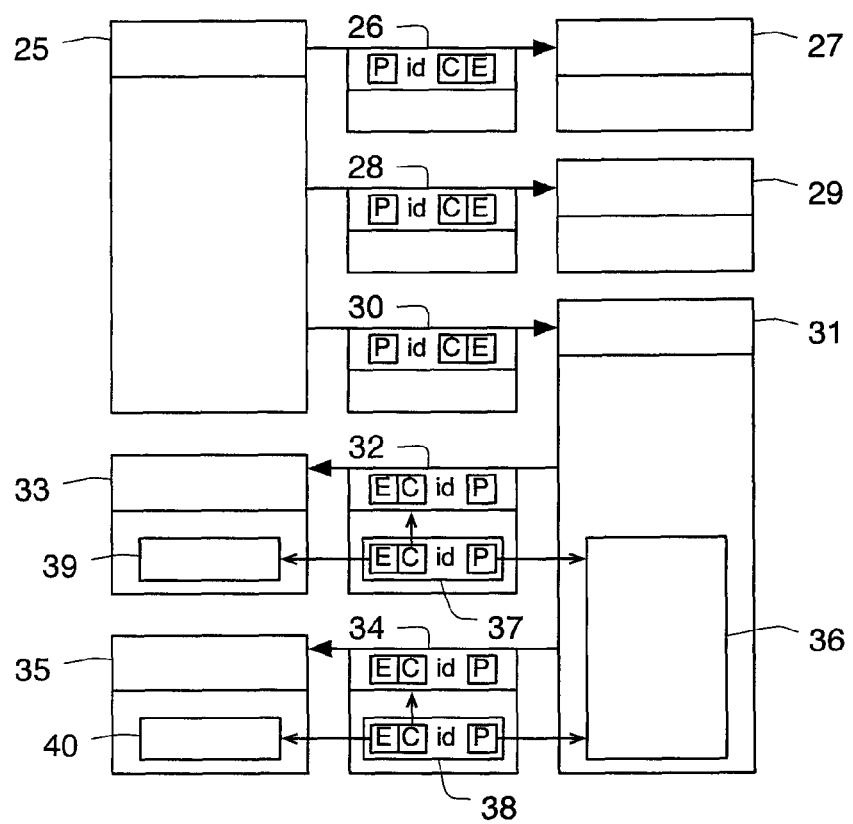
FIG. 19 illustrates the adjunction of a Content 36 in a Model.

Entering information into the System is achieved by creating Links. Generally, a Container creates a new Content by creating a Link for each of its required ParentRelations, called "mandatory". In FIG. 19, the Container "Address" 31 creates a new Content 36, namely a new address, by creating a Link 37 resp. 38 for each of its ParentRelations 32 resp. 34. But how can the Contents 36, 39, 40 and their respective Containers 31, 33, 35 be represented by Links?

Figure 20:
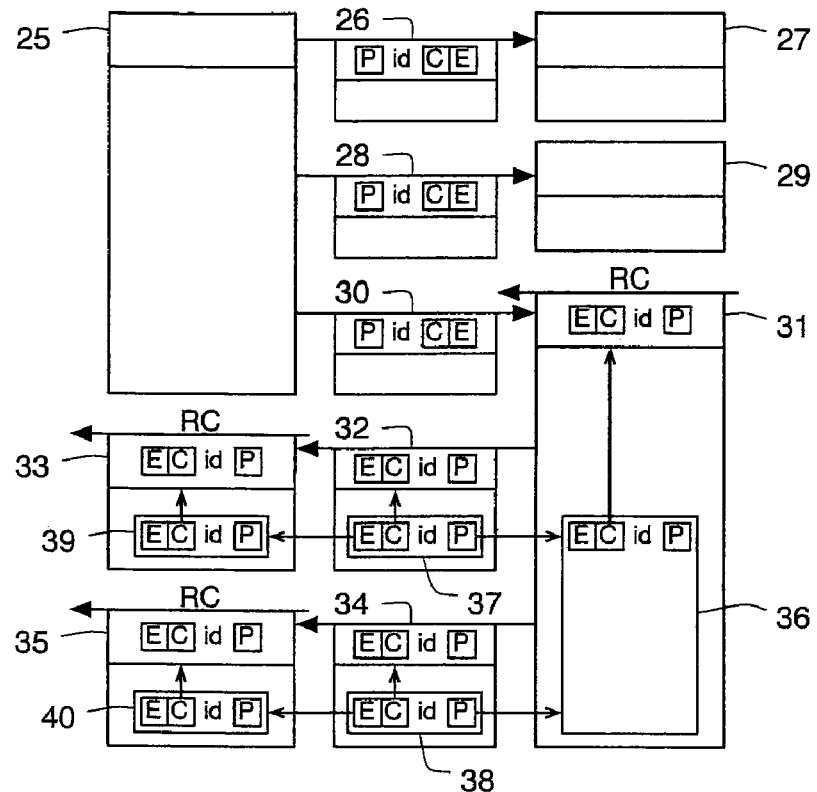
FIG. 20 illustrates the role of the Relations RC.

The method can represent a Container and its Contents by a particular Relation, called Relation RC. In FIG. 20, the Containers "Address" 31, "Place" 33 and "Street" 35 are identified by three Relations RC. Hence, the Contents 36, 39 and 40 are identified by Links. If the Link 39 represents for example the Place Paris, how can the data "PARIS" actually be represented by Links?

Figure 21:
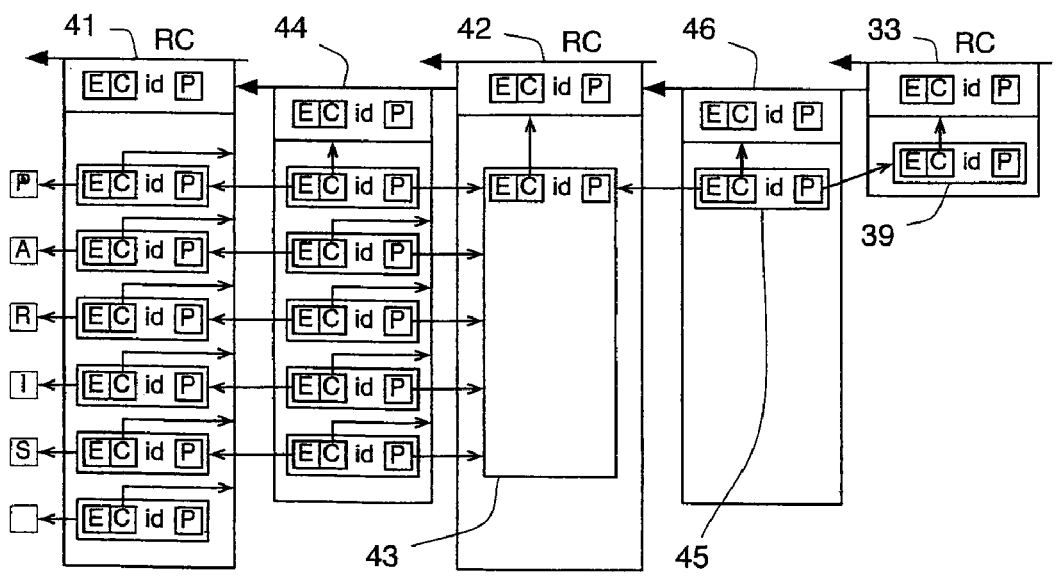
FIG. 21 illustrates an implicit representation of characters through Links.

In a first embodiment illustrated by FIG. 21, the Container "Character" represented by the Relation RC 41 implicitly makes its Contents (the id of its Links) correspond to UNICODE characters, here P, A, R, I and S. The Container "Word" represented by the Relation RC 42 creates the Content 43 which identifies the word "PARIS" through Links of its ParentRelation "characters" 44. The Container "Place" 33 connects its Content 39 to the word "PARIS" 43 through the Link 45 of its ParentRelation "word" 46. Thus, all the Links contained by "Character" 41 correspond to a set of characters, in other words Link identification zone (part of the possible values of id) is reserved to the codes of a set of characters.

Figure 22:
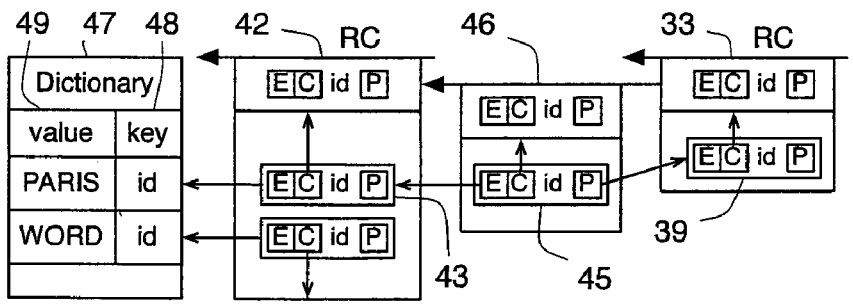
FIG. 22 illustrates an implicit representation of the keys of a dictionary through Links.

In a second embodiment illustrated by FIG. 22, the Container "Word" represented by the Relation RC 42 implicitly makes its Contents (the id of its Links) correspond to the keys 48 of a dictionary 47 whose values 49 represent words. The word "PARIS" is identified by the id of the Link 43, this id being identical to the key 48 identifying the value "PARIS". Hence, a set of Links corresponds implicitly to a set of values, that is to say the distinct words of a dictionary. A Link identification zone is reserved for the keys of the dictionary.

Figure 23:
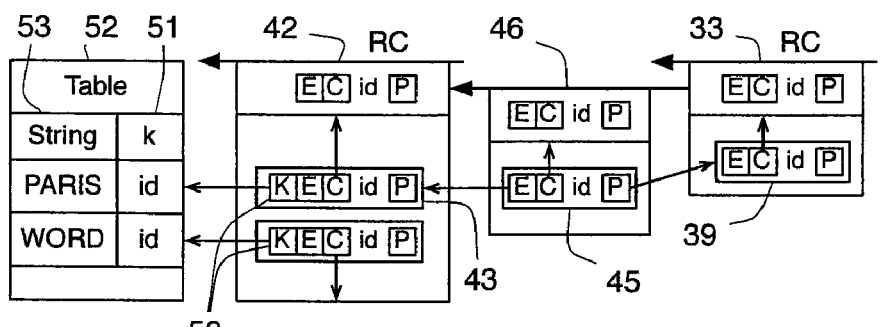
FIG. 23 illustrates an explicit representation of the records of a table through Links.

In a third embodiment illustrated by FIG. 23, the Container "Word" 42 explicitly makes its Contents be referenced through a reference K 50 put in relation with the column K 51 of an external Table 52 which stores the data "PARIS" in another column 53. An explicit reference requires the adjunction of an additional attribute 50 to the Link. An explicit references makes it possible to open the System onto external data structures and to synchronize the System with existing data maintained externally: an application, a file system, a database, a conventional RDBMS, etc. An explicit reference also allows the information maintained by the System outwards, for example towards a Web server, to be synchronized.

Figure 24:
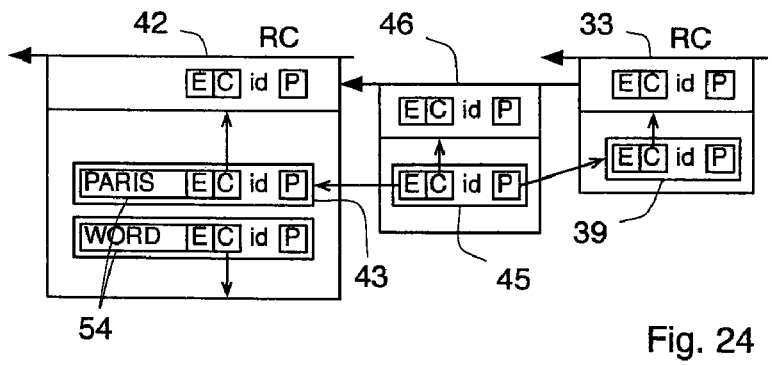
FIG. 24 illustrates an explicit representation of data integrated in the Link structure.

In a fourth embodiment illustrated by FIG. 24, the Contents of "Word" 42 explicitly store the data "PARIS" in a field 54 of the structure of the Link provided to this effect. Different types of data such as numbers, memory addresses etc. could be stored explicitly in the Links.

The Link structure can be provided with other reserved attributes, depending on the specific implementation of the method. For example: attributes for typifying the Links, for marking certain Links as being "static" or "system", for indicating whether the Link is active or not, for indicating access rights, for protecting certain Links against being accidentally deleted or modified, for managing sorting conditions, for managing coefficients of solicitation frequency, of trust and plausibility, of synaptic weight and/or ranking indices of the Link. In one embodiment, it is also possible to create Links of the "fuzzy" type with a coefficient indicating the intensity of the Link. A coefficient of 1.0 indicates for example an established connection whilst a coefficient of 0.2 indicates a connection between two Contents that is only probable. Other complex Links, for example differentiating or integrating Links, or conditional Links depending on a condition internal or external to the System, can also be defined in the frame of the invention. Other attributes useful for managing multiple Selections, for their propagation of Links to Links, could be part of the Link structure. Certain attributes are stored, others exist as soon as a Link is loaded in the memory.

By adding temporal attributes to the Link, it is possible to determine the instant when the connection between the ParentContent and the ChildContent is activated (beginning of activation) and/or the instant when the connection is no longer activated (end of activation) and/or to determine a period of activation.

Figure 25:
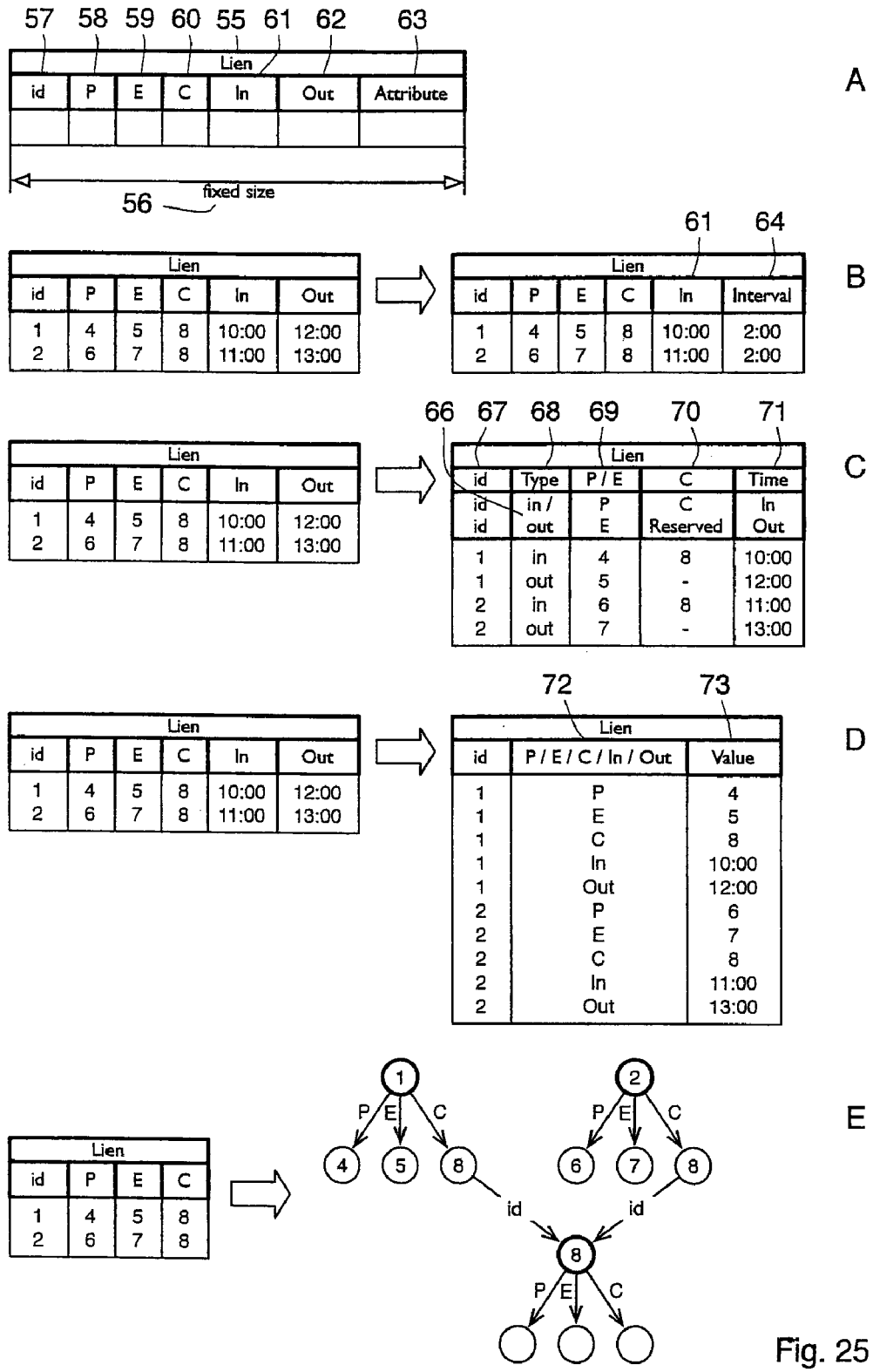
FIG. 25 illustrates different kinds of storing of the Link's main attributes.

FIG. 25 shows different forms of storing of the main attributes constituting the Link structure. A Link 55 is preferably a data structure of fixed size 56, easier and more efficient to process and to store. The Link structure is constituted of a unique identifier id 57, of a reference on the unique identifier of a ParentContent P 58, of a reference on the unique identifier of a ChildContent E 59, and of a reference on the unique identifier of its Container C 60. Preferably, the Link further contains at least a beginning of activation In 61 and at least an end of activation Out 62, as well as possibly other attributes 63 reserved for a specific implementation. The unique identifier of the Link and its three references (ParentContent, ChildContent and Container) can be represented by four distinct fields or by any appropriate data structure with any number of fields, including by triplets (FIG. 25-D), vectors (FIG. 25-E), etc.

A complete system is described by a collection of Links that regroups all the information in a unique structure, extremely simple. The information is accessed by a set of simple requests, very repetitive, similar, addressed to the Links Base. It is thus possible to make highly optimized information processing machines. To improve the processing efficiency of the Links Base, these attributes are preferably of numerical type, they store integers, and some are automatically indexed.

The temporal attributes can be defined (FIG. 25-B) by a beginning of activation In 61 and a period 64. It is also possible to store several disjointed activation periods. The Links can be divided into two types 68 (FIG. 25-C), "in" and "out" 66. The Contents field P/E 69 indicates a reference P on a ParentContent if the type is "in" 66 or it indicates a reference E on a ChildContent if the type is "out" 66. The field C 70 references the Container C if the type is "in" 66. The field Time 71 indicates the beginning of activation In if the type is "in" 66, and the end of activation Out of the Link if the type is "out" 66. Another embodiment illustrated by FIG. 25-D indicates the attribute 72 in a field, and its value 73 in another.

Editing information consists in making and unmaking Links. For example, deleting a Content x generally consists in:
1. unmaking all the Links in each of the ParentRelations of its Container whose reference P points this Content x,
2. unmaking all the Links of each of the ChildRelations of its Container whose reference E points this Content x,
3. unmaking the Link representing this Content x.

Figure 26:
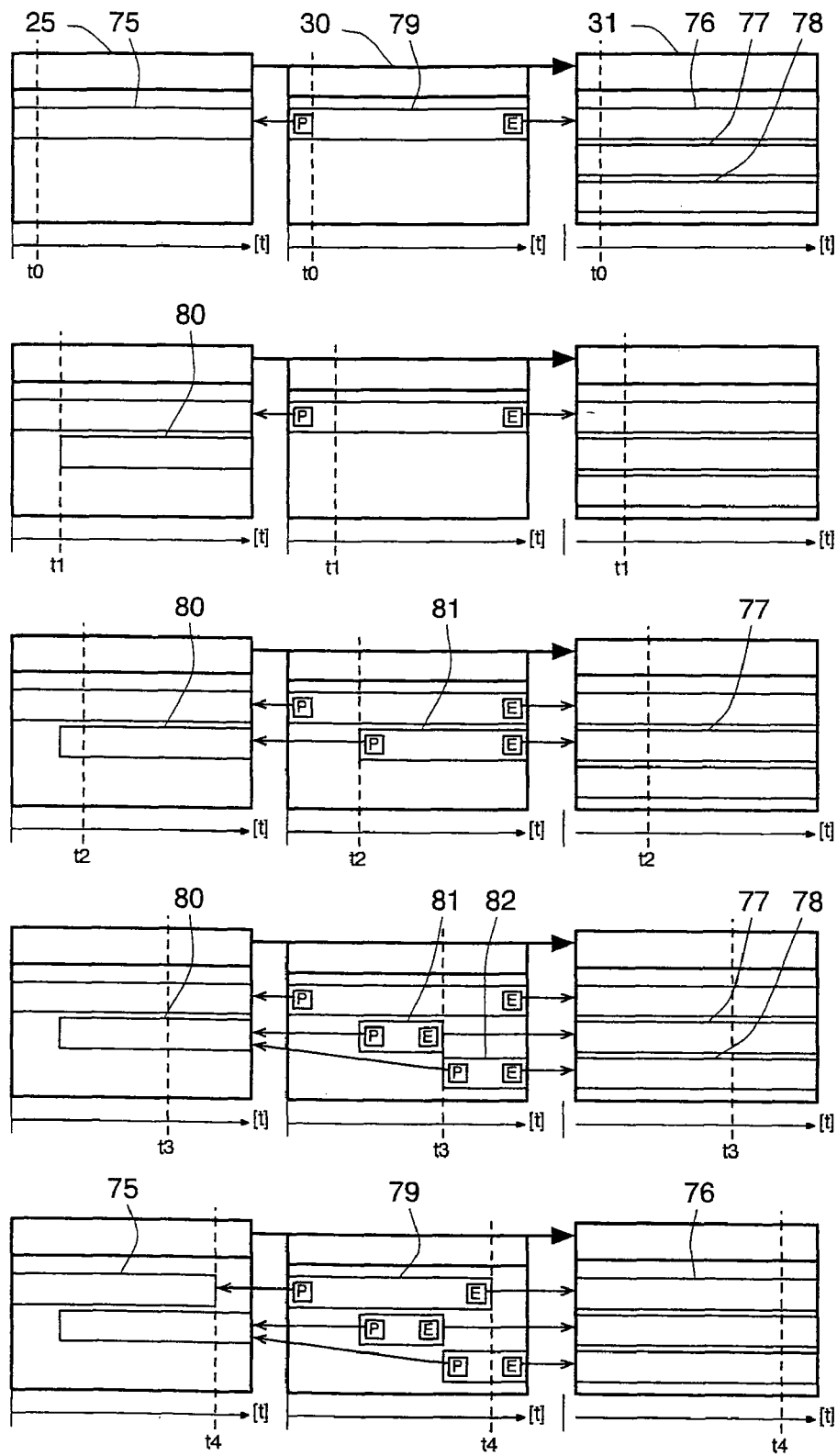
FIG. 26 illustrates the three operations of editing (creating, modifying and deleting) information by activating and/or deactivating Links.

However, instead of definitively deleting a Link, the method preferably uses the Link's temporal attributes to determine the Link's period of activation. To illustrate the three editing operations, namely creating, modifying and deleting information, FIG. 26 partly takes over the Model of FIG. 18, where the Container "Person" 25 is associated to the Content "Address" 31 by the Relation "address" 30. At the time t0 (FIG. 26-A), a Person 75 and three Addresses 76, 77 and 78 are already entered. The Person 75 is connected to the Address 76 by the Link 79. At the time t1 (FIG. 26-B), a new Person 80 is created, and at the time t2 (FIG. 26-C) it is connected to the Address 77 by the Link 81. At the time t3 (FIG. 26-D), a modify operation is performed, the Person 80 changes Address: the Link 81 is deactivated, which breaks the connection with the Address 77, and a new Link 82 is created to establish a new connection with the Address 78. At the time t4 (FIG. 26-E), a delete operation is performed, the Person 75 is deleted: the Link 79 as well as the Link 75 identifying the Person are deactivated.

Figure 27:
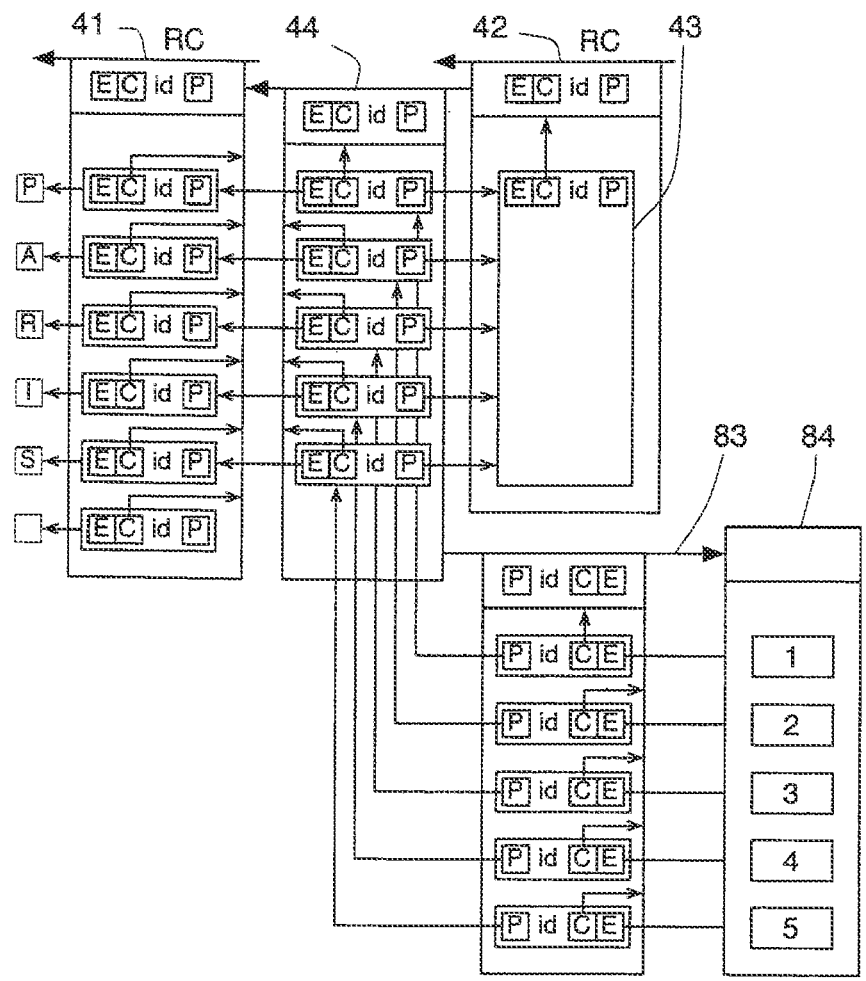
FIG. 27 illustrates a Relation 83 associating a Relation 44 to a Container 84.
Figure 28:
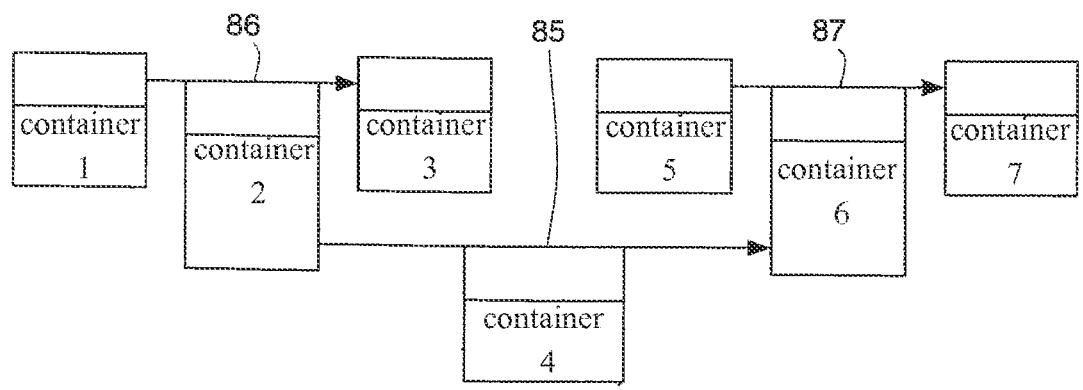
FIG. 28 illustrates a Relation 85 associating a Relation 86 to a Relation 87.

In the example illustrated by FIG. 21, the Container "Word" 42 is defined by the ParentRelation "characters" 44 on the Container "Character" 41. The Content "Paris" 43 is constituted of a series of Links connecting the letters P, A, R, I and S, but the order of the letters is not indicated. FIG. 27 illustrates a possibility of representing the order of the letters by the Relation "order" 83 on the Container "Number" 84. It is said that a Relation associates two Containers, but a Relation is also a Container. The Relation "order" 83 associates, for example, a Relation ("characters" 44) to a Container ("Number" 84). Another example, illustrated by FIG. 28, shows a Relation 85 that associates two Relations 86 and 87. In this case, the Relation 85 will be said to be a ParentRelation of the Relation 86 and a ChildRelation of the Relation 87.

Deleting or unmaking a Link x of a Relation generally consists in:
1. unmaking all the Links of each of the ParentRelations of this Relation whose reference P points this Link x,
2. unmaking all the Links of each of the ChildRelations of this Relation whose reference E points this Link x,
3. unmaking the Link x.

Figure 29:
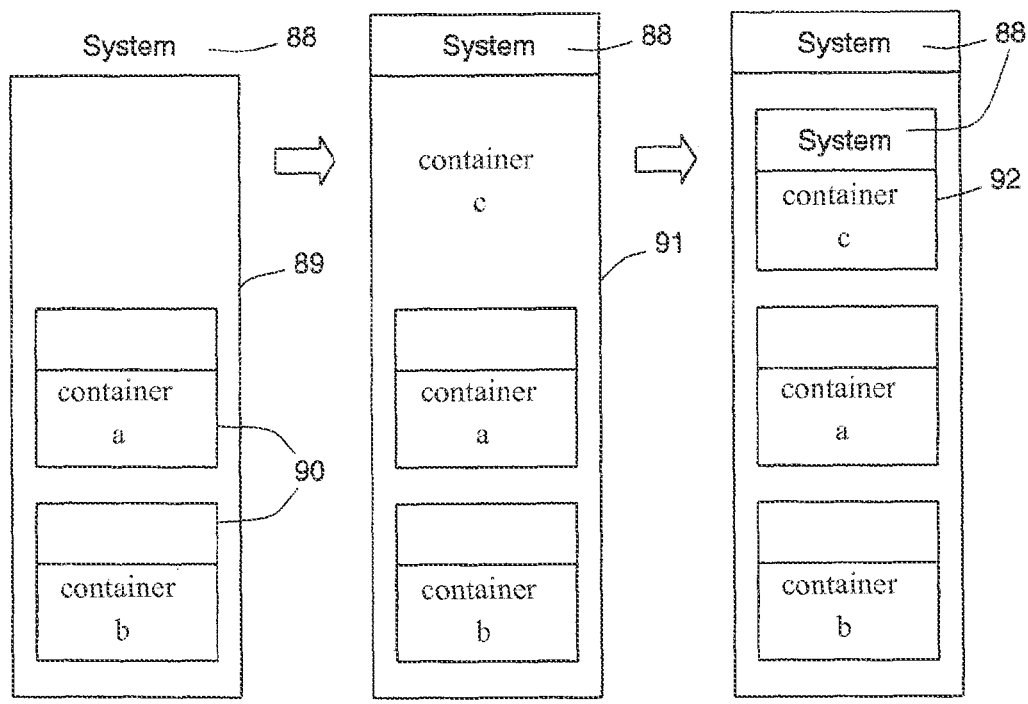
FIG. 29 illustrates a System's re-entrance faculty.

A Kernel allows a so-called self-described, self-sustaining and re-entering information processing System to be used. A System is self-described because it uses no element external to itself to define itself, it processes Links and is defined by Links. A System is self-sustaining because it is capable of improving the Models it creates as well as to improve itself, i.e. to improve and enrich the Model from which it is booted, called Kernel. Hence, the System can cause the Kernel to increase towards more sophisticated versions and a second generation of Kernel to be introduced. A System 88, illustrated in FIG. 29, is re-entering because it represents a set 89 of Containers 90, it is itself a Container 91, and it contains itself 92. The System itself is uniquely identified by a Link. The particular structure of the Link and the creation of Kernels are thus strongly linked.

Creation of a Nine-Link Kernel

Figure 30:
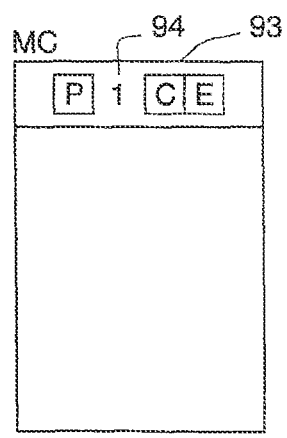
FIG. 30 illustrates the first Link of a 9-Link Kernel.
Figure 31:
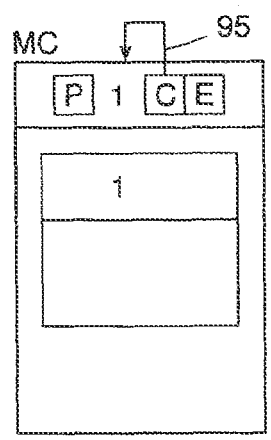
FIG. 31 illustrates the re-entrance of a 9-Link Kernel.
Figure 32:
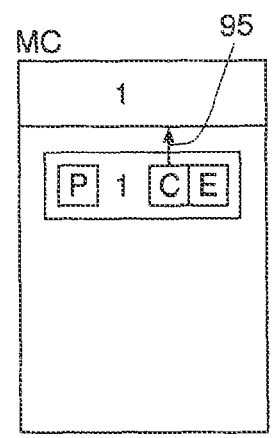
FIG. 32 illustrates the re-entrance of a 9-Link Kernel seen differently.
Figure 33:
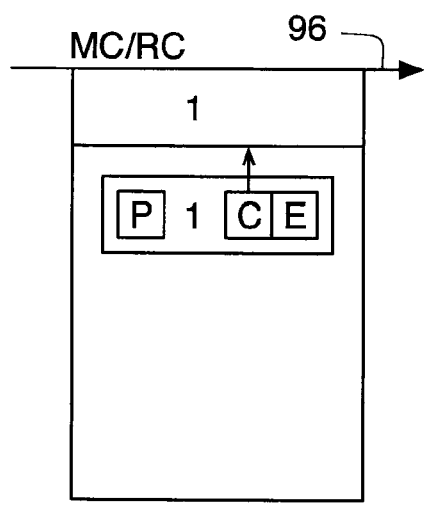
FIG. 33 illustrates a 9-Link Kernel still incomplete.
Figure 34:
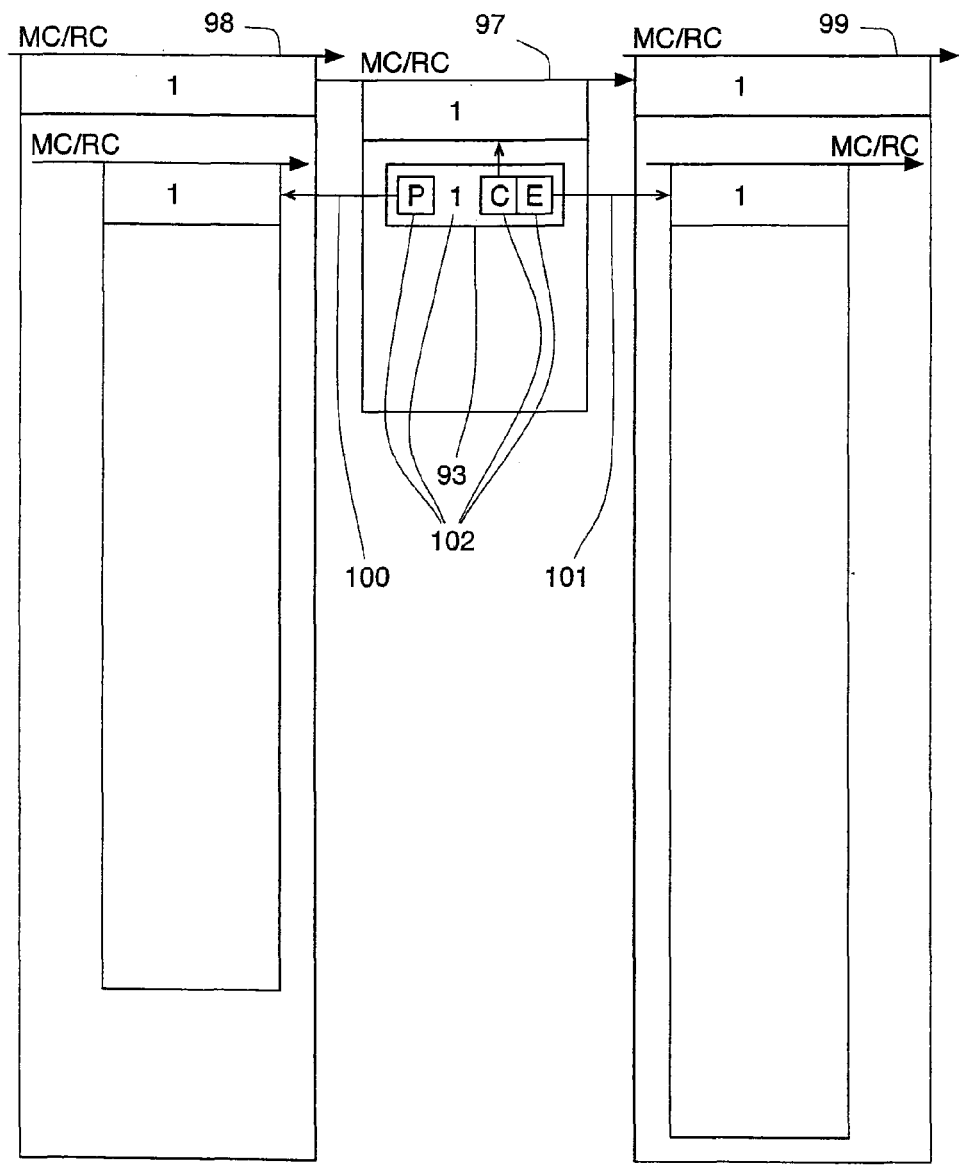
FIG. 34 illustrates a 9-Link Kernel still incomplete.

The System is represented by a ContainersContainer called the MetaContainer MC. In the beginning (FIG. 30), the MetaContainer MC is the only information, it is the first Link 93 of the Kernel, it is identified with the id "1" 94. The re-entrance faculty (FIG. 31) of the Link 95 gives the MetaContainer MC the faculty of containing itself or of being contained by itself (FIG. 32); but it does not have knowledge of itself, it does not know that it contains itself, it does not exist yet. According to the first postulate, any information exists only in relation with other information. If there is only one information, this only information then represents a relation and at the same time the information said relation serves to connect. Thus, the MetaContainer MC represents a Relation and simultaneously the Containers that said Relation serves to associate. And a Relation serving to represent a Container is a Relation RC, whose MetaContainer MC (FIG. 33) is a Relation RC 96, it is renamed Relation MC/RC. A Relation RC 97 (FIG. 34) associates two Containers: the ParentContainer is the Relation RC itself 98 and the ChildContainer is the Container 99 of the Relation RC 97 (the Container of the Relation MC/RC is itself since it contains itself), so that 100 the ParentContent of a Affiliation Link references the id of this same Affiliation Link, and so that 101 the ChildContent of a Affiliation Link references the id of the Link identifying the Relation RC. The first Link of the Kernel 93, called Re-Entering Initial Link, can now be totally informed 102. The Re-Entering Initial Link identifies the System used by this Kernel.

But the information specifying which is the ParentContainer 98 and which is the ChildContainer 99 of the Relation MC/RC 97 is not explicitly described, the Kernel is not yet totally self-described. At least eight Links are required to express the missing information.

Figure 35:
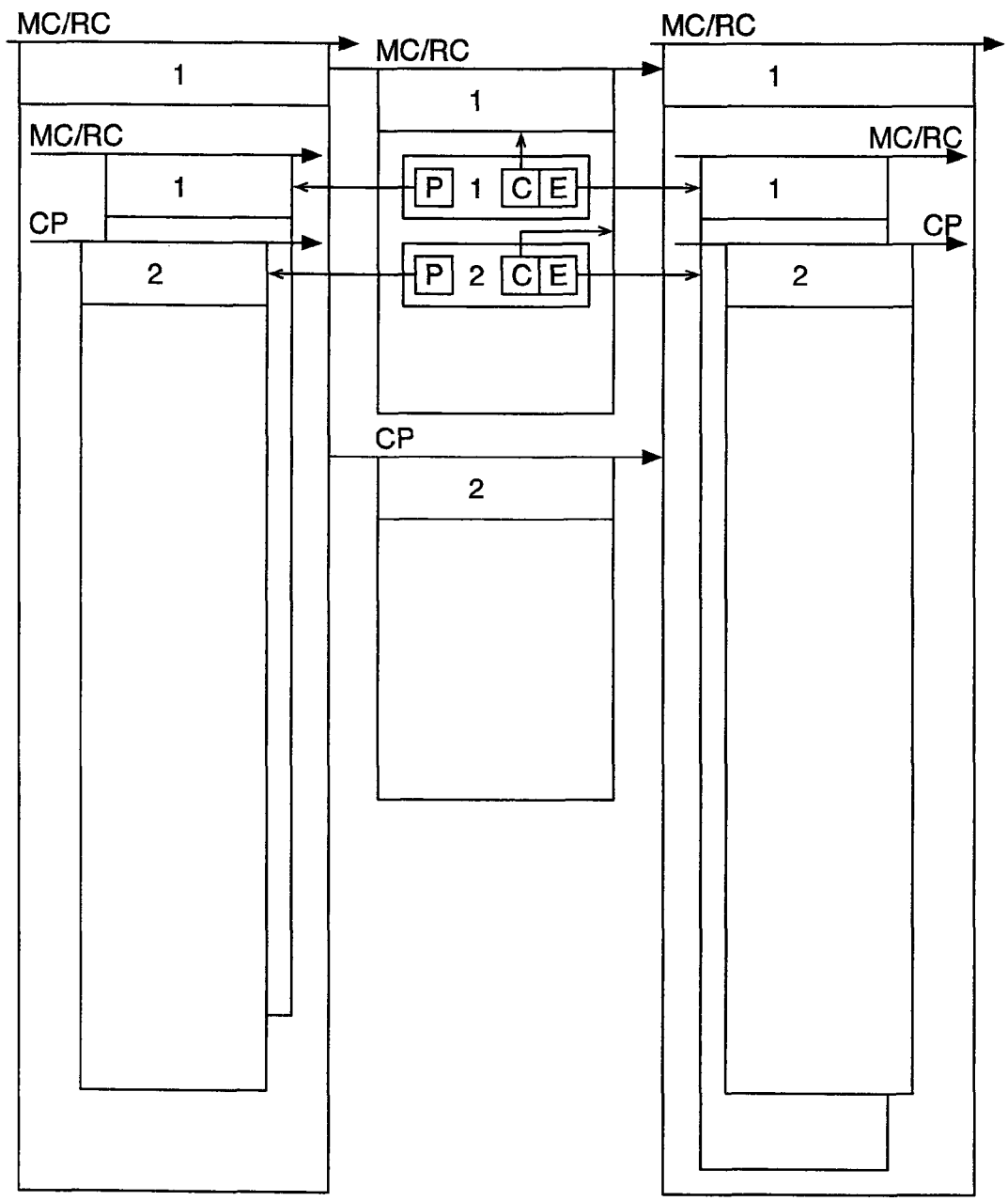
FIG. 35 illustrates a 9-Link Kernel still incomplete.
Figure 36:
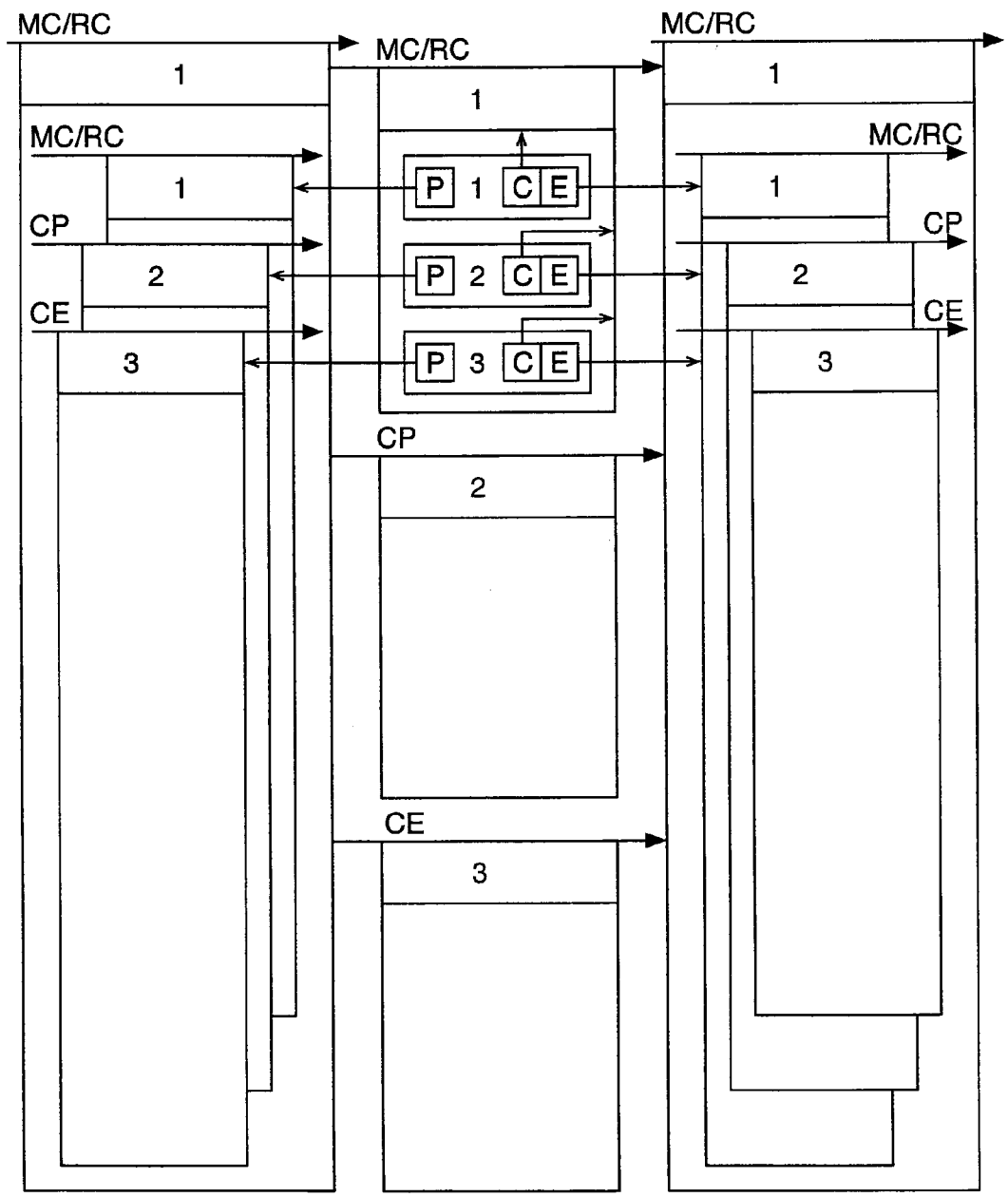
FIG. 36 illustrates a 9-Link Kernel still incomplete.
Figure 37:
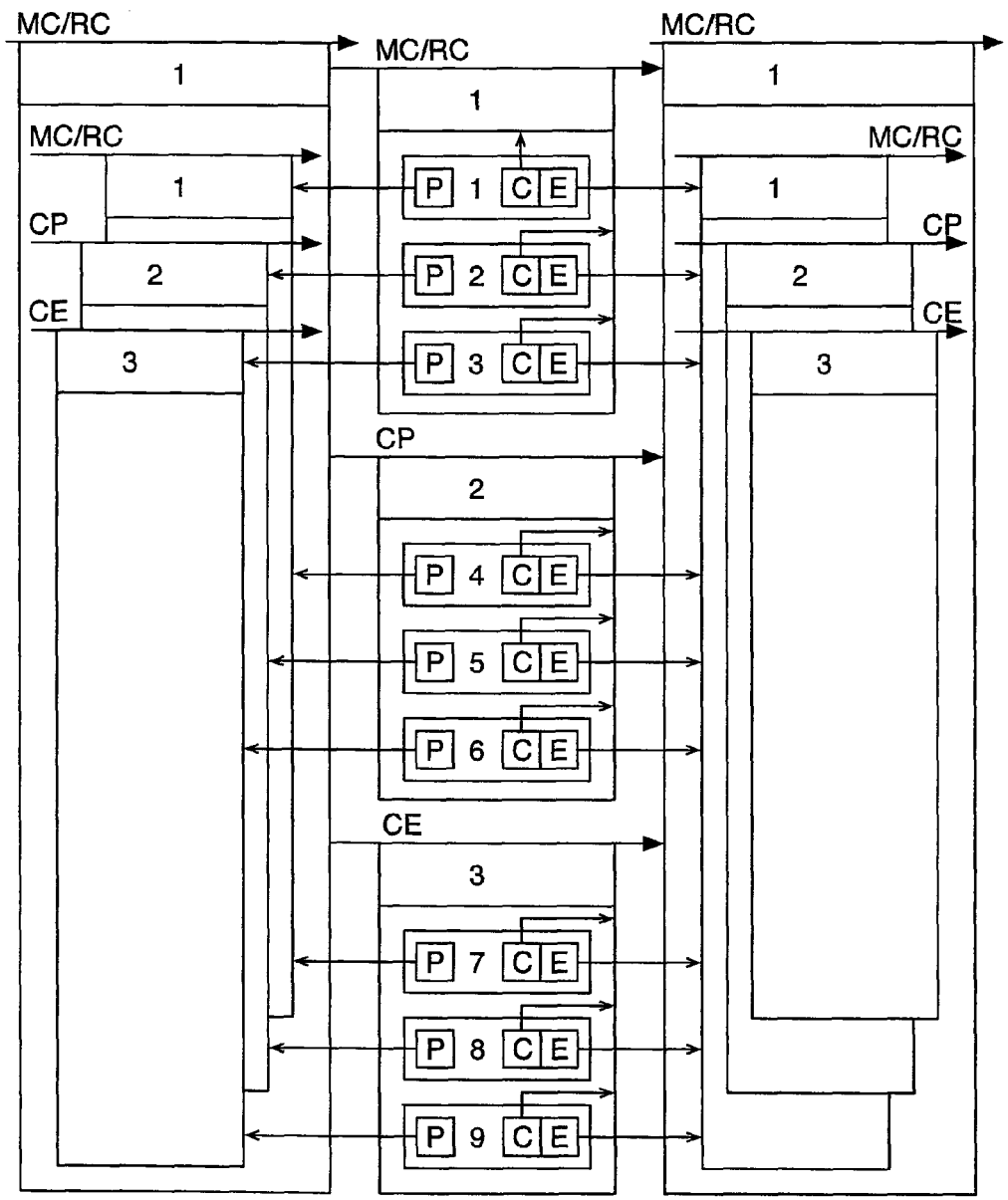
FIG. 37 illustrates a complete 9-Link Kernel.

The Relation MC/RC is a Container which contains a Relation (itself), the Relation MC/RC thus represents the Kernel's RelationsContainer. At least two ParentRelations are necessary to a RelationsContainer to define its Relations: the Relation CP which designates the ParentContainer and the Relation CE which designates the ChildContainer of a Relation. FIG. 35 illustrates the adjunction of the Relation CP, identified by the Link "2". FIG. 36 illustrates the adjunction of the Relation CE, identified by the Link "3". The System's RelationsContainer, the Relation MC/RC, now contains three Relations: itself (Link "1"), the Relation CP (Link "2") and the Relation CE (Link "3"). These three Relations are recursively defined by the Relations CP and CE which specify for each of them the ParentContainer and the ChildContainer they must associate, i.e. the adjunction of six further Links illustrated by FIG. 37:

the Link "4" indicates to the Relation MC/RC that its ParentContainer is the Relation MC/RC,
the Link "5" indicates to the Relation CP that its ParentContainer is the Relation MC/RC,
the Link "6" indicates to the Relation CE that its ParentContainer is the Relation MC/RC,
the Link "7" indicates to the Relation MC/RC that its ChildContainer is the Relation MC/RC,
the Link "8" indicates to the Relation CP that its ChildContainer is the Relation MC/RC,
the Link "9" indicates to the Relation CE that its ChildContainer is the Relation MC/RC.

Figure 38:
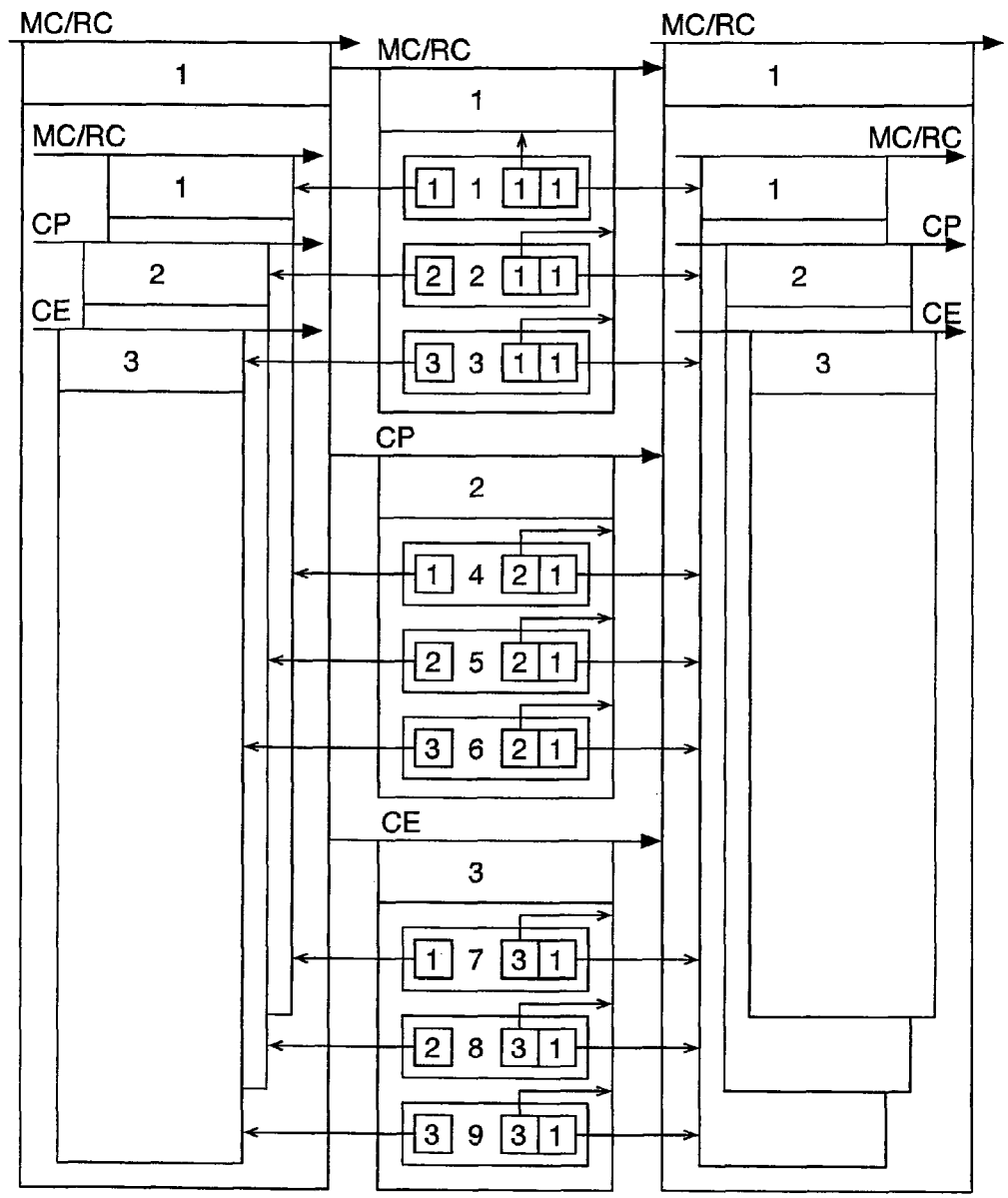
FIG. 38 illustrates a complete 9-Link Kernel where each Container and each Content is represented by a Link.
Figure 39:
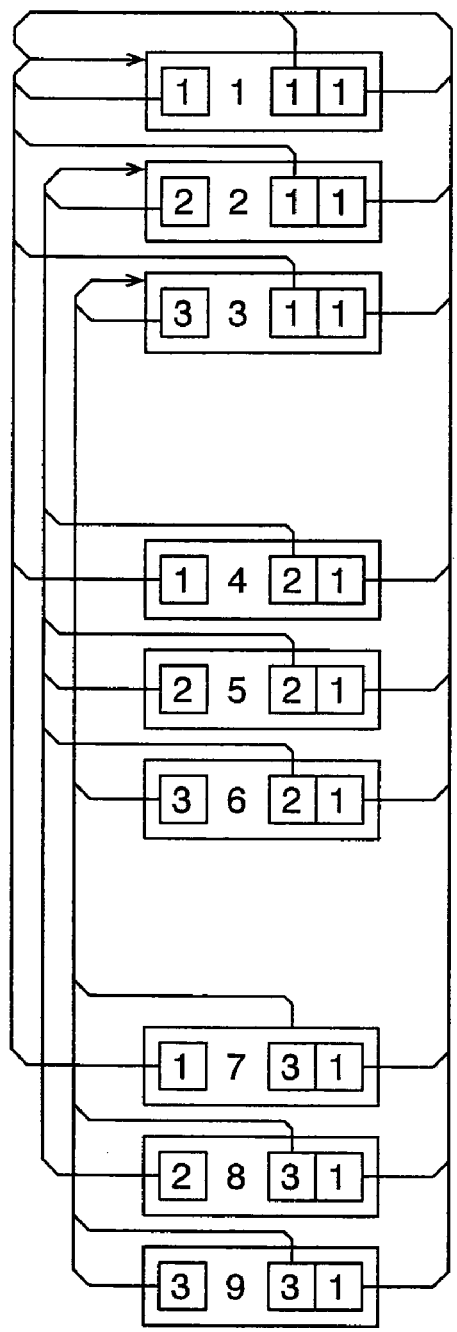
FIG. 39 illustrates a complete 9-Link Kernel without its diagrammatic representation.

The attributes of each Link are totally informed (FIG. 38). The elementary nine-Link Kernel has all the described properties, it is self-described, self-sustaining and re-entering. FIG. 39 illustrates the nine-Link Kernel without the diagrammatic representation illustrating the Relations, everything is described solely with the aid of interconnected Links.

Figure 40:
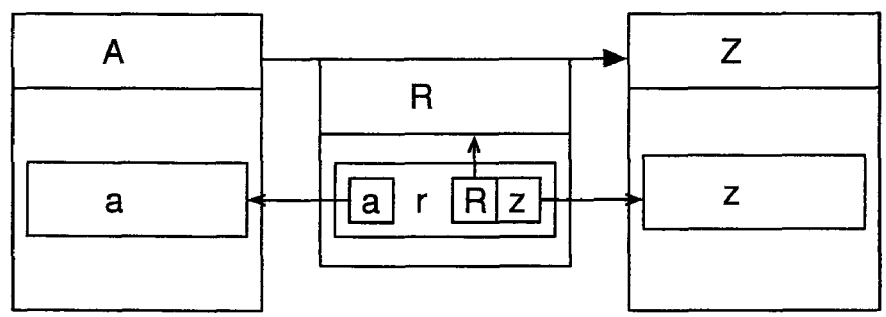
FIG. 40 illustrates diagrammatically a simple Model.
Figure 41:
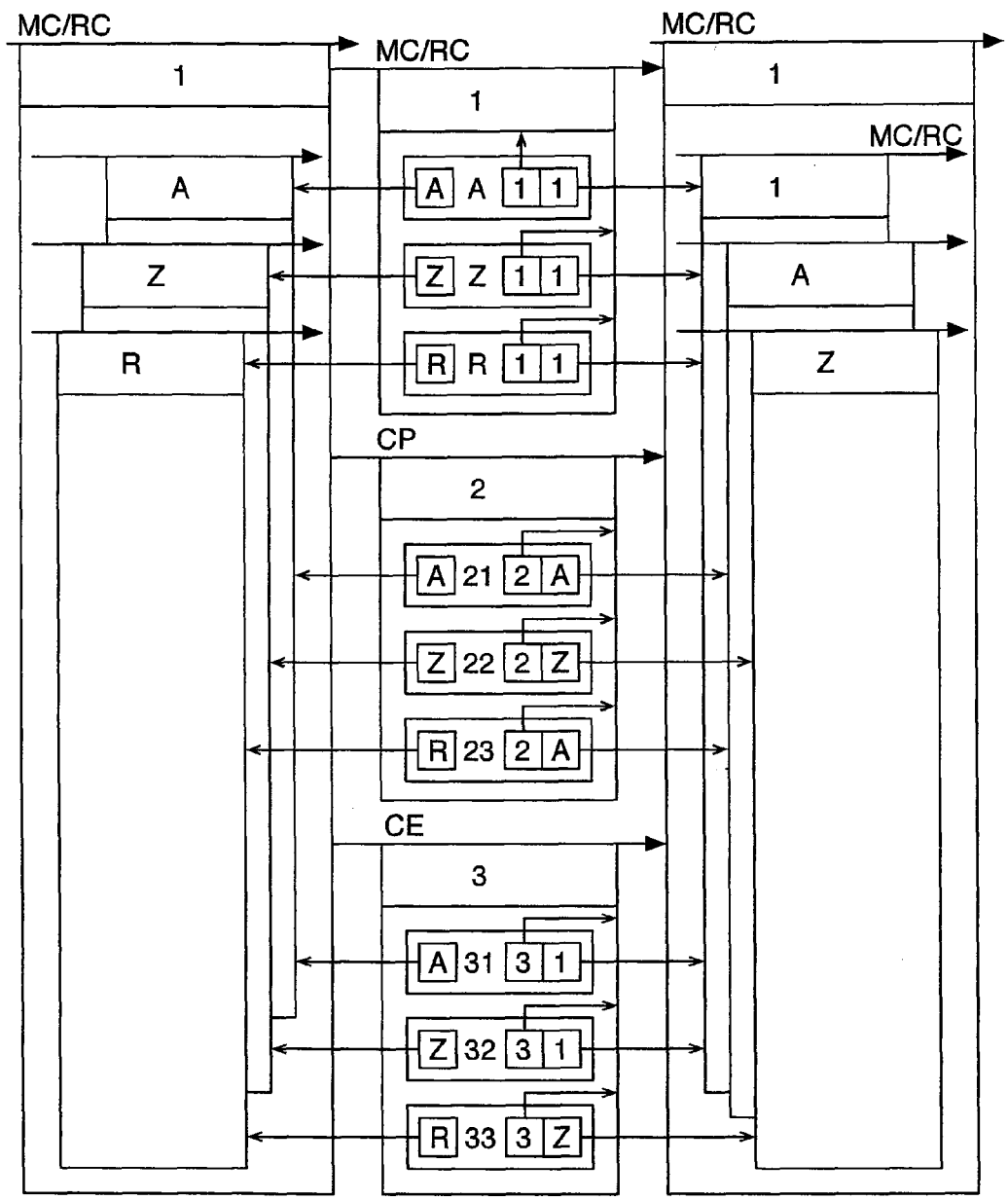
FIG. 41 illustrates the Links to be added to the 9-Link Kernel to represent the Model of FIG. 40.
Figure 42:
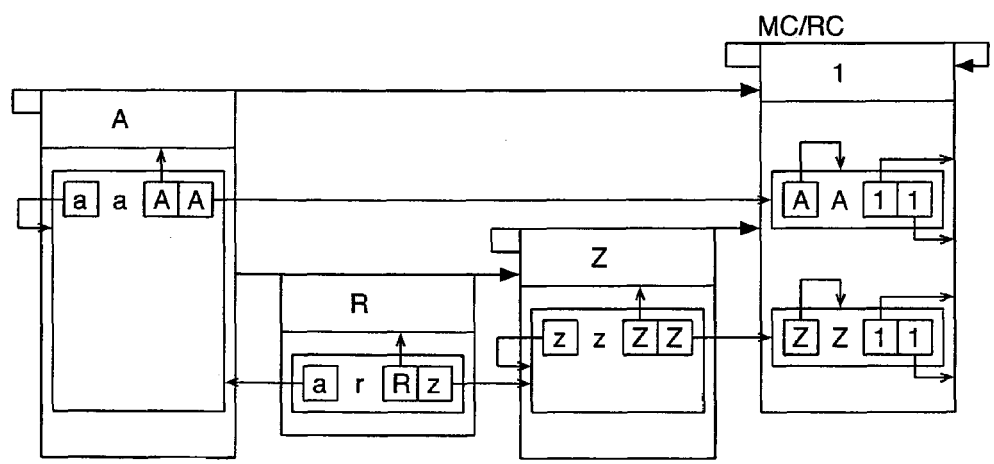
FIG. 42 redrafts the Model of FIG. 40 by illustrating the ParentContainer and the ChildContainer of the three Relations A, Z and R.

It is already possible to create simple Models, such as that illustrated by FIG. 40: a Container A associated to a Container Z by a Relation R, the Content a is connected to the Content z by the Link r. FIG. 41 illustrates the Links that must be added to the nine-Link Kernel to describe the Containers of this Model. The RelationsContainer MC/RC creates three Relations identified by the id A, Z and R. The Relations A and Z are Relations RC, they represent the Containers A and Z. The Links "21", "22" and "23" of the Relation CP indicate the ParentContainer of each of the three Relations A, Z and R. The Links "31", "32" and "33" of the Relation CE indicate the ChildContainer of each of the three Relations A, Z and R. FIG. 42 redrafts the Model by illustrating the ParentContainer and the ChildContainer of the three Relations A, Z and R. FIG. 42 also illustrates the Links that must be added to define the Contents of this Model: the Link a identifies a Content of A, the Link z identifies a Content of Z and the Link r connects these two Contents. The Contents and Containers, i.e. the information (including the meta-information), are only described by Links.

Figure 43:
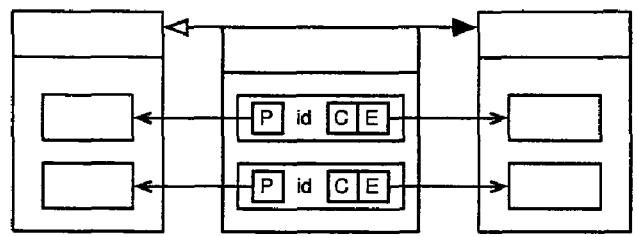
FIG. 43 illustrates the possible cardinalities of a Relation.
Figure 43:
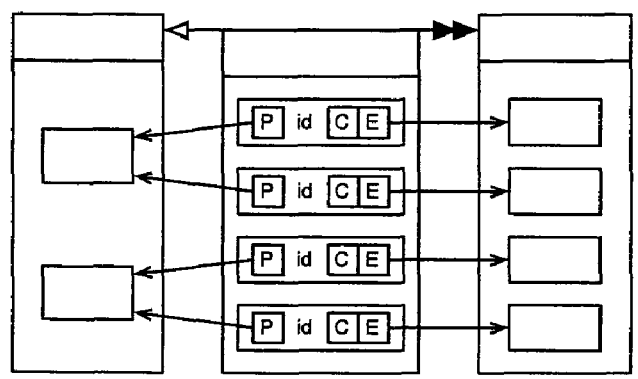
Figure 43:
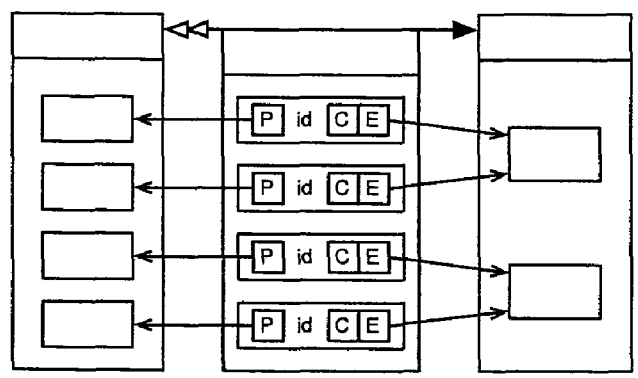
Figure 43:
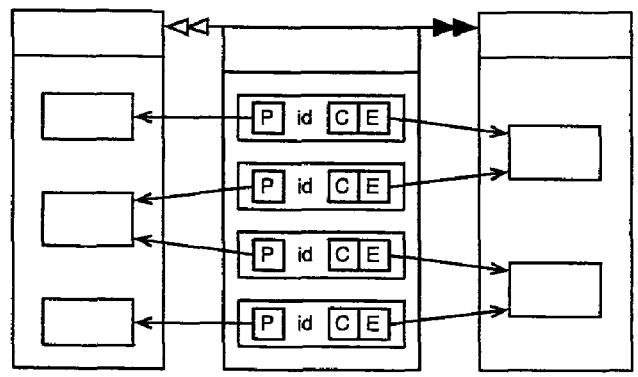

The nine-Link Kernel is self-sustaining, it is capable of improving and enriching its own definition by creating new Containers and new Relations. Furthermore, it must be enriched with certain properties to really allow the information to be modeled. The definition of the RelationsContainer MC/RC can be enriched with new Relations on new Containers in order to make the Relations' properties more precise, such as for example, for a Relation "X":

the names of the Relation "X",
by a Relation "Parentname" on the Container "RelationName", indicating the name of the Relation "X" as seen from its ParentContainer,
by a Relation "Childname" on the Container "RelationName", indicating the name of the Relation "X" seen from its ChildContainer,
the cardinality of the Relation "X",
by a Relation "cardinality" on the Container "Cardinality", indicating whether:
the Relation "X" is "FromOneToOne", whose ParentContent and ChildContent referenced by each of its Links is different (FIG. 43-A),
the Relation "X" is "FromOneToMany", whose ChildContent of each of its Links is different and whose ParentContent is indifferent (FIG. 43-B),
the Relation "X" is "FromManytoOne", whose ParentContent of each of its Links is different and whose ChildContent is indifferent (FIG. 43-C),
the Relation "X" is "FromManytoMany", whose ParentContent and ChildContent of each of its Links is indifferent (FIG. 43-D),
by a Relation "mandatory" on a "Boolean" Container, indicating whether the Relation "X" must create one or several Links for each of the Contents of its ParentContainer,
the behavior of the Relation "X",
by a Relation "inheritance" on a "Boolean" Container, indicating whether the ParentContents of the Relation "X", in case they also represent Containers, inherit the Relation "X",
by a Relation "constant" on a "Boolean" Container, indicating whether, during the creation of a new ParentContent, the Links of the Relation "X" constantly connect one or several ChildContents,
by a Relation "by default" on a "Boolean" Container, indicating whether, during the creation of a new ParentContent, the Links of the Relation "X" connect by default one or several ChildContents,
by a Relation "range" on a Container "Range", indicating the visibility of the Relation "X" (system, private, public . . . ),
by a Relation "semantics" on a Container "Semantics", indicating the semantics of the Relation "X" (is one, is composed of, . . . ),
by a Relation "composed Parents" on a Container "Composition", indicating the cardinality rules with other ParentRelations of the ParentContainer of the Relation "X",
by a Relation "composed Children" on a Container "Composition", indicating the cardinality rules with other ChildRelations of the ChildContainer of the Relation "X",
ordering or sorting information,
by a Relation "entering number" on a Container "Number" to indicate the order of indicating of the Relation "X" among the other ParentRelations when a new Content is entered,
by a Relation "order" on a Container "Number" to indicate the order of the Relation "X" among the other ParentRelations to reconstitute an information structure,
by a Relation "order" associating the Relation "X" to the Container "Number" to indicate the order of the ChildContents referenced by the Links of the Relation "X" (see FIG. 27),
etc.

Figure 44:
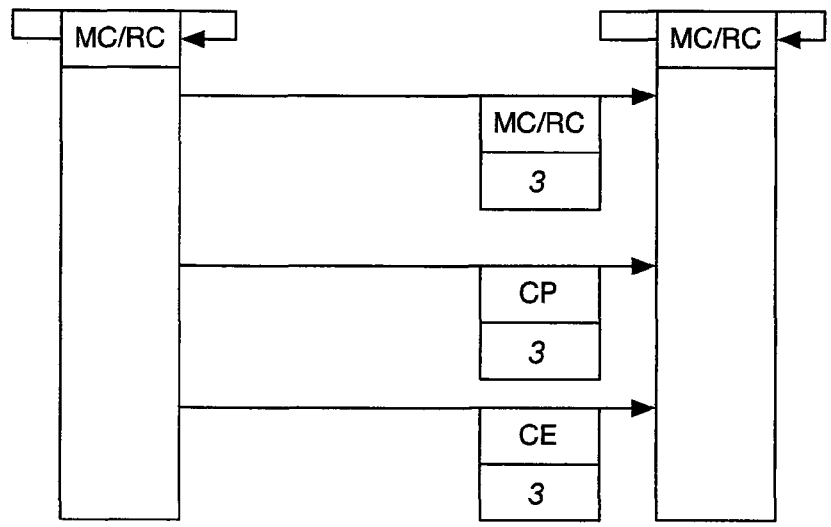
FIG. 44 illustrates a simplified diagrammatic representation of the 9-Link Kernel.
Figure 45:
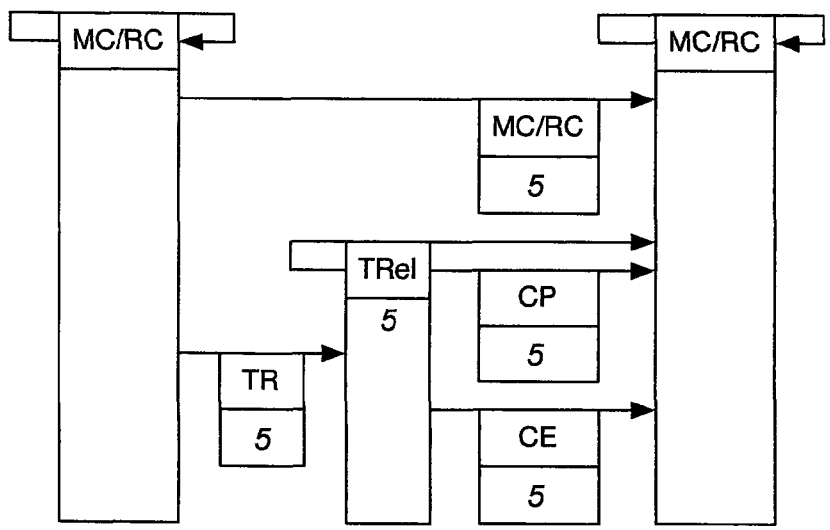
FIG. 45 illustrates the same 9-Link Kernel but depleted of an intermediary Container TRel.

The nine-Link Kernel can be depleted, in other words complexified, whilst remaining identical as to its functionality. FIG. 44 illustrates a simplified diagrammatic representation of the nine-Link Kernel, each of the three Relations MC/RC, CP and CE containing three Links. FIG. 45 represents this same Kernel, but depleted of an intermediary Container "TRel" which regroups a second time all the Kernel's Relations before defining them by the Relations CP and CE. Five Relations each containing five Links, i.e. twenty-five Links instead of nine, are necessary, hence a depletion of the Kernel.

Creation of a Fourteen-Link Kernel

Figure 46:
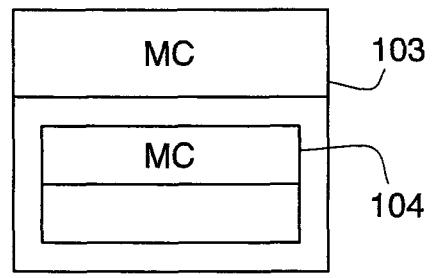
FIG. 46 illustrates the re-entrance of a 14-Link Kernel.
Figure 47:
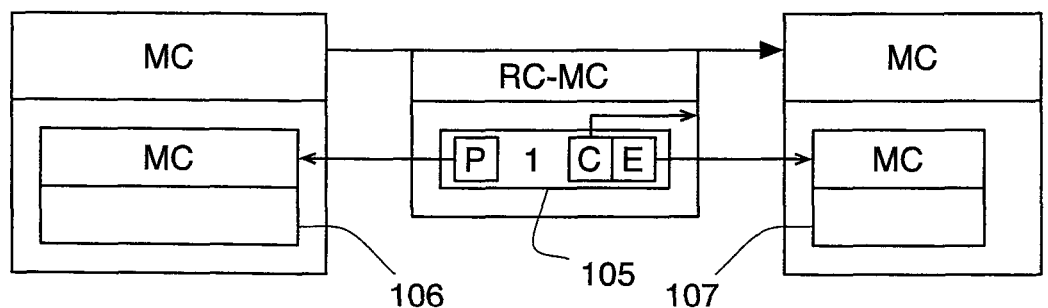
FIG. 47 illustrates the first Link 105 of a 14-Link Kernel.

In the beginning, there is the Containers' Container, called the MetaContainer MC (FIG. 46), it is at the same time Container 103 and Content 104, but it does not have knowledge of itself, it does not know that it contains itself, it does not exist yet. According to the first postulate, any information exists only in relation with other information. The only possible ParentRelation, allowing the MetaContainer MC to be defined, is the Relation the MetaContainer MC can have with itself. FIG. 47 illustrates the first Relation, called Relation RC-MC, it is a Relation RC. A Relation RC associates two Containers, so that the ChildContainer it associates to the ParentContainer is the latter's Container, so that each of its Affiliation Links indicates to the ParentContent to which Container it belongs. Hence, the first Link of the Kernel 105 indicates to the Content MC 106 that its Container is the MetaContainer MC 107, thus the MetaContainer MC has knowledge of itself, it now knows that its Container is itself, it knows it contains itself. The role of a Relation RC is also to identify, by its Affiliation, the Contents of its ParentContainer. Thus, this first Link 105, called Re-Entering Initial Link, identifies the MetaContainer MC, in other words the System constructs with this fourteen-Link Kernel.

But the information identifying the Relation RC-MC and specifying which is its ParentContainer and its ChildContainer is not explicitly described, the Kernel is not yet totally self-described. At least thirteen Links are required to express the missing information.

Figure 48:
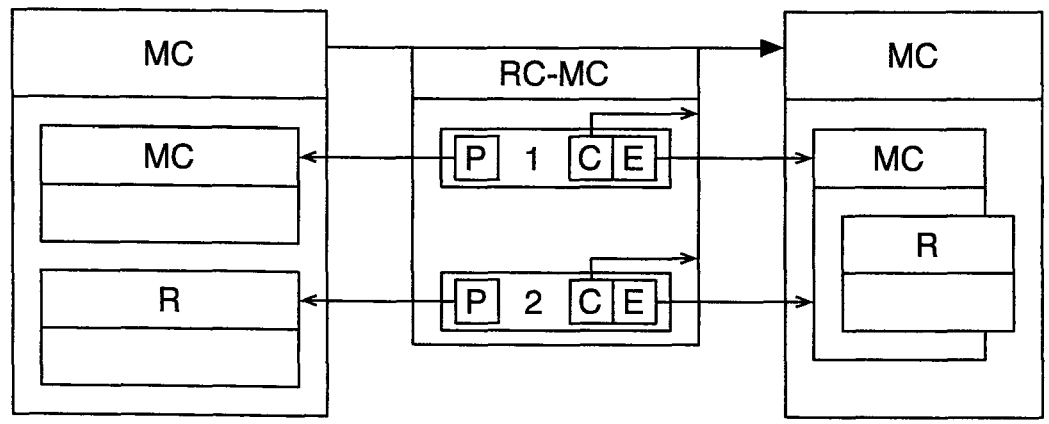
FIG. 48 illustrates the RelationsContainer R of the 14-Link Kernel.
Figure 49:
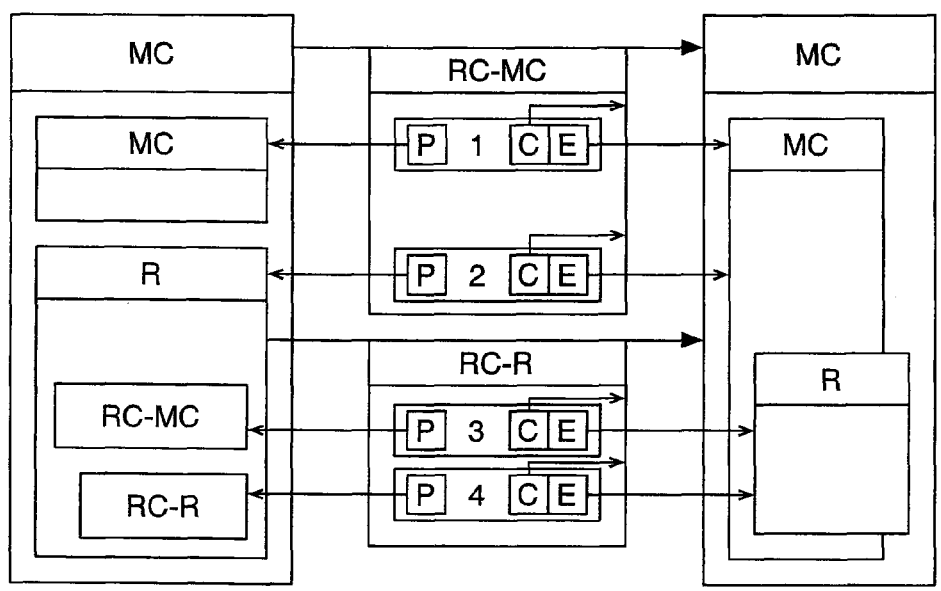
FIG. 49 illustrates the RelationsContainer R containing the two Relations RC-MC and RC-R already created.
Figure 50:
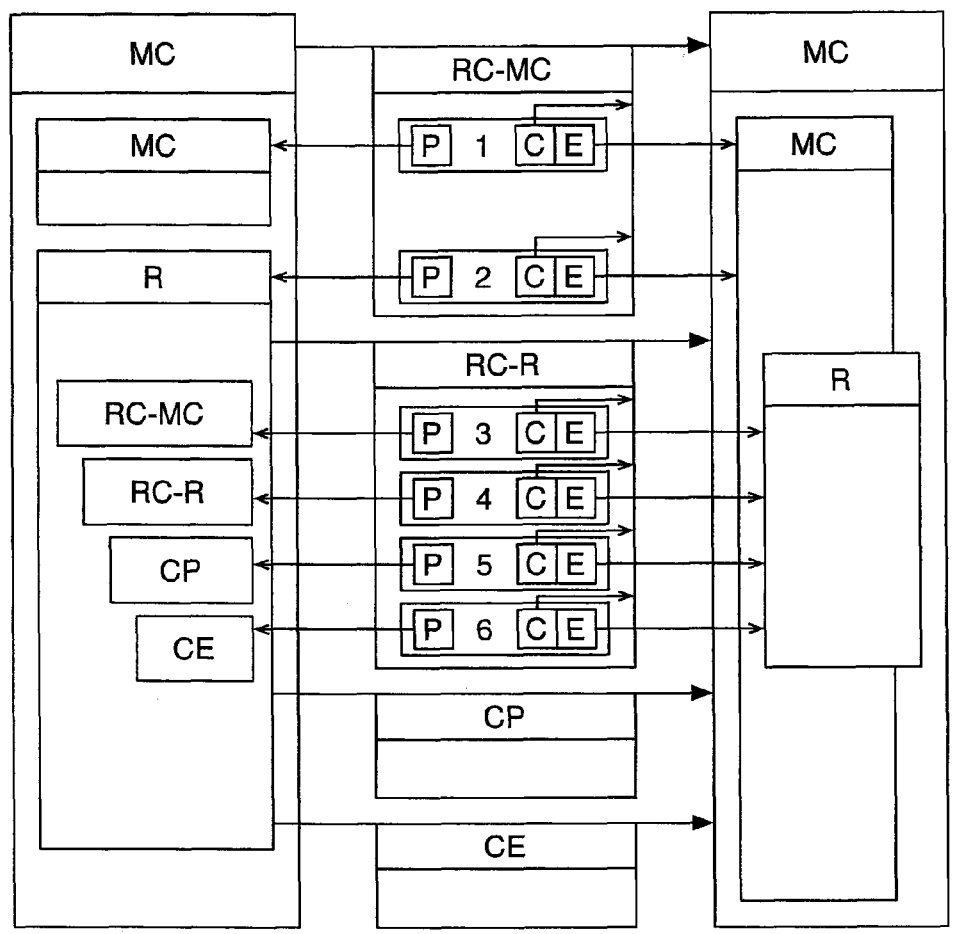
FIG. 50 illustrates the adjunction of the Relations CP and CE necessary for defining the RelationsContainer.
Figure 51:
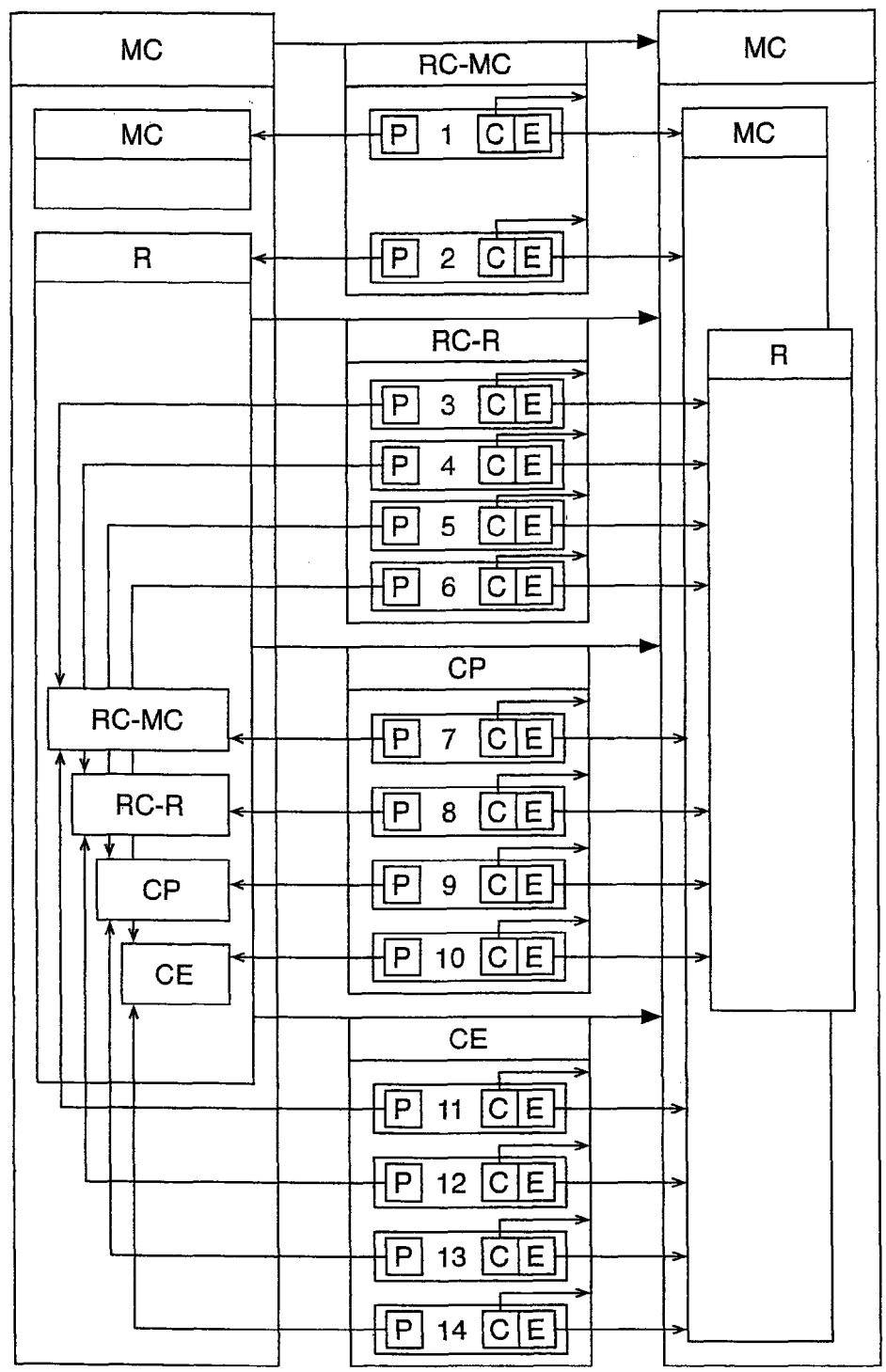
FIG. 51 illustrates a complete 14-Link Kernel.

It is necessary to define a RelationsContainer (FIG. 48), called R. The Link "2" indicates to the RelationsContainer R that its Container is MC. The Link "2" identifies the RelationsContainer R. The RelationsContainer R needs a ParentRelation RC-R (FIG. 49) to indicate to its Contents that their Container is R. The Relation RC-R identifies through its Affiliation Links the Contents of the RelationsContainer R. The Contents of the RelationsContainer R are Relations used to create this fourteen-Link Kernel. For the moment, the Kernel uses two Relations, RC-MC (identified by the Link "3") and RC-R (identified by the Link "4"). But at least two ParentRelations are still needed to define each Relation of the RelationsContainer (FIG. 50), the Relation CP (identified by the Link "5") to indicate the ParentContainer of each Relation, and the Relation CE (identified by the Link "6") to indicate the ChildContainer of each Relation. FIG. 51 illustrates the Links necessary to inform each of the four Relations:

the Link "7" indicates to the Relation RC-MC that its ParentContainer is the Container MC,
the Link "8" indicates to the Relation RC-R that its ParentContainer is the Container R,
the Link "9" indicates to the Relation CP that its ParentContainer is the Container R,
the Link "10" indicates to the Relation CE that its ParentContainer is the Container R,
the Link "11" indicates to the Relation RC-MC that its ChildContainer is the Container MC,
the Link "12" indicates to the Relation RC-R that its ChildContainer is the Container MC,
the Link "13" indicates to the Relation CP that its ChildContainer is the Container MC,
the Link "14" indicates to the Relation CE that its ChildContainer is the Container MC.

Figure 52:
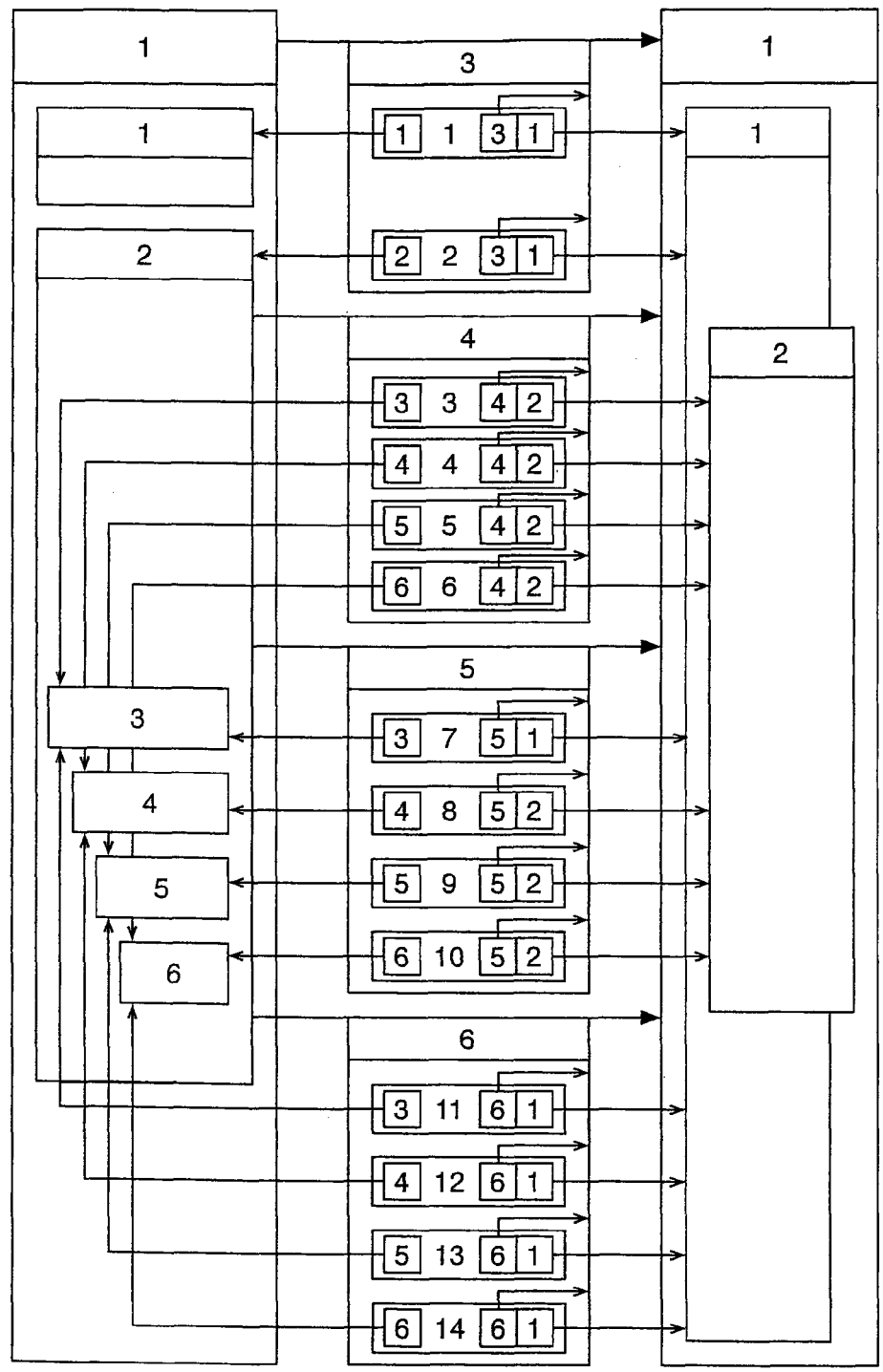
FIG. 52 illustrates a complete 14-Link Kernel where each Container and Content is represented by the id of the Link identifying them.
Figure 53:
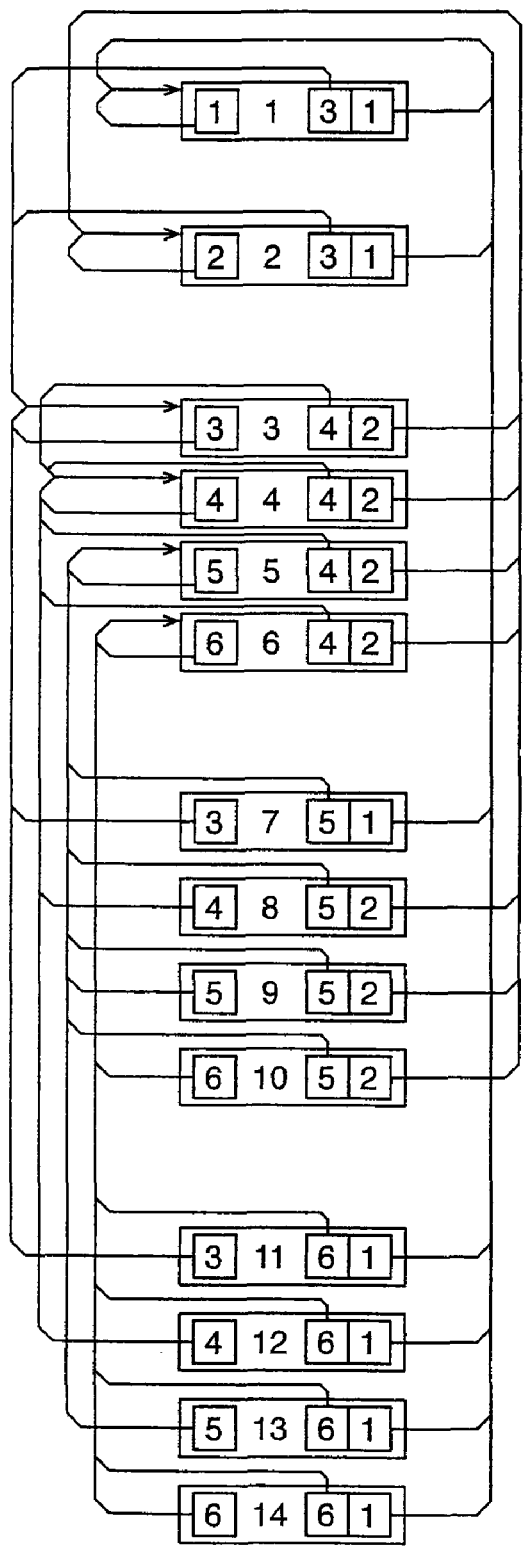
FIG. 53 illustrates a complete 14-Link Kernel without its diagrammatic representation.

The two Containers MC and R are identified by the Affiliation Links "1" and "2" of the Relation RC-MC, and the four Relations RC-MC, RC-R, CP and CE are identified by the Affiliation Links "3", "4", "5" and "6" of the Relation RC-R. FIG. 52 replaces each of the Containers and the Relations of the Kernel by the id of the Affiliation Link that identifies them, thus the attributes of each Link can be fully informed. FIG. 53 illustrates the fourteen-Link Kernel without the diagrammatic representation of the Containers and the Relations, and finally all is described with the aid of interconnected Links. This elementary fourteen-Link Kernel has all the described properties, it is self-described, self-sustaining and re-entering.

Figure 54:
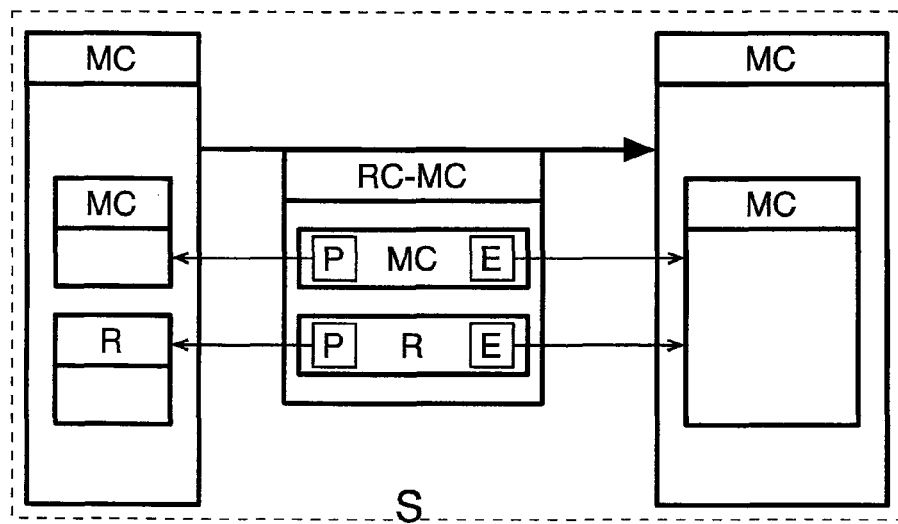
FIG. 54 illustrates a simplified representation of the 14-Link Kernel representing the System "S".
Figure 55:
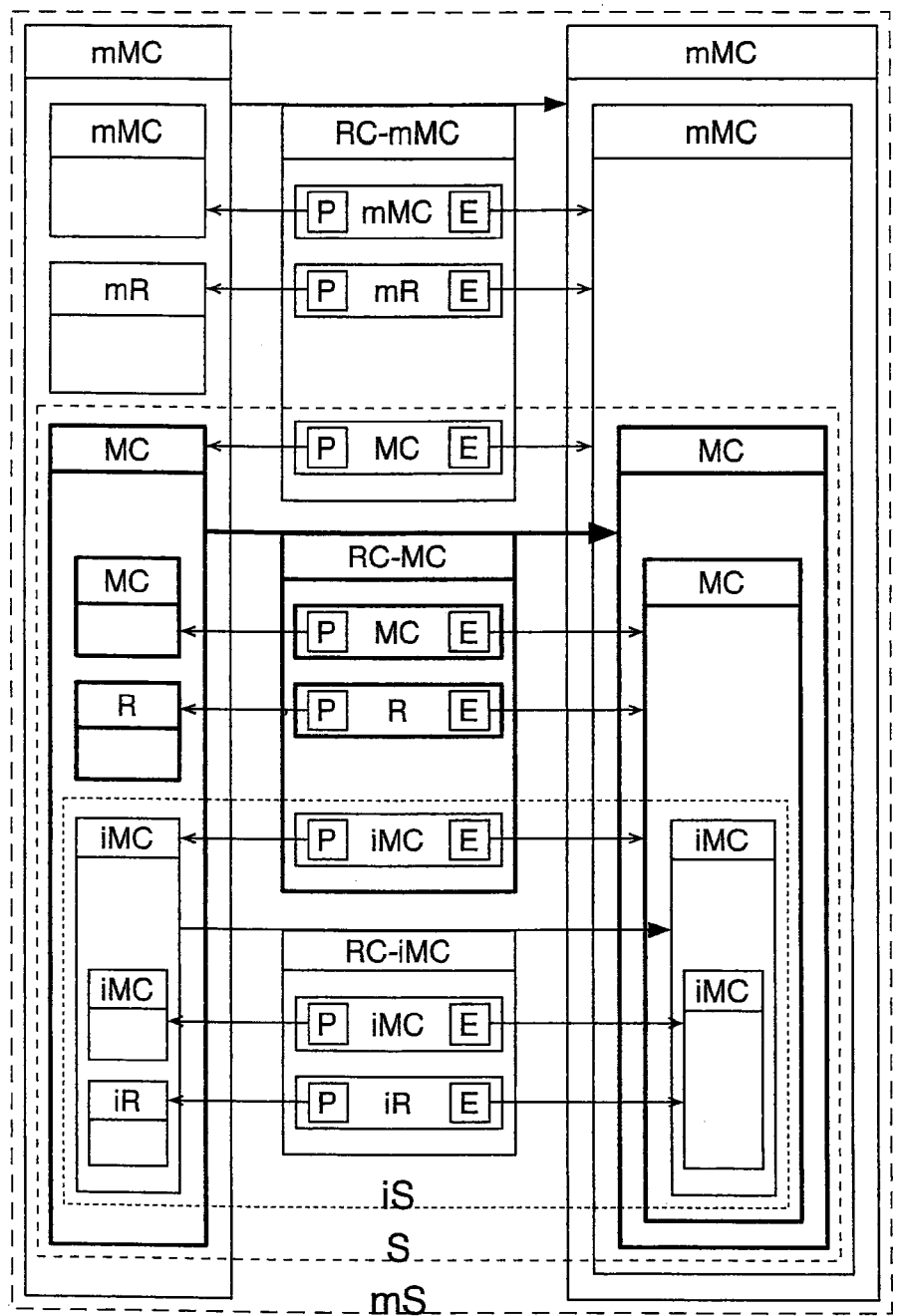
FIG. 55 illustrates the creation of an IntraSystem "iS" and of a MetaSystem "mS".

Consequently, a System based on such a Kernel has the ability of creating and containing one or several other subSystems, called IntraSystems. It also has the ability to create and be contained by a super-System, called MetaSystem. A System is not limited in a totality, it is the center from whence IntraSystems and MetaSystems develop, it does not depend on any other conception but that which it puts in place to exist. The simplified representation of the fourteen-Link Kernel illustrated by FIG. 54 makes it easier to understand what Meta-Intra-Systems are. FIG. 55 illustrates the creation of an IntraSystem "iS" and of a MetaSystem "mS": the Container "MC" is the MetaContainer of the System "S".

The System "S" creates an IntraSystem "iS" by creating the new Content "iMC". The Content "iMC" represents the MetaContainer of the IntraSystem "iS". With the MetaContainer "iMC", all the Links necessary to a Kernel allowing the "iS" IntraSystem to be autonomous are created.

The System "S" creates a MetaSystem "mS" by creating all the necessary Links of a Kernel allowing this MetaSystem "mS" to be autonomous. The Container "mMC" represents the MetaContainer of the MetaSystem "mS". The MetaContainer "mMC" contains the MetaContainer "MC" (in the same way as the MetaContainer "MC" contains the MetaContainer "iMC").

A Forty-Four-Link Kernel

Figure 56:
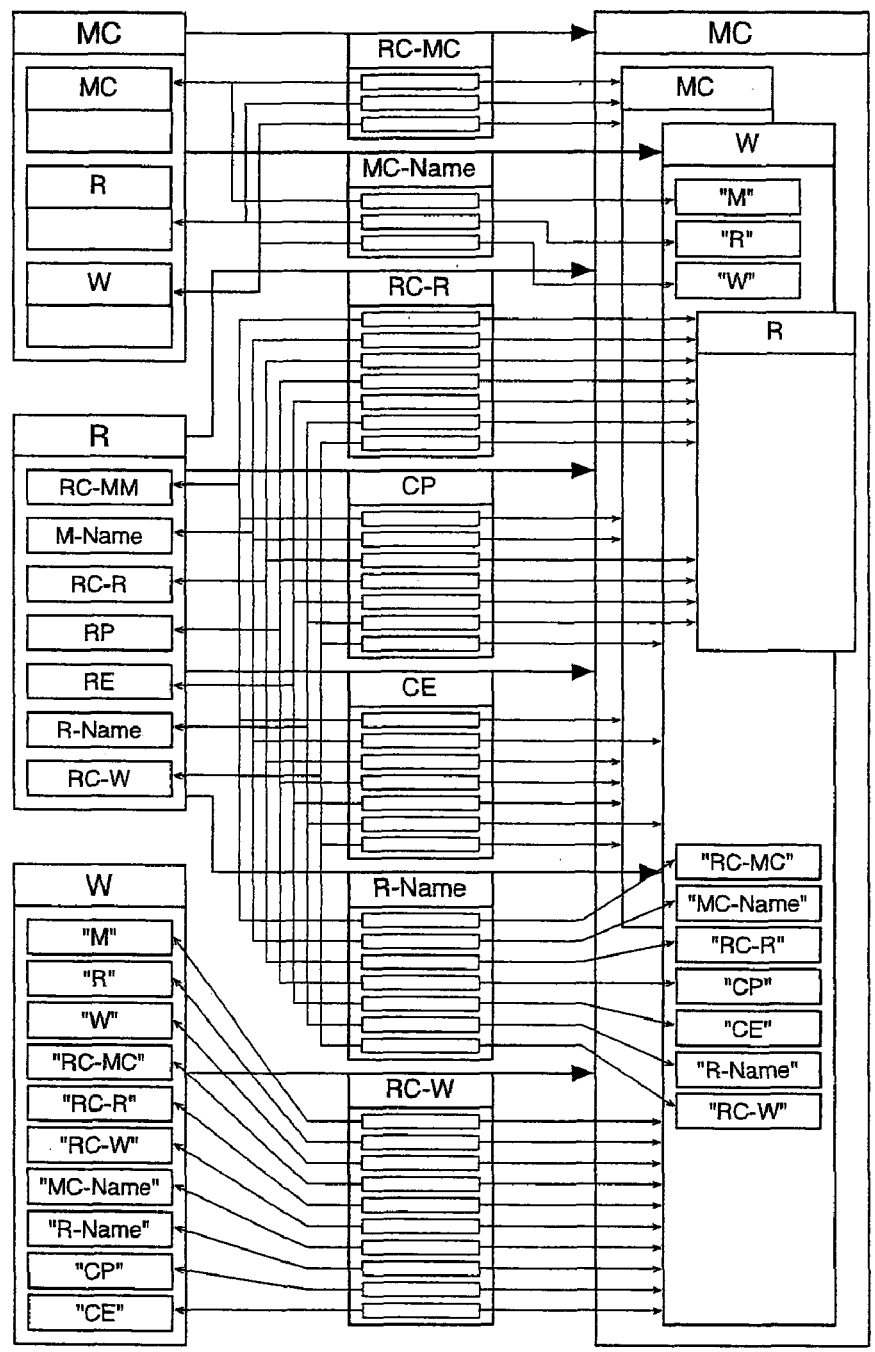
FIG. 56 illustrates a 44-Link Kernel based on an enrichment of the 14-Link Kernel.

FIG. 56 illustrates a forty-four-Link Kernel. This is the fourteen-Link Kernel enriched with a new Container "W". The Contents of W are words, they are used to name the Containers and the Relations. To make for an easier reading, the diagrammatic representation of the Containers is duplicated on the left (=ParentContainer) and on the right (=ChildContainer), so as to place all the Relations at the center of the figure. The MetaContainer MC is defined by an additional Relation: the Relation "MC-Name", allowing a name to be attributed to the Kernel's Containers. The RelationsContainer R is defined by an additional Relation: the Relation "R-Name", allowing a name to be attributed to the Kernel's Relations. The words' Container W is defined by the Relation "RC-W", the diagrammatic representation of a Kernel enriched from the fourteen-Link Kernel requiring that each Container be represented by a Relation RC. This Kernel is made of three Containers, seven Relations and ten Words, which are respectively identified by the Affiliation Links of the Relations RC-MC, RC-R and RC-W.

Figure 57:
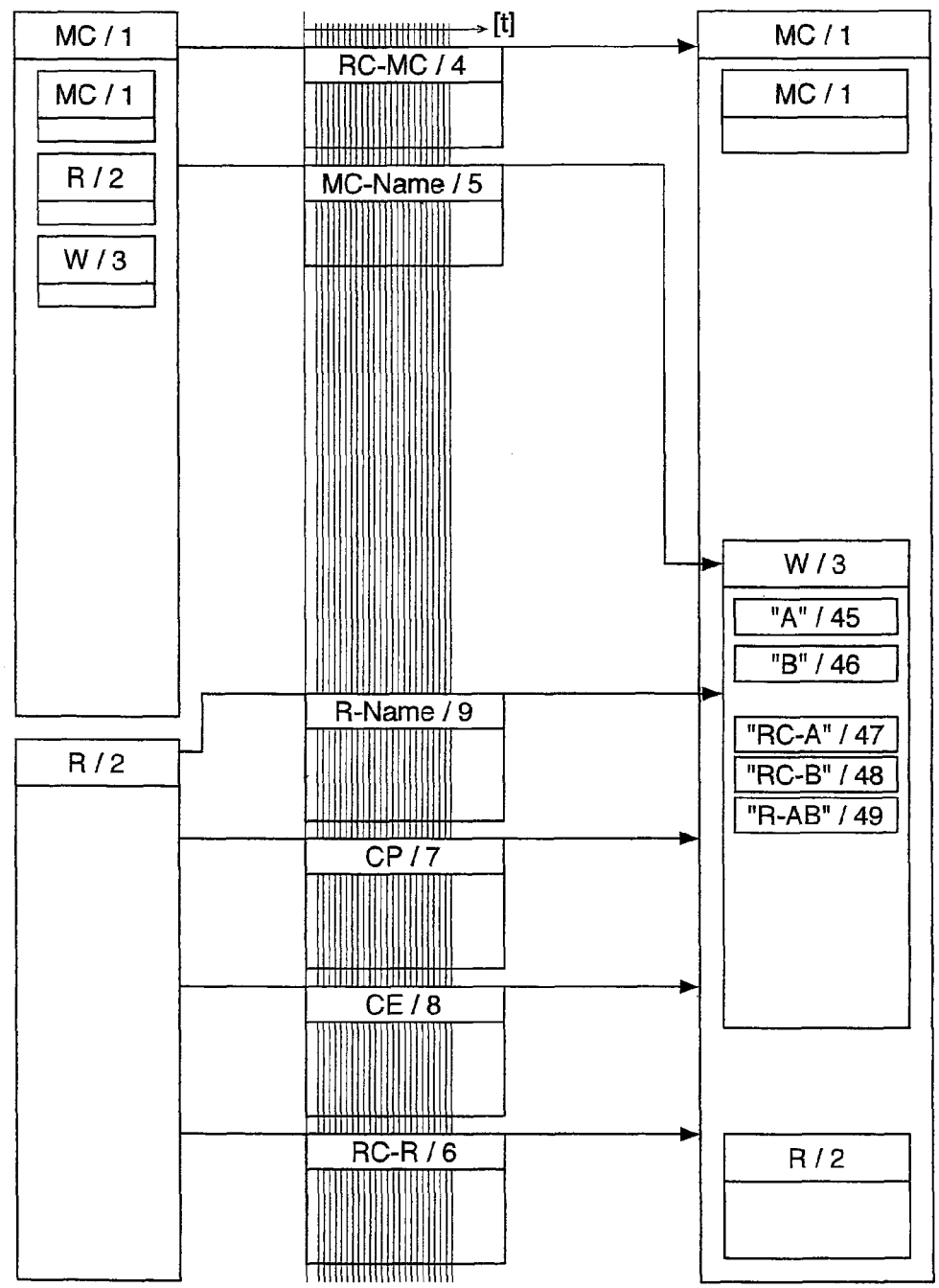
FIG. 57 illustrates a simplified representation of the 44-Link Kernel before the creation of a Model A-B.
Figure 58:
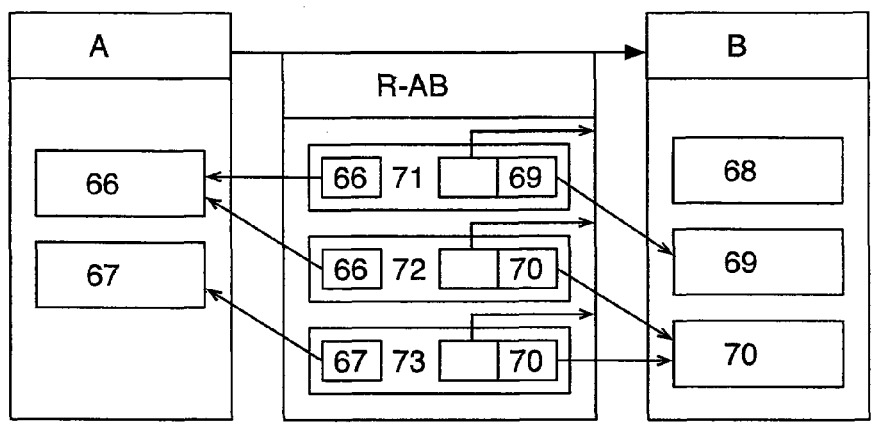
FIG. 58 illustrates a simple Model A-B.
Figure 59:
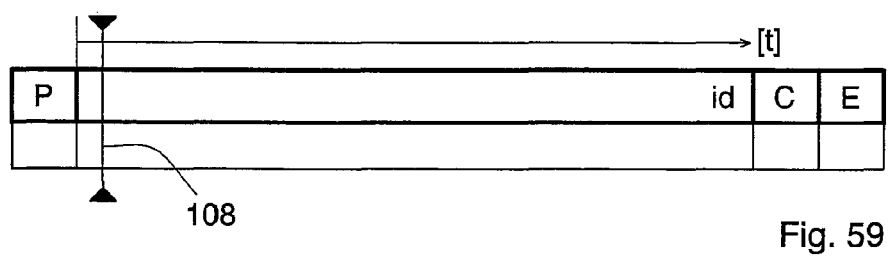
FIG. 59 illustrates a table of possible Links allowing the Links useful for the creation of the Model A-B to be stored.
Figure 60:
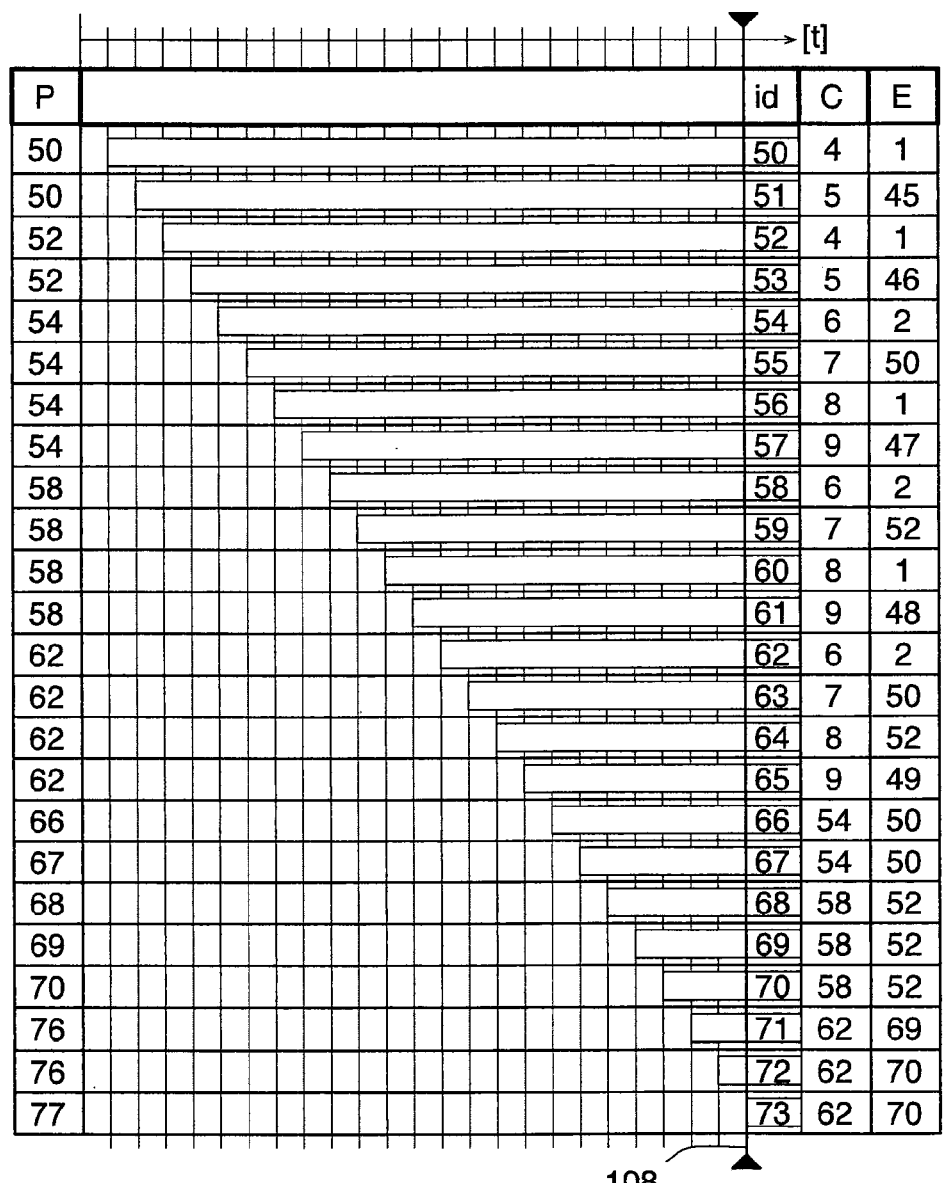
FIG. 60 illustrates the set of Links added sequentially to the table once the creation of the Model A-B has been finished.
Figure 61:
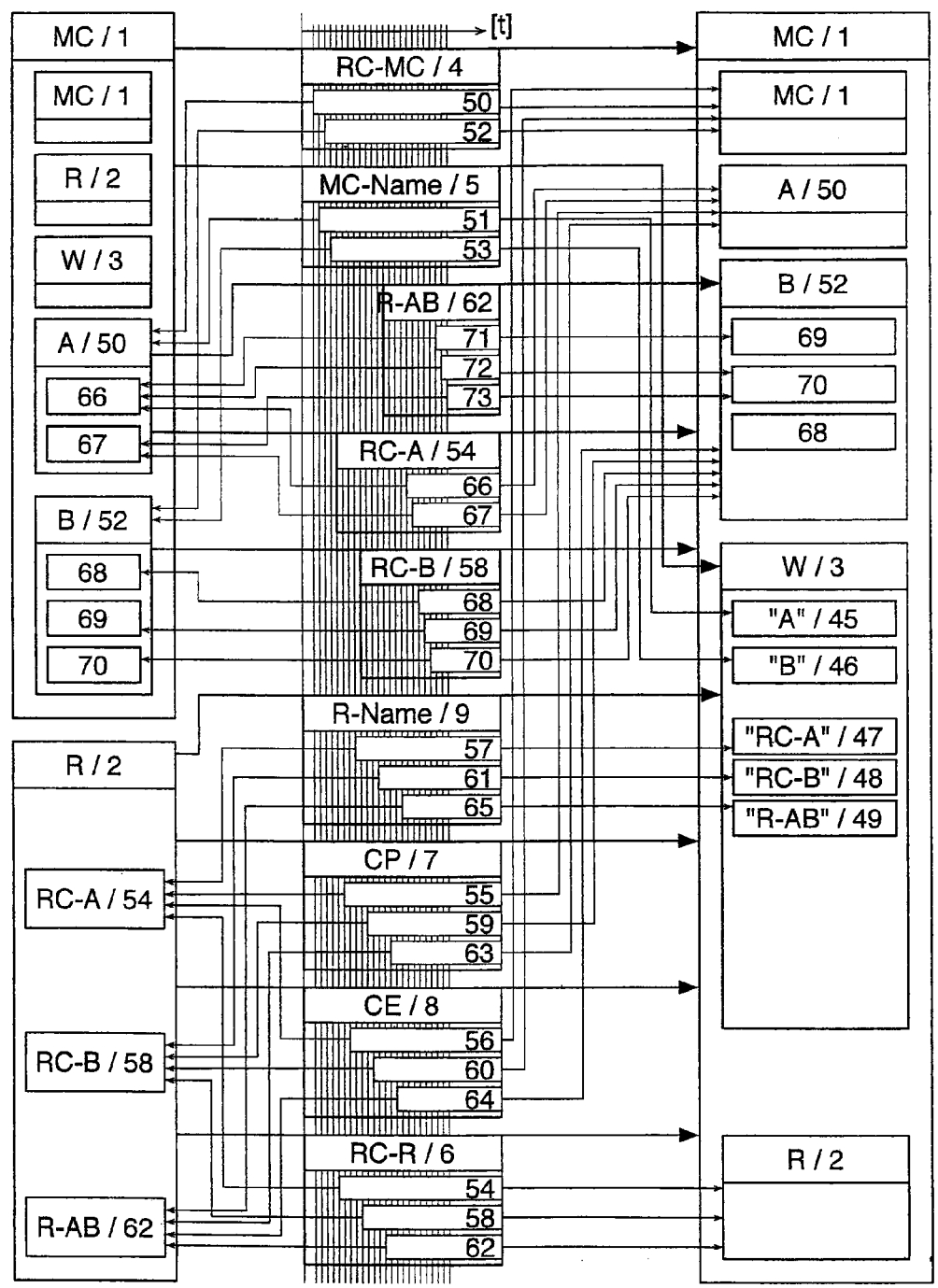
FIG. 61 illustrates a decluttered representation of the 44-Link Kernel after the creation of the Model A-B.

FIG. 57 illustrates a decluttered representation of the forty-four-Link Kernel. Five words, identified by the Links "45" to "49", are already added to the Container W in order to name the Containers and the Relations useful for the creation of a Model A-B, illustrated by FIG. 58. FIG. 59 illustrates a possible Links table allowing the Links useful for the creation of the Containers of the Model A-B (meta-information) and of its Contents (information) to be stored. The column "P" references the ParentContent, the column "id" identifies the Link and represents its temporal attributes, the column "C" references the Link's Container, the column "E" references the ChildContent, a temporal cursor 108 simulates the passing of time. FIG. 60 illustrates the whole of the Links added sequentially to the table once the creation of the Model A-B is finished. FIG. 61 illustrates these same Links added in the Kernel.

The Links that pertain to the meta-information: a first Container is created (Link "50"), it is named "A" (Link "51"). A second Container is created (Link "52"), it is named "B" (Link "53"). A Relation RC is created (Link "54"), its ParentContainer is the Container "A" (Link "55"), its ChildContainer is the Container "MC" (Link "56"), it is named "RC-A" (Link "57"). A Relation RC is created (Link "58"), its ParentContainer is the Container "B" (Link "59"), its ChildContainer is the Container "MC" (Link "60"), it is named "RC-B" (Link "61"). A Relation is created (Link "62"), its ParentContainer is the Container "A" (Link "63"), its ChildContainer is the Container "B" (Link "64"), it is named "R-AB" (Link "65").

The Links that pertain to the information: two Contents are added to the Container "A" (Link "66" and Link "67"). Three Contents are added to the Container "B" (Link "68", Link "69" and Link "70"). The Contents of "A" and the Contents of "B" are connected (Link "71", Link "72" and Link "73").

The storage of the meta-information is not external to the process, it is also achieved by Links, as the storage of the information itself. The Link's temporal attributes make it possible to keep the history of any modification made to the information and to the meta-information, i.e. to the contents and informative containers describing information.

The Links represented by the Links table are physically stored in a Links Base, optimized for this purpose, but the Links table could be stored in a table of a conventional database. In order to access the System's information, one would then use database queries. It is however also possible to store Links on any kind of suitable data carrier, for example in a RAM or ROM, in a combination of different memories, by distributing it in a network, etc., and in any format, including as binary data, in the form of files, for example of XML file, of collection of structured documents, etc. It would also be possible to store it on several distinct carriers and to store for example static Links, notably Kernel Links, those that represent static information, in a ROM whilst the Links representing dynamic information are stored for example on a harddisk, a RAM or another carrier allowing writing. Cache mechanisms and/or additional indexes can be provided to further accelerate processing to the Links most frequently accessed.

The machine (Links Base) enabling the information, i.e. the Links, to be accessed will then be constituted for example of a computer system built around a conventional microprocessor, or of a dedicated integrated circuit, including an FPGA circuit, an asic, or any type of integrated circuit or set of integrated circuits capable of processing Links. In a preferred embodiment, the machine allows the parallel processing, for example the writing, deleting or editing, of several Links, and the restoring of complete set of Links.

The Kernels described here above constitute only examples of Kernels enabling self-described, self-sustaining and re-entering Systems to be created. The one skilled in the art will understand that it is possible to modify these Kernels and to describe System with the aid of different Kernels. The nine-Link Kernel, for example, is defined only with the aid of Relations, the notion of Container of the fourteen-Link Kernel (FIG. 51) is not explicit. As it is possible to deplete the nine-Link Kernel (FIG. 45), it is also possible to deplete the fourteen-Link Kernel by adding an intermediary Container defining the type of Relation and hence arrive at a thirty-three-Link Kernel.

One considerable advantage of the inventive method is to allow the information to be at the same time the meta-modeled and the intra-modeled and thus a response to the modeling of complex structures to be provided. The modeling is not limited by a floor or by a ceiling, but it can grow and develop from the middle. It is therefore possible to develop a Model by defining certain Containers and/or Contents that will be made more precise hereafter (intra-modeling) and/or placed in a more global context (meta-modeling).

Figure 62:
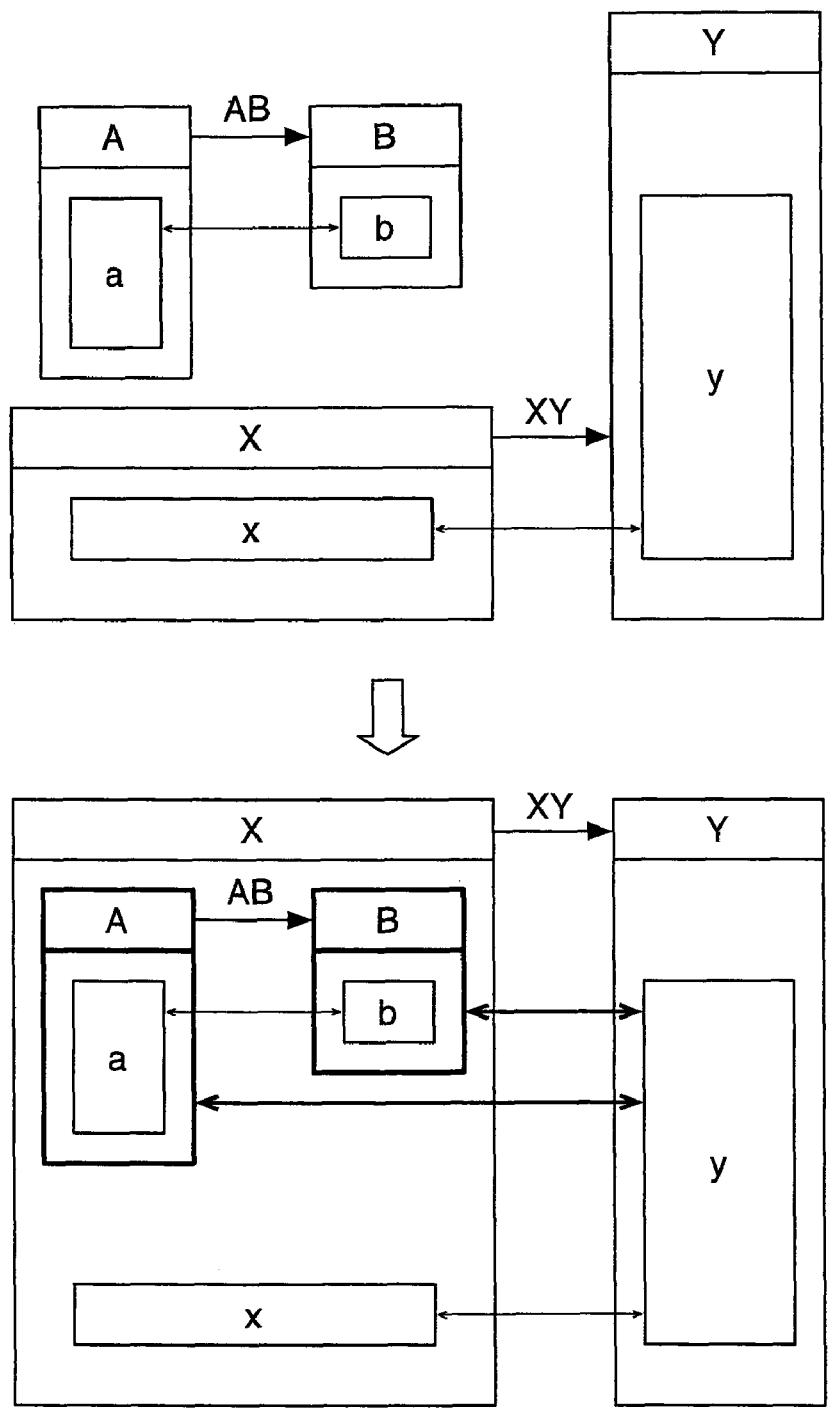
FIG. 62 illustrates an example of meta-modeling by simple over-grading.
Figure 63:
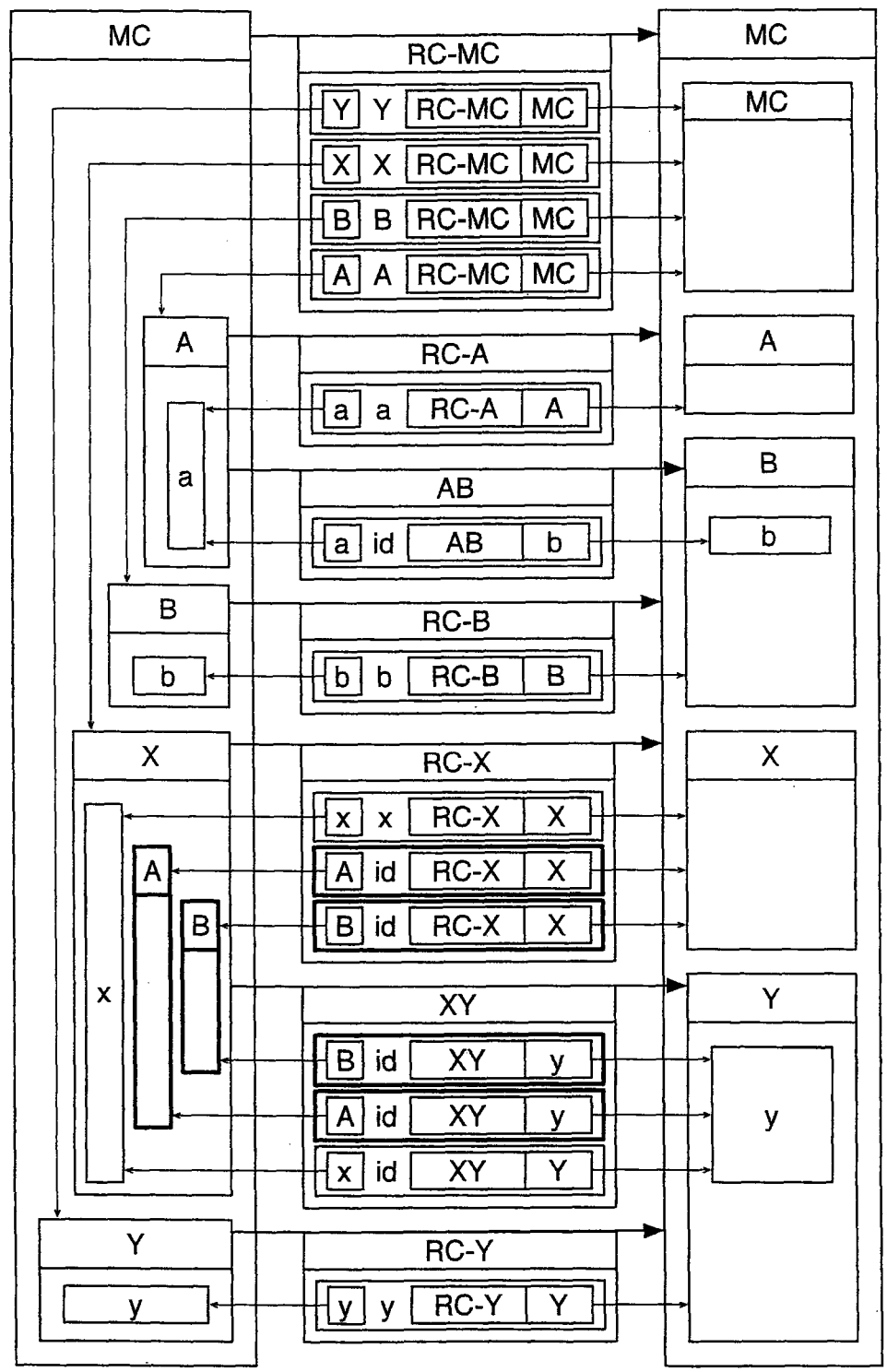
FIG. 63 illustrates the detail of the Links necessary for representing the example of FIG. 62.

The method allows information to be meta-modeled, in other words the information to be globalized, on an indefinite number of levels. Higher levels of description add knowledge on lower levels. Different forms of meta-modeling are possible:

Globalization by simple over-grading. According to FIG. 62, i.e. a set of Containers "A", "B", "X" and "Y", meta-modeling allows the simple over-grading of the Containers "A" and "B" in a more global context, so that they become the Contents of the Container "X" (see FIG. 63 for the detail of the Links).

Figure 64:
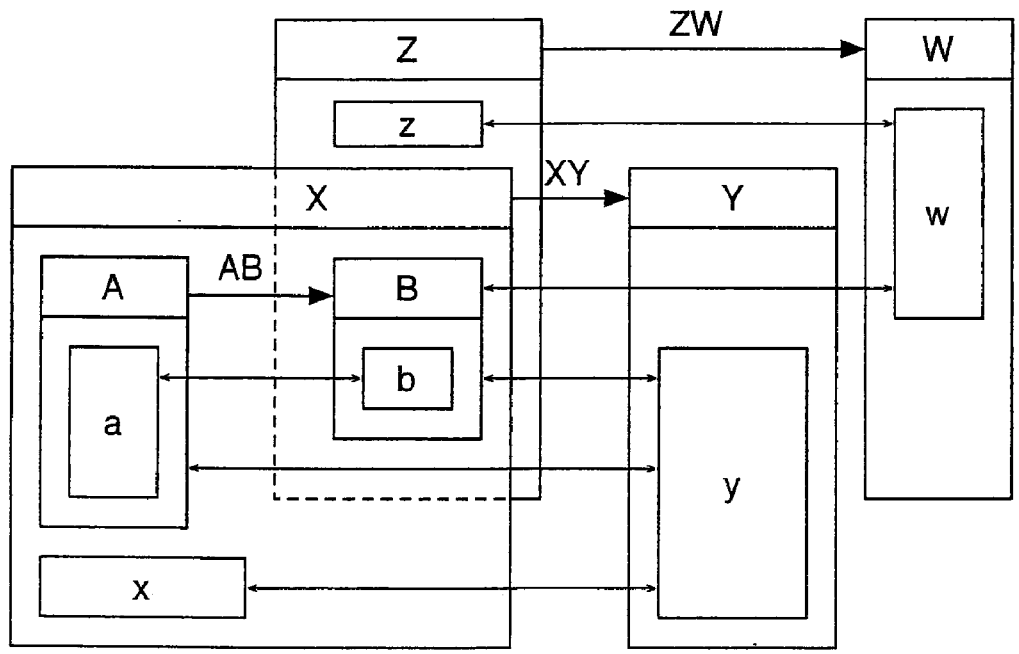
FIG. 64 illustrates an example of meta-modeling by multiple over-grading.

Globalization by multiple over-grading. The example of FIG. 64 shows that the Container "B" undergoes a multiple over-grading by the Containers "X" and "Z", so that the Container "B" can inherit simultaneously from "X" and from "Z" whilst the Container "A" can inherit only from "X".

Figure 65:
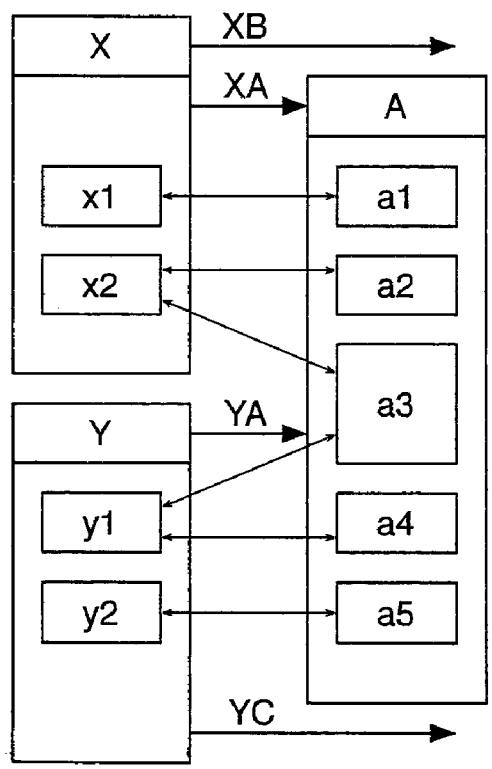
FIG. 65 illustrates an example of meta-modeling by assembly.

Globalization by assembly. According to FIG. 65, the Contents of the Container "A" are elements useful for the assembly of the more global elements that are the Contents of the Containers "X" and "Y".

Figure 66:
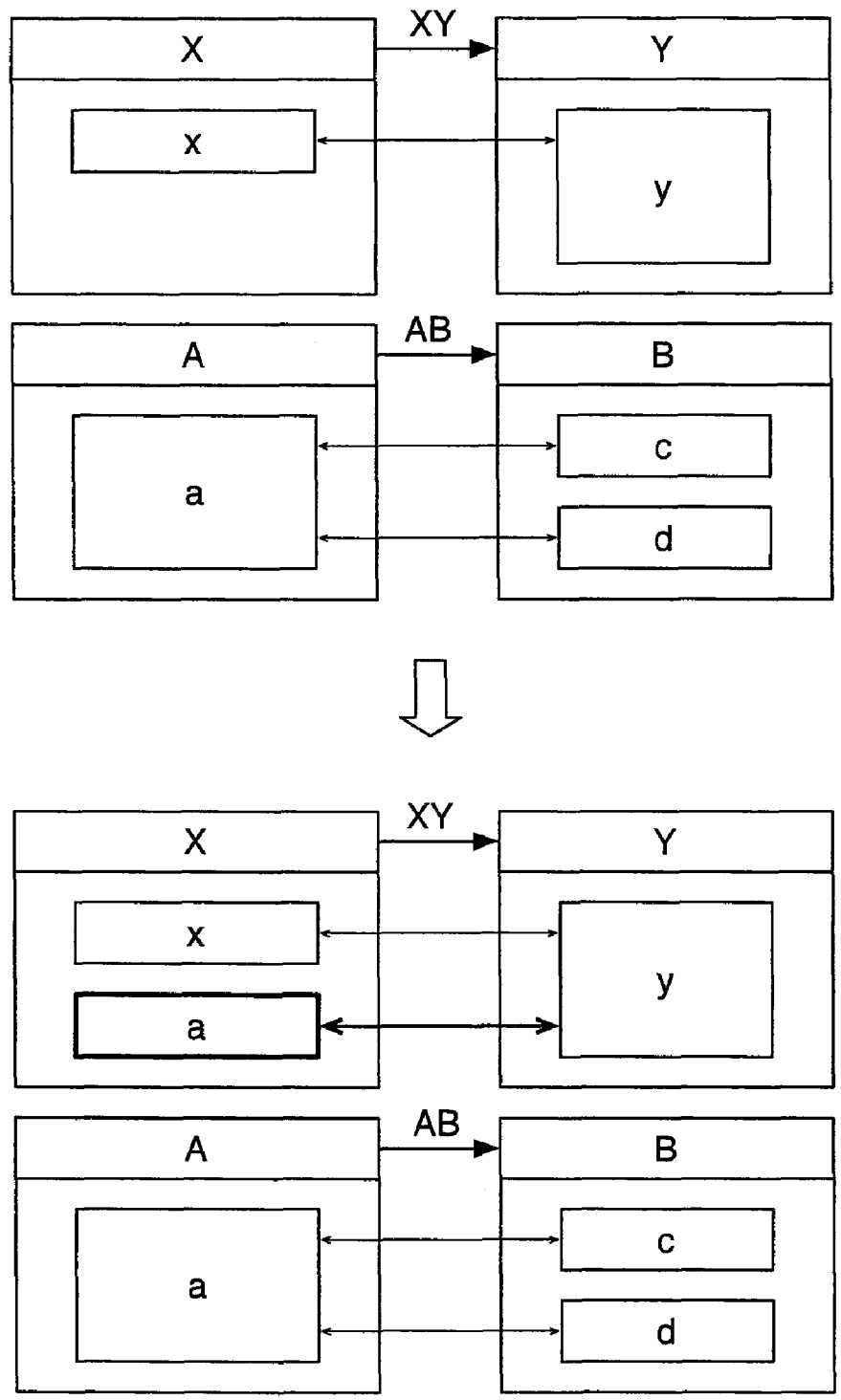
FIG. 66 illustrates an example of intra-modeling by multiple inheritance.
Figure 67:
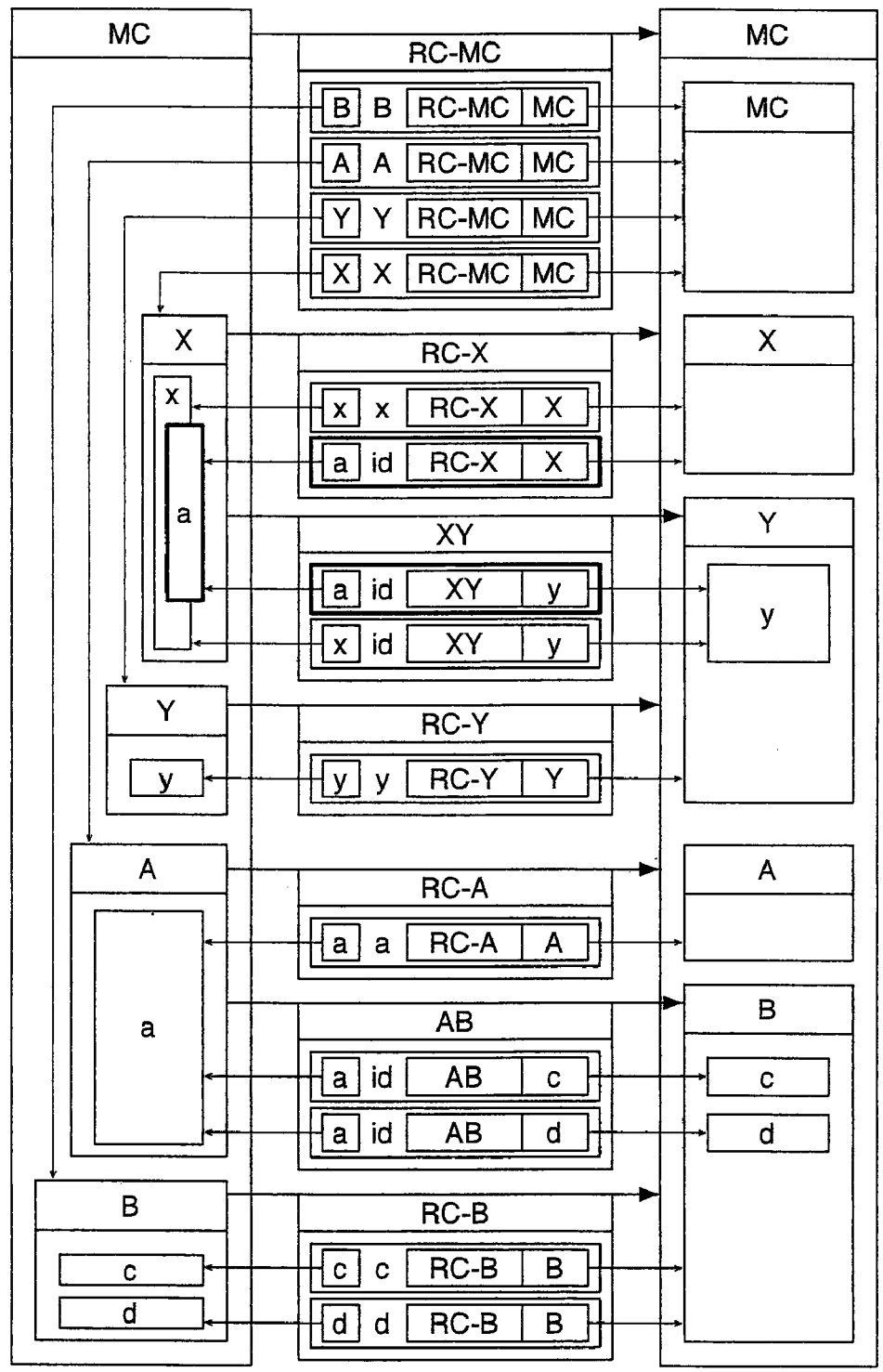
FIG. 67 illustrates the detail of the Links necessary for representing the example of FIG. 66.

The method also allows the intra-modeling of information, in other words the specialization of information, on an indefinite number of levels. Lower levels of description add knowledge on higher levels. Different forms of intra-modeling are possible:

Specialization by multiple inheritance. According to FIG. 66, i.e. a set of Containers "A", "B", "X" and "Y", the Content "a" inherits the ParentRelations of the Container "A" such as the Relation "AB". The Content "a" is then specialized as being also a Content of "X", it inherits both ParentRelations of the Containers "A" and "X" (see FIG. 67 for the detail of the Links), but the other Contents of "A" do not inherit from "X" and the other Contents of "X" do not inherit from "A".

Figure 68:
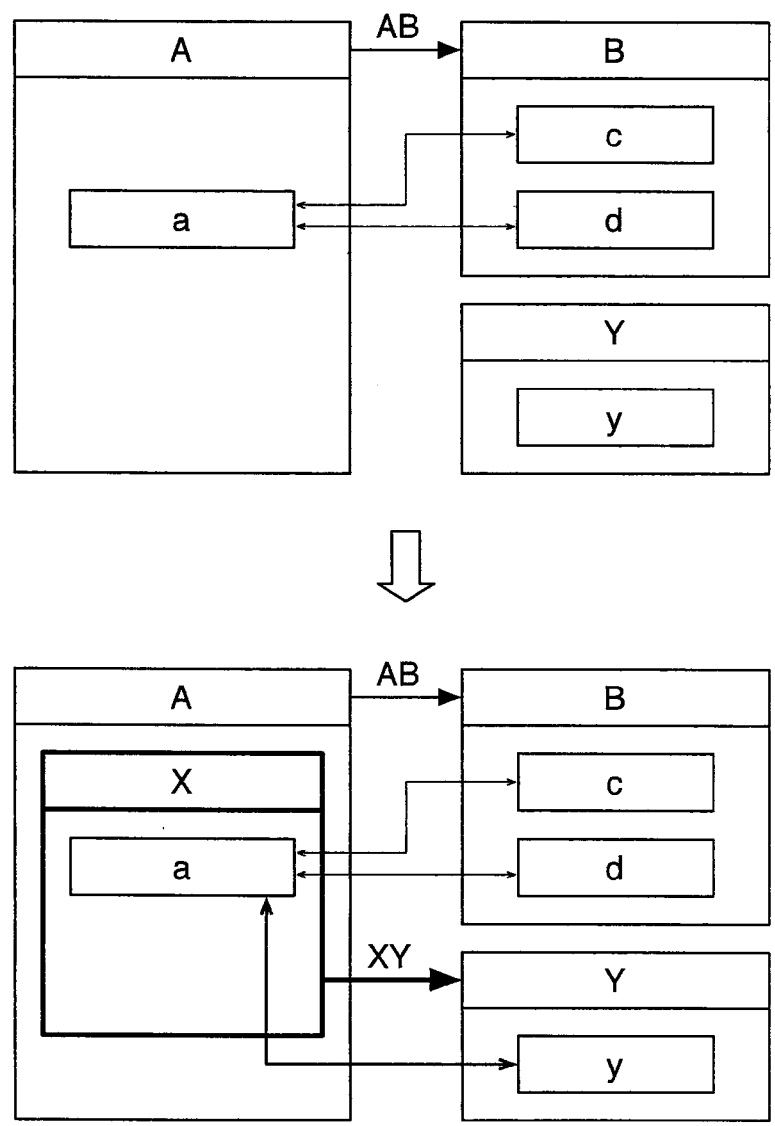
FIG. 68 illustrates an example of intra-modeling by simple inheritance.

Specialization by simple inheritance. According to FIG. 68, i.e. a set of Containers "A", "B" and "Y", the Content "a" inherits the ParentRelations of the Container "A". The Content "a" is then specialized as being a Content of "X", it inherits ParentRelations from "X", but can also inherit ParentRelations from "A", as well as all the other Contents of "X".

Figure 69:
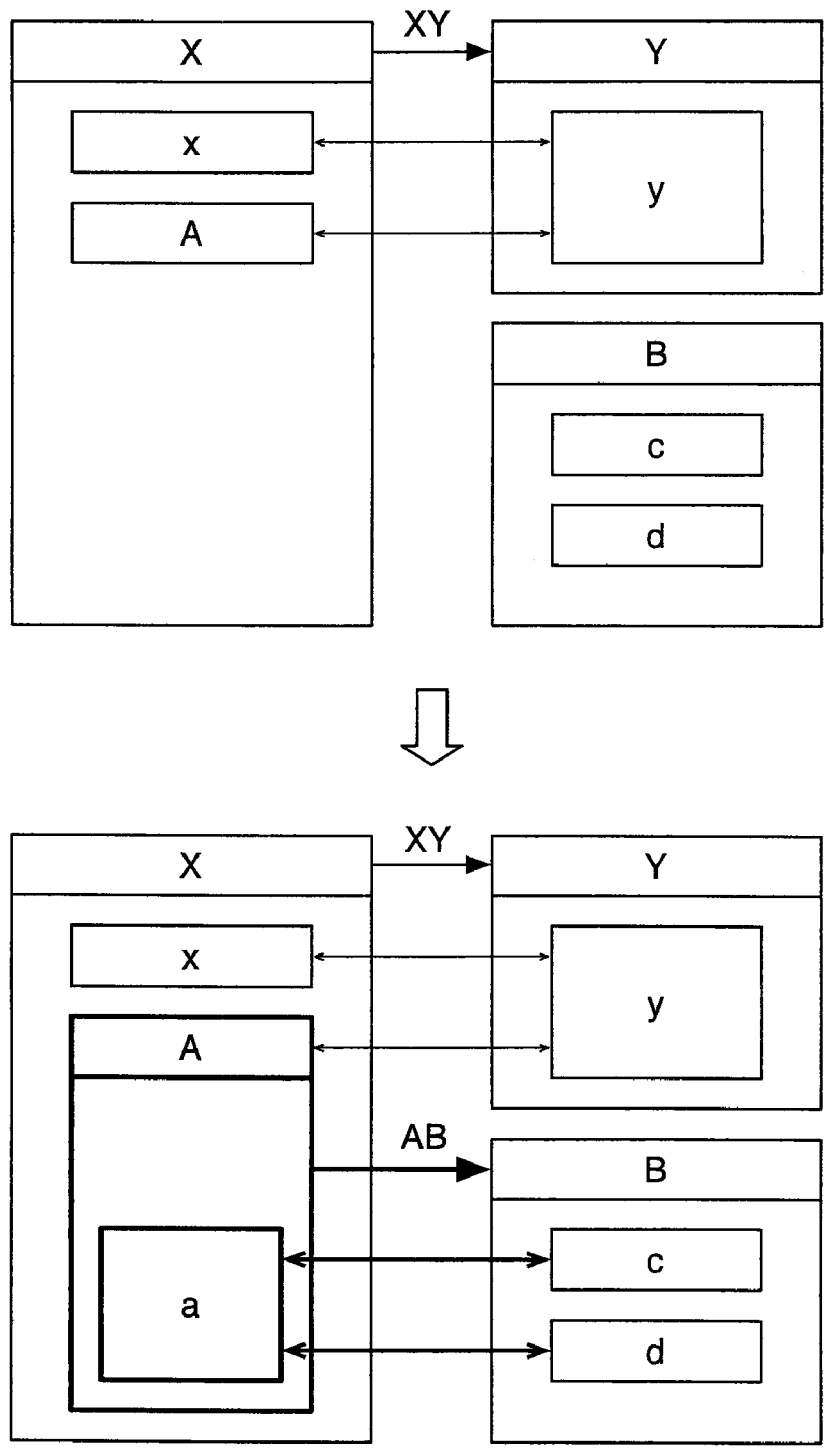
FIG. 69 illustrates an example of intra-modeling by transformation.
Figure 70:
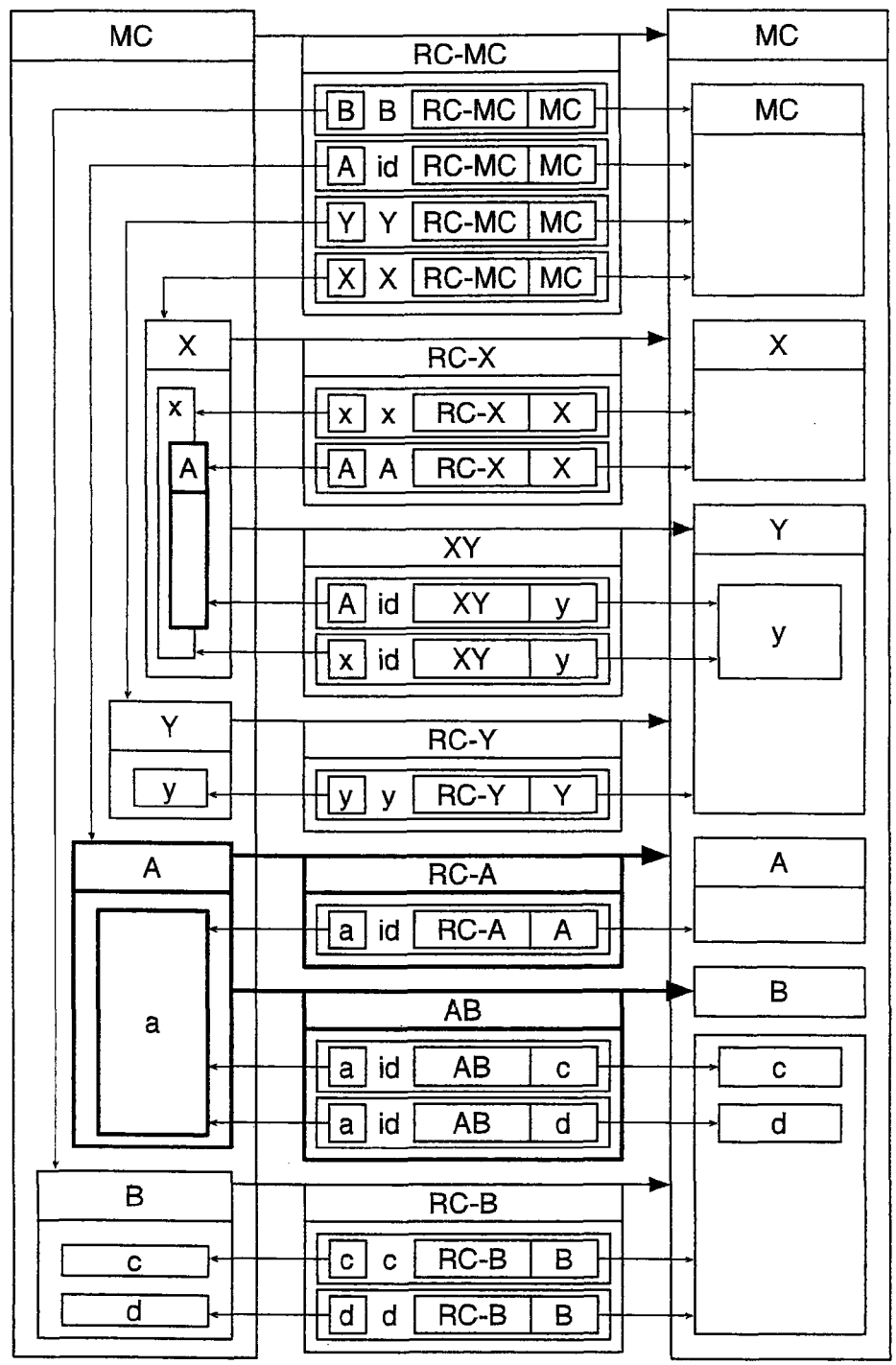
FIG. 70 illustrates the detail of the Links necessary for representing the example of FIG. 69.

Specialization by transformation. According to FIG. 69, i.e. a set of Containers "X", "Y" and "B", the Content "A" inherits the ParentRelations from the Container "X". The Content "A" is then specialized by being transformed into a Container "A". The Container "A" is also specialized by its Contents (see FIG. 70 for the detail of the Links).

Figure 71:
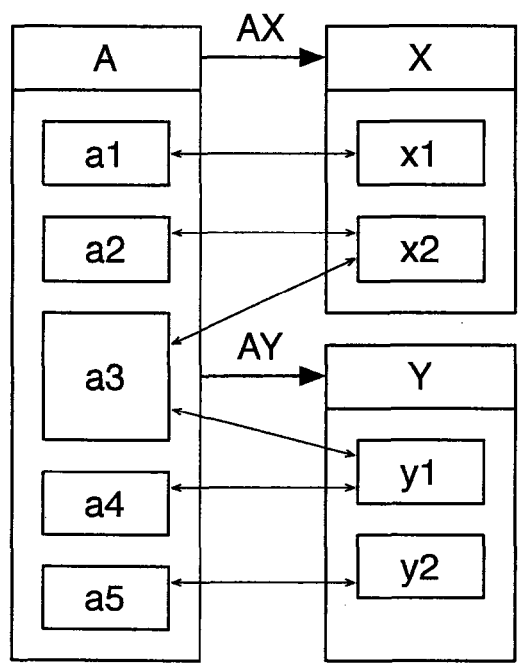
FIG. 71 illustrates an example of intra-modeling by segmentation.

Specialization by segmentation. According to FIG. 71, the Contents of the Container "A" are segmented and composed of more specialized elements than are the Contents of the Containers "X" and "Y".

There are two approaches, contrary and complementary, to apprehend the modeling of a complex problem. Intra-modeling rests on a top-down approach, from the global to the detail, which allows the information to be made more precise. For example, a Container "Shape" is defined with the attributes necessary for representing circles and rectangles and then, when triangles are required, it will be seen that the Container "Shape" should preferably be specialized by different Containers specific to each shape.

Conversely, meta-modeling rests on a bottom-up approach, from the detail to the global, which allows the information to be replaced in a wider context. For example, the Containers "Round", then "Rectangle" are defined, and when triangles are later required, it will be seen that it is preferably to globalize these different Containers by a Container "Shape" which regroups the attributes common to all shapes, such as "Thickness of the contour", "Color of background", etc.

The method allows an evolutive and dynamic modeling, which does not require everything to be defined from the start. All modifications made to the structure of the information are themselves stored in the form of Links, and are thus reversible and retraceable. The atomization of the whole information by Links makes a dynamic re-organization of the information in different structures easier.

The method's modeling abilities allow the information to be marked semantically on several levels. Entering information into a System means automatically enriching it with additional meta-intra-information, it means adding a semantic meaning to this information. By comparison with the relational model, entering a word into a column of a table does not give this word any additional information and does not give it any meaning. The method, on the contrary, gives a Content the knowledge of its Container, which has the knowledge of its ParentRelations, of its ChildRelations, of the whole of its Contents, of its own Container, etc.

Figure 72:
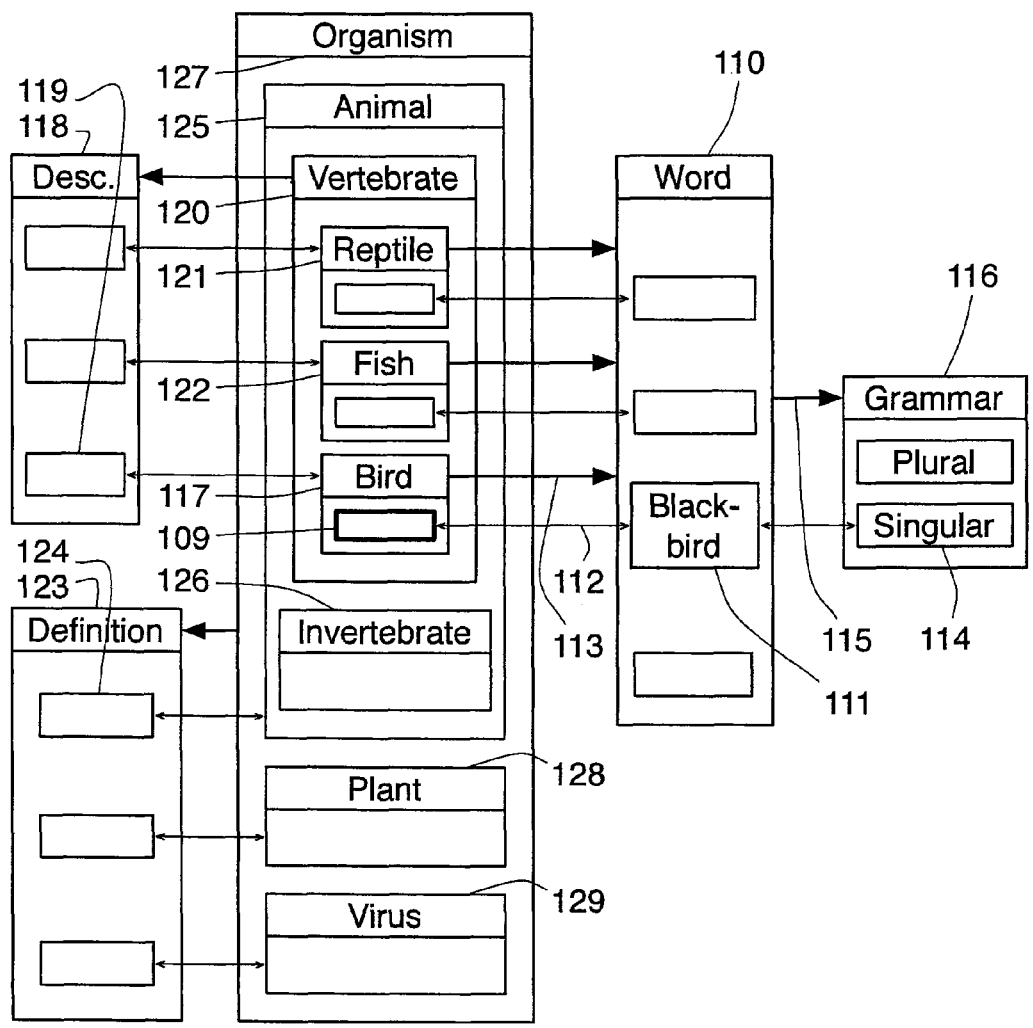
FIG. 72 illustrates an example of semantic marking of information.

In the example illustrated by FIG. 72, creating a new Content 109 automatically enriches this content with the intra-information:

"Word" 110 by the Content "Blackbird" 111 over the Link 112 of the Relation "Name" 113, "Singular word" 114 by the Relation "Number" 115 on the Container "Grammar" 116, and with the meta-information:

"Bird" 117, and its "Description" 118 by the Content 119,

"Vertebrate" 120, and two other categories of vertebrates that are the "Reptile" 121 and the "Fish" 122, and the "Definition" 123 of Vertebrate by the Content 124, "Animal" 125, to which the "Invertebrate" 126 also belong, "Organism" 127, and two other categories listed under Organism, being "Plant" 128 and "Virus" 129.

One advantage of the inventive method is to avoid duplication of information. By way of example, the word "Blackbird" 111 as well as each word used in the System is identified only once, it is only identified by a Link, it is constituted by a unique arrangement of characters, which are only identified by Links. It is easy to interrogate the Links Base to find all the Links having a reference to a Link identifying a particular word, and to find all the Containers that use this word. In the same way, it is possible to model a postal address with the aid off some Relations on the Containers indicating the street name, the locality and the country, . . . . A particular postal address is then uniquely identified by a Link. The method makes any information unique and constituted of unique information, thus the information is represented with a higher degree of encoding, and information redundancy is very low and not very predictable.

Furthermore, it is possible to share the Model "Postal Address" in different Systems, for example in different companies, that could insert their own Contents, share them, or publish them. The method renders all meta-information unique and made of unique meta-information.

The low redundancy of the information brings performance gains, since the quantity of information to be transmitted between machines is reduced. Moreover, it is easy to detect the static Links that are never or only seldom modified. These static Links can be duplicated on client machines in order to reduce the transactions with a remote Links Base to dynamic information only. One thus avoids superfluous reloading of already known Links. Furthermore, the method can give the information a temporal validity, which prevents superfluous reloading of remote information.

Figure 73:
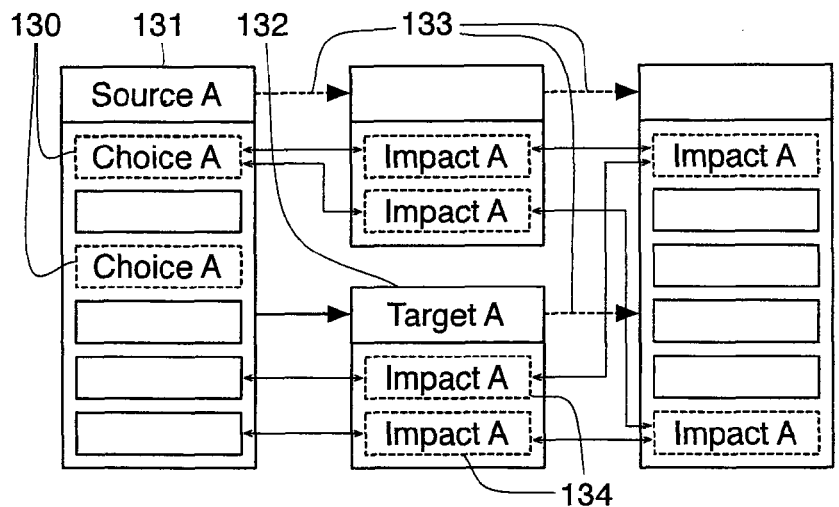
FIG. 73 illustrates a simple Selection "A".

Information searching is carried out preferably with the aid of Selections. The atomization of information by Links simplifies the integration of a continuous Selections propagation mechanism. FIG. 73 illustrates a simple Selection "A": a Selection is a set of Choices 130, one Choice being the "selected" state of a Content of a SourceContainer 131. The choices of the Selection "A" propagate towards a TargetContainer 132 through Relations chains 133, and transform into Impacts (Impact A), an Impact being the "selected" state of a Content connected to a Choice or connected to an Impact. The Choices 130 constitute the criteria of a search, or the parameters of a filter. The Impacts 134 of a TargetContainer 132 represent the result of a search or of a filter.

The propagation of Selections is said to be "continuous" because it acts like an electric current that propagates through the Links. The current goes through as long as the Links exist or are activated. Making or unmaking a Link between two Contents acts like a switch that propagates or interrupts the electric current resulting from a Choice or relayed by an Impact, so that the System checks nearly instantaneously the Impacts propagated by a Selection.

The Selections are multiple, the method has an indefinite number of Selections. Selections are modeled: the SourceContainer, the Choices made, the graph of Relations through which they propagate, can be represented by a Model, in other words the Selections are thus represented by Links and are stored like Links. A new Selection is then created by adding a new Content in an appropriate Model, which amounts to creating a certain number of Links.

Figure 74:
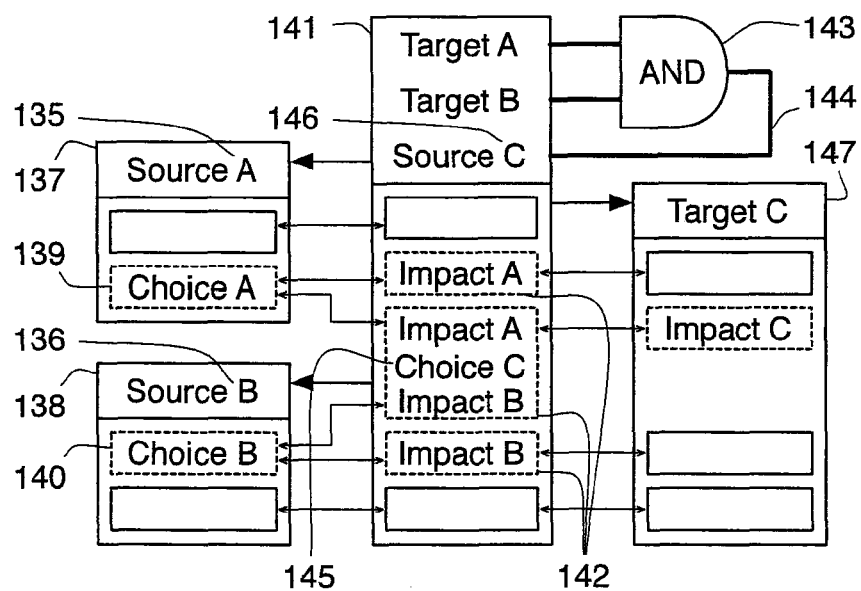
FIG. 74 illustrates an example of Logic Selection.
Figure 75:
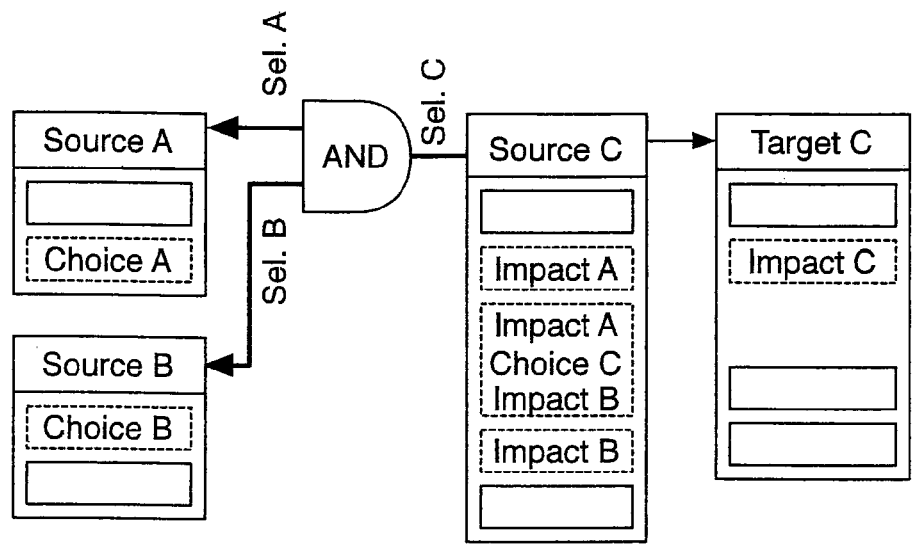
FIG. 75 illustrates a different notation for representing the example of FIG. 74.

In order to build more elaborate queries or filters, it is possible to effect logic operations on the Impacts resulting from different Selections. FIG. 74 illustrates two different Selections, "A" 135 and "B" 136 resulting from different SourceContainers 137 and 138 that propagate their Choices 139 and 140 towards a TargetContainer 141. The Impacts 142 resulting from the choice of the Selections "A" and "B" undergo a logic operation, represented here by a gate AND 143. The result of the logic operation 144 is used to determine the Choices 145 of a new Selection "C" 146, called Logic Selection, whose SourceContainer 141 corresponds to the TargetContainer 141 of the Selections "A" and "B". A Logic Selection acts like a Selection, it can propagate its choices 145 towards other TargetContainers 147 and be used to build other Logic Selections. All the logic operations are possible: NOT, OR, NAND, NOR, OR, NOR. The Logic Selection of FIG. 74 can be represented by a different notation illustrated by FIG. 75. For example, it is possible to use a Logic Selection based on an "AND" operation such as that illustrated by FIG. 74 to find the family name 147 of the persons 141 living on a certain street 137 "and" having a certain first name 138.

It is also possible to use complex Selections, for example integrating Selections whose Impacts change only if the Choices are maintained during a sufficient period of time, or derivative Selections whose Impacts depend on the speed of change of the Choices. It is also possible to use integrating Logic Selections whose result (the Choices resulting from the logic operation at the gate exit) changes only if the entry conditions are verified during a sufficient period of time or derivative Logic Selections whose result depends on the frequency of verification of the entry conditions.

Figure 76:
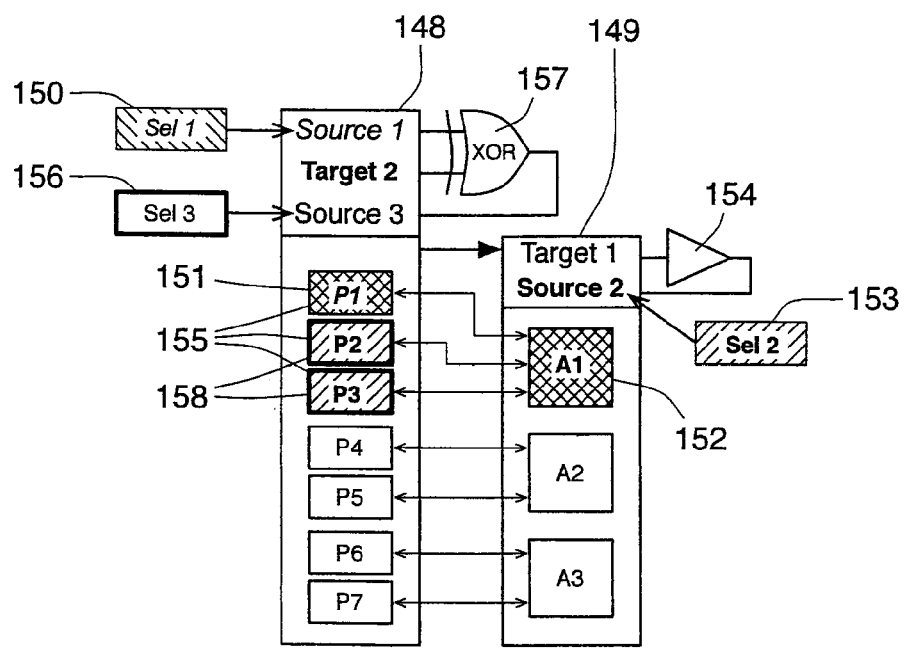
FIG. 76 illustrates an example of creation of a rule with the aid of Logic Selections.

The Selections and Logic Selections allow rules to be created. For example, FIG. 76 illustrates the following rule: "The Persons 148 that are neighbors of another are those that live at the same Address 149". Hence, the Persons that are neighbors of the Person P1 are the Persons P2 and P3, since these three Persons live at the same Address A1. The Selection "Sel 1" 150 designates by its Choices 151 the Persons whose neighbors one wishes to find. These Choices 151, namely the Person P1, propagate onto the TargetContainer Address 149 and constitute the Impacts 152 feeding the entrance to the gate 154 of the Logic Selection "Sel 2" 153. The resulting Choices 152 propagate towards the TargetContainer Person 148 and feed by its Impacts 155 an entrance of the OR gate 157 of the Logic Selection "Sel 3" 156, the other entrance being feed by the Choices 151 of the Selection "Sel 1" 150. The resulting Choices 158 of the logic operation show the neighbors P2 and P3 of the Person P1 initially selected 151 through the Selection "Sel 1" 150.

Logic Selections are modeled: the Choices made, the Relations through which they propagate, the type of logic gate used, the Selections connected at the gate entrance, the exit Selection, the Container to which the gate is connected, etc., can be represented by a Model, in other words by Links. Thus, the Selections can be stored permanently in order to render continuous the verification of rules or of conditions. The result of a query or of a filter is thus updated dynamically when modifications are made to the Choices of a Selection (for example, changing a search criterion), to the type of logic operation to be performed, or to the Selections connected at the gate entrances (for example the modification of a query), or simply to the information concerned by the propagation of the Selection. Furthermore, if the Links are provided with temporal attributes, it is easy to verify a condition or retrieve the results of a query at a given time.

The Logic Selections allow the creation of combinatory logic circuits by combining Selections and logic gates. The Selections and Logic Selections can also be implemented by means outside the System, for example by software and/or hardware modules allowing the conditions on the Links of the System to be verified.

Figure 77:
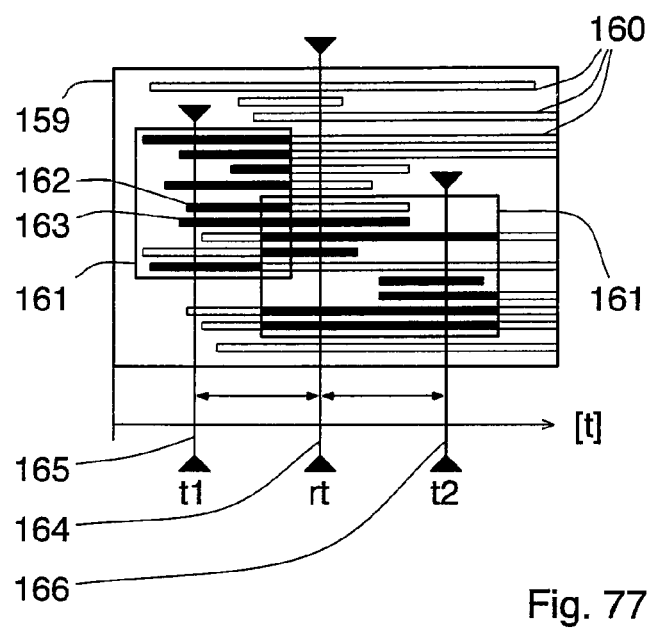
FIG. 77 illustrates diagrammatically a plurality of time cursors allowing the state of a System 159 at different instants to be verified.

The temporal attributes of the Links allow the information to be managed in multiple temporal contexts. FIG. 77 illustrates diagrammatically a plurality of time cursors enabling the state of a System 159 at different instants to be verified. The System 159 comprises a plurality of Links 160 represented by rectangles placed on the time axis. For example, a Link active between t1 and t2 is represented by a rectangle whose width extends from t1 to t2.

One or several time cursors can be associated to a period 161, in other words to a time interval. The width of the period corresponds to a time interval placed on the time axis, and in which an activity is done or observed. The height of the period schematizes the whole of the Links necessary for describing this activity. A Link can of course be concerned by one 162 or several 163 periods, the black part of the Link indicates the period by which it is concerned.

In this example, the time cursor 164 enables the state of the System at the real time "rt" to be checked. It is for example possible to define Selections that extract information and execute queries in real time, according to the position of the time cursor 164. A second time cursor 165 enables the state of the System, and the impact of Selections, at the passed time "t1" to be checked. A third time cursor 166 enables the state of the System and the impact of Selections at a future time "t2" to be predicted. The Links whose activation starts in the future represent for example the meetings in a diary, the planning of events or actions such as the organized sending of emails, the broadcasting of a radio or television program. Links activated or created in the future can also be obtained by extrapolation, projection or by simulation. It is of course possible to provide any number of time cursors to launch queries, propagate Selections, activate filters, this at any time. Furthermore, defined time cursors can move at different paces, for example:

Continuously, with a time-lag ΔT relative to real time, where ΔT can be lower than, equal to or greater than 0.

By jumps (for example by time slots, days, weeks; according to the frames of a video signal; synchronized according to a sampling frequency; etc.).

According to a master time cursor that acts as reference for other time cursors.

At any speed (slowed, accelerated, stopped, jerky, etc.).

Depending on the commands of a user or of an external signal.

A cursor can move inside its period, or else a period can follow the movements of a cursor. It is also possible to define master periods and slave periods that follow the movements of their master period, for example to increment automatically a set of periods each year.

The time cursors thus enable time shifting functions to be integrated into the System. When a flux transmitted in real time (for example a TV program) is watched, it is possible to interrupt the watching whilst the incoming flux is stored. It will then be possible to consult the remainder of the shown flux either slightly differed or at a slightly greater speed to catch up the delay; the recording continues whilst reading proceeds. Hence, it is possible to put on "Pause" different parts of the System, or even the whole System (for example to analyze and resolve splutters and malfunctions, to optimize mechanisms, to analyze in detail the momentary state of any information), and then catch up the real time. The information can also be visualized in slow or accelerated motion to locate changes in apparently static data or analyze a flux of information that is too fast. A time cursor enables the information visualized to be filtered by its period and thus exclude a considerable mass of useless information by showing only the information concerned by that period. The method allows all the information necessary to the creation of a System to be processed by sequences of Links that are made and unmade at the rhythm of cursors that advance on the time axis; the System works like a sequencer, it is thus particularly suitable for managing any kind of sequences.

It is also possible to clean a Links Base to reduce the necessary storage space by allocating to a time cursor the role of sweeping the distant past in order to delete the most ancient Links, those that have been inactive for a long period of time, those that are orphans and/or those that answer different criteria. The time cursors further enable a partial or complete state of a System at a given passed instant to be saved. It is possible to allocate to a time cursor the role of performing an incremental save; if the backup machine is momentarily unusable, the cursor stops, it starts again as soon as the service is available again and will progressively find again the position relative to real time it initially occupied. The time cursors give the possibility of integrating automatic and successive updates always allowing ancient information to be read and edited with previous versions of the System.

The set of attributes that defines the behaviors of the temporal contexts (time cursors and periods) is preferably represented by a Model, the time contexts can thus also be organized with the aid of Links of the System.

The Links described so far are constituted of passive data structures. It is however also possible within the frame of the invention to provide Links constituted of active and autonomous logic units, capable for example of requesting processing time to perform operations on its own attributes of ordering and sorting, of Selection propagation, of solicitation frequency, of trust and plausibility coefficient, of synaptic weight, of ranking etc. An active Link can also self-store, examine itself, instantiate other Links, etc.

The Systems described so far always comprise a Kernel, i.e. a set of Links giving the System the described properties of re-entry, self-descriptiveness, recursion and self-sustainability. Organizing information by means of collections of Links deprived of Kernels or provided with incomplete Kernels is however possible within the frame of the invention.

The inventive method is adapted for representing, processing and storing a wide variety of known information structures. The method's modeling faculties are capable of representing for example data structures organized by a relational model, by temporal databases, by an object model, by XML files, by graphs, by semantic networks, by unstructured files constituted of headers and followed by records, by sequences, etc. Hence, these modeling faculties enable a System to import information from other formats or from information modeling, displaying or managing systems and to export information processed by a System to other formats, information modeling, displaying or managing systems, inasmuch as the latter are capable of accepting its structures. Other possible applications of the method concern for example:

The conception of operating systems: in this case the method notably makes it possible to index globally all available information, to reduce their redundancy, to return to a previous version or to easily update versions, and to offer more sophisticated statistic search and analysis tools.

Robotics and machine control: by opening the sequencer integrated to the System to industrial peripherals by creating Links to designate signals or commands.

Embedded electronics: thanks to the low redundancy of the information managed by the System, to the small size of the Kernel required for initiating the System and to the advanced abilities of navigating in time.

Search engines: thanks to the advanced identification of information processed by a System, to the semantic marking afforded by the method, to the Link structure made in particular of references on its Container and the Contents it connects, to the possibility of easily creating continuous requests, rules and filters via the Selections, to the integration of methods allowing ranking indices to be established that easily take into account a temporal and self-adapting time adjustment.

Artificial intelligence: by Markov and neuronal network models. A network of synapses can be represented by the Links of a System, for example by allocating a synaptic weight to the Links. Thanks to the possibilities of easily analyzing the history and making projections in the future, the method is also capable of easily adapting and automatically modifying the weighting given to the Links.

Fuzzy logic: the Impacts of one or several Selections can be accounted and trigger the propagation of a new Selection as soon as a sufficient number of Impacts, or a sufficient "impact weight", has been reached.

Object-oriented databases: the method makes it possible to store each piece of information (and meta-information) created and any modification made to this information simply by Links and is thus suitable for solving continuity problems of objects in object-oriented databases.

Designing graphical interfaces: that are adapted and take advantage of the method's technological assets.

The inventive method affords notably the following advantages:

Storing 1) The method processes information with a high level of encoding, since each information container or information content is uniquely identified by a Link. 2) The method allows similar sequences of information to be identified and thus compression mechanisms to be automated, and hence the information to be communicated with a low redundancy, by not very predictable information sequences. 3) Communication is reduced to only dynamic information, i.e. to the Links that frequently change, because static Links can be replicated on the client machines. 4) Communication is also improved because the Links' temporal attributes give the information validity in time, which avoids superfluous reloading of remote information. 5) The very high information encoding level allows it to be encrypted efficiently; a single Links allows complex information to be identified, it is thus possible to make the transmission of information illegible by encrypting only certain Links or by having them transit through a secure channel. Furthermore, the interception of some isolated Link identifiers is without information content for anyone who does not have a replica defining the context in which these Links are transmitted. 6) The Links is the method's storing unit, its fixed-size data structure makes it possible to interrogate the Links Base with a set of simple and repetitive requests, thus to improve the speed of access to the stored information and optimize the engine of the Links Base. 7) Storing the meta-information is not external to the system.

Organization 8) The method allows several levels of meta-modeling by globalizing the information into more general assemblies and by over-grading. 9) The method allows several levels of intra-modeling by specializing the information into more detailed segments and by inheritance. 10) The method allows a modeling through the middle, by letting it grow towards the global and towards the detail, on several levels. 11) The method allows heterogeneous information, of different structures and types, to be regrouped. 12) The atomization of the information processing by Links enables the method to represent many formats and complex structures. 13) The atomization of information by non-segmented Links allows an evolutionary and dynamic organization of these structures.

Searching 14) The method enables all information to be marked semantically, several times and on several levels. 15) Furthermore, any information has knowledge of the information that uses it, of which containers it belongs to, and of other information with which it is constituted. 16) The method builds requests, filters and rules, consults and retrieves information with the aid of multiple selections that propagate from one Link to the next in a continuous fashion. For example, the continuous propagation of the selections makes it possible to constantly update the results of a search, independently of the modifications and of the dynamic evolution of the information and/or of the search criteria. 17) New entered information is identified by a Link and the whole of the Links is indexed in the Links Base. 18) The method enables a global temporal indexation.

Analysis 19) The Link's temporal attributes give the method the advantage of keeping the trace and the history of any modification, adjunction or deletion of information contents and containers. Analyses, statistics of other information processing require a history. 20) The entire state of an information system based on the method and/or the information it processes can be retrieved at any instant. 21) Different temporal contexts allow a system to be used simultaneously and in different instants from the past to the future. 22) The method is suited for extrapolation, projection and simulation of information.

The invention claimed is:

1. Information processing method comprising:
using a plurality of Links for storing and processing information,
each Link having a data structure comprising at least one unique identifier specifying said Link and three references on unique Link identifiers,
all of the Links being connected to one another, wherein
at least one Link corresponds to a Relation which servers to represent a Container, the Contents of which are Links, and wherein
at least one Relation, called Relation RC, serves to represent a Container identified by the identifier of said Relation RC and having Contents identified by the identifiers of each of the Links contained by said Relation RC.

2. The method of claim 1, wherein each Link represents at least one Content, said three references designating respectively:
the identifier of a Container Link that contains said Link,
the identifier of a Link representing a ParentContent,
and the identifier of a Link representing a ChildContent, said Link connecting the ParentContent to the ChildContent.

3. The method of claim 2, wherein at least one Link is re-entering, so that a reference to said Link on the Container Link is equal to the identifier of the Link.

4. The method of claim 2, wherein the Container Link, or the Container Link of the Container Link, or the Container Link of the Container Link of the Container Link, or any number of container links chained together, of each Link is constituted by a single Link.

5. The method of claim 1, wherein the identifiers of certain Links correspond implicitly to data.

6. The method of claim 1, wherein said structure further comprises temporal attributes indicating a beginning, an end, or both a beginning and an end of at least one period of activation of the Links.

7. The method of claim 1, wherein said structure comprises at least one field allowing each Link's own attributes to be stored.

8. The method of claim 1, wherein said Links are stored in a Links Base and wherein all the information is processed by creating, modifying, and/or deleting, or both modifying and deleting Links stored in said Links Base or in several Links Bases.

9. The method of claim 8, wherein said structure comprises at least one reference designating an external data outside said Links Base.

10. The method of claim 1, wherein said unique identifier of the Link and said three references all have the same digital data format.

11. The method of claim 1, wherein said structure is stored by lists, tables, graphs, triplets or objects.

12. The method of claim 1, wherein said structure is identical for all Links.

13. The method of claim 1, wherein said structure uses fixed-size data formats.

14. The method of claim 1, wherein said Relation associates a ParentContainer to a ChildContainer, so that each Link contained by said Relation connects, by the references onto a ParentContent and a ChildContent peculiar to each Link, a Content of the ParentContainer to a Content of the ChildContainer.

15. The method of claim 1, wherein each Container is defined by one or several Relations, called ParentRelations that are the Relations of the ParentContainer designating each Container.

16. The method of claim 15, wherein a Content is created in a Container by creating a Link for each of the ParentRelations required of the Container.

17. The method of claim 1, wherein the Relations are the Contents of a Container called RelationsContainer, which is defined in recursive fashion by ParentRelations that the RelationsContainer precisely serves to define.

18. The method of claim 1, wherein a particular set of Links forms a Kernel, said Kernel being only described with the aid of Links and allowing the System to boot.

19. The method of claim 18, wherein said Kernel is constituted by the enrichment of a 9- or 14-Link Kernel or by the enrichment of a 9- or 14-Link Kernel, said Kernel containing itself.

20. The method of claim 1, wherein
said Links are stored in a Links Base defining a System, said System having the capacity of being self-described, of being identified by a Link, of containing itself, of containing one or several sub-Systems called IntraSystems and of being contained on one or several super-Systems called MetaSystems.

21. The method of claim 1, wherein at least certain Links represent an active and autonomous logic unit, capable of requesting processing time to perform various operations.

22. The method of claim 1, wherein all of the information entered or deleted by the users is accomplished by creating or modifying or deleting the Links.

23. The method of claim 1, comprising a step of creating and of propagating continuous Selections in order to verify Boolean conditions on the tested Links.

24. The method of claim 1, wherein the method processes all of the information with links.

25. Information processing method comprising:
using a plurality of Links for storing and processing information,
each Link having a data structure comprising at least one unique identifier specifying said Link and three references on unique Link identifiers,
all of the Links being connected to one another, wherein at least one Link corresponds to a Relation, known as a Container, the Contents of which are Links, wherein the Relations are the Contents of a Container called RelationsContainer and which is defined in recursive fashion by ParentRelations that the RelationsContainer precisely serves to define.

26. The method of claim 25 wherein said RelationsContainer defines the Contents of the RelationsContainer, in other words the Relations of the RelationsContainer, by at least two ParentRelations: the Relation CP designating the ParentContainer of a Relation, and the Relation CE designating the ChildContainer of a Relation.

27. The method of claim 25, wherein the method processes all of the information with links.

28. Information processing method comprising:
using a plurality of Links for storing and processing information,
each Link having a data structure comprising at least one unique identifier specifying said Link and three references on unique Link identifiers,
all of the Links being connected to one another, wherein
said Links are stored in a Links Base defining a System, said System having the capacity of being self-described, of being identified by a Link, of containing itself, of containing one or several sub-Systems called IntraSystems and of being contained on one or several super-Systems called MetaSystems.

29. The method of claim 28, wherein the method processes all of the information with links.

30. A computer program product containing a computer program instruction designed to execute by an information processing method so when executed by a computer causes a processor to perform a method comprising:
using a plurality of Links for storing and processing information, wherein each Link has a data structure comprising at least one unique identifier specifying said Link and three references on unique Link identifiers,
all of the Links being connected to one another, wherein
at least one Link corresponds to a Relation known as a Container, the Contents of which are Links, and wherein
at least one Relation, called a Relation RC, serves to represent a Container which is identified by the identifier of said Relation RC and having Contents being identified by the identifiers of each of the Links contained by said Relation RC.

* * * * *